AUTOMOTIVE POWER DRIVE CONTROL SYSTEM AND MECHANISM
Original Filed Dec. 10, 1941 15 Sheets-Sheet 1
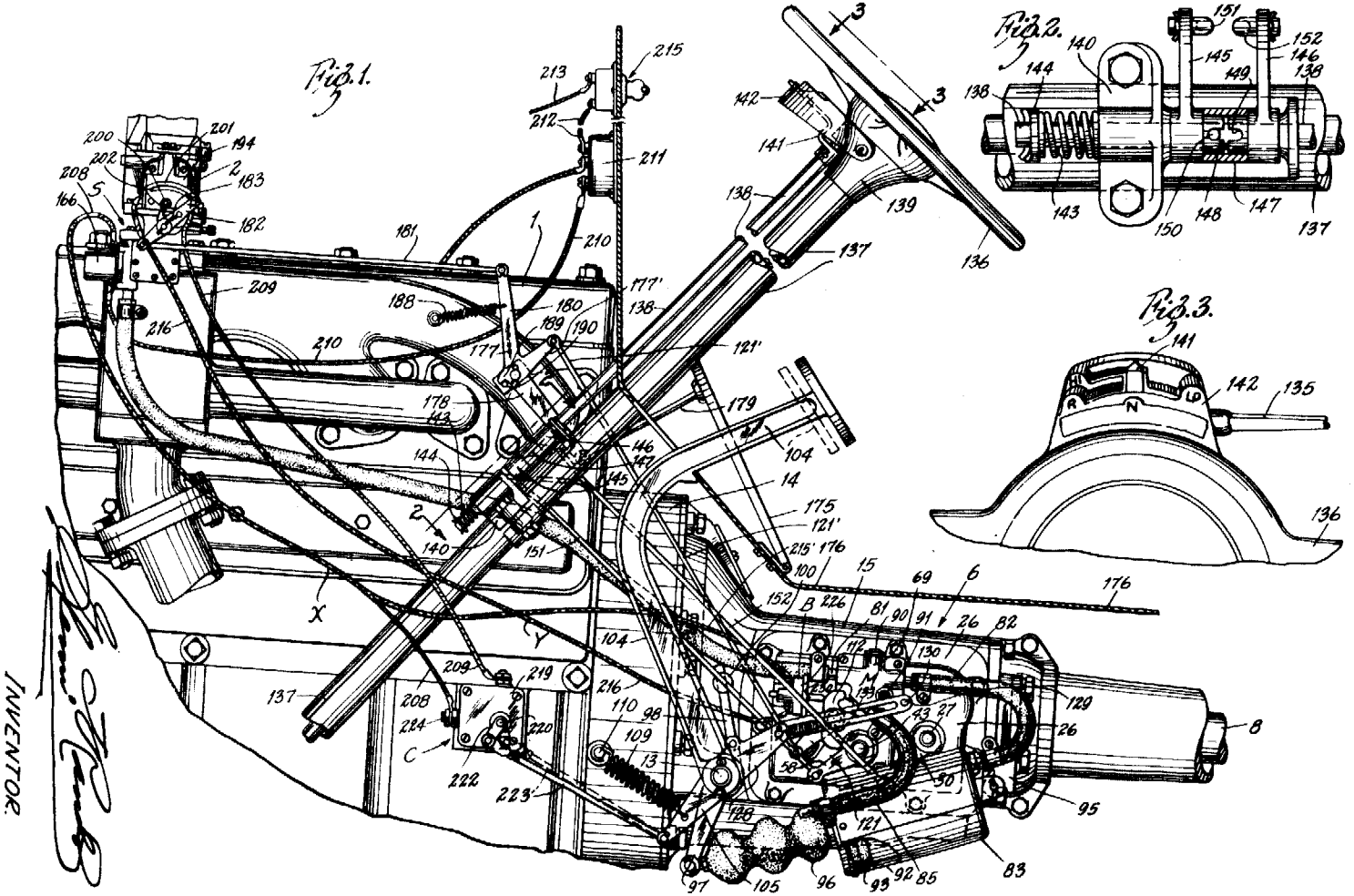

AUTOMOTIVE POWER DRIVE CONTROL SYSTEM AND MECHANISM

Original Filed Dec. 10, 1941 15 Sheets-Sheet 2

INVENTOR.

AUTOMOTIVE POWER DRIVE CONTROL SYSTEM AND MECHANISM

Original Filed Dec. 10. 1941 15 Sheets-Sheet 3

INVENTOR.

AUTOMOTIVE POWER DRIVE CONTROL SYSTEM AND MECHANISM
Original Filed Dec. 10, 1941 15 Sheets-Sheet 4
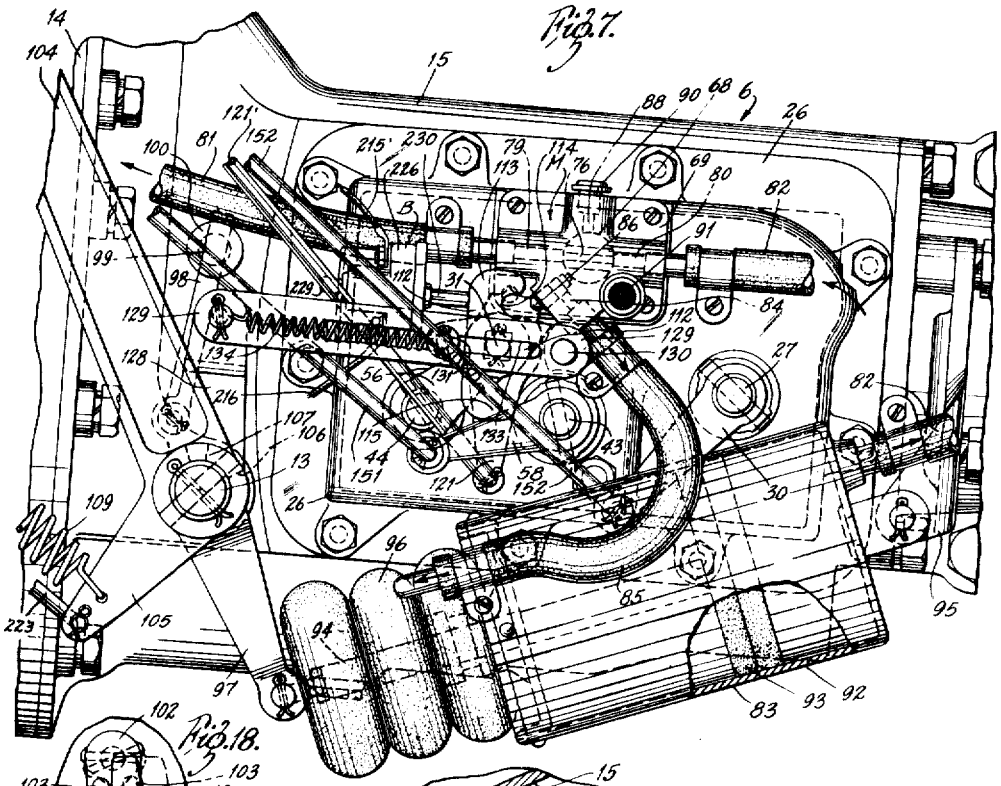
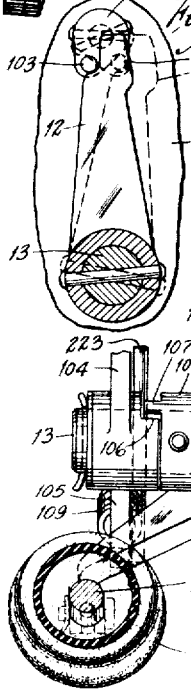
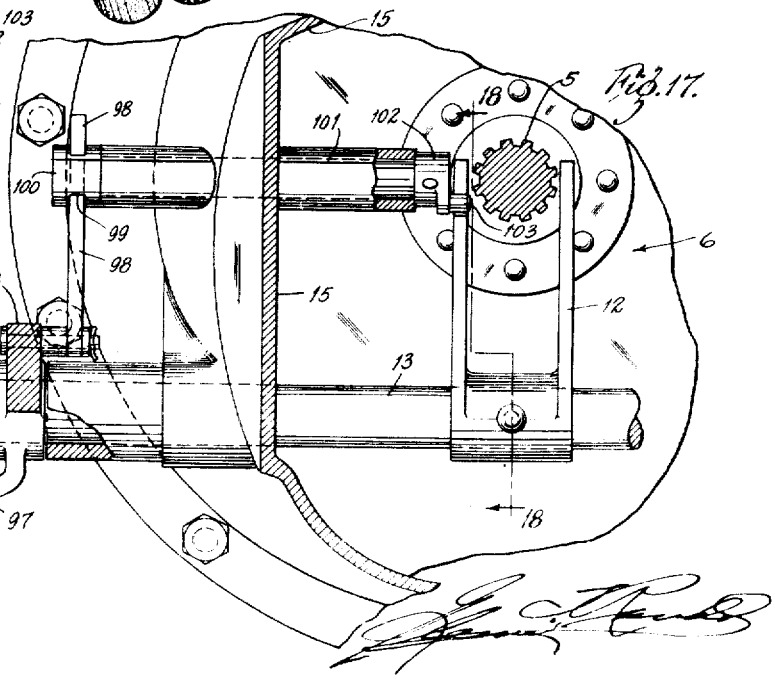
INVENTOR.

AUTOMOTIVE POWER DRIVE CONTROL SYSTEM AND MECHANISM
Original Filed Dec. 10, 1941 15 Sheets-Sheet 5
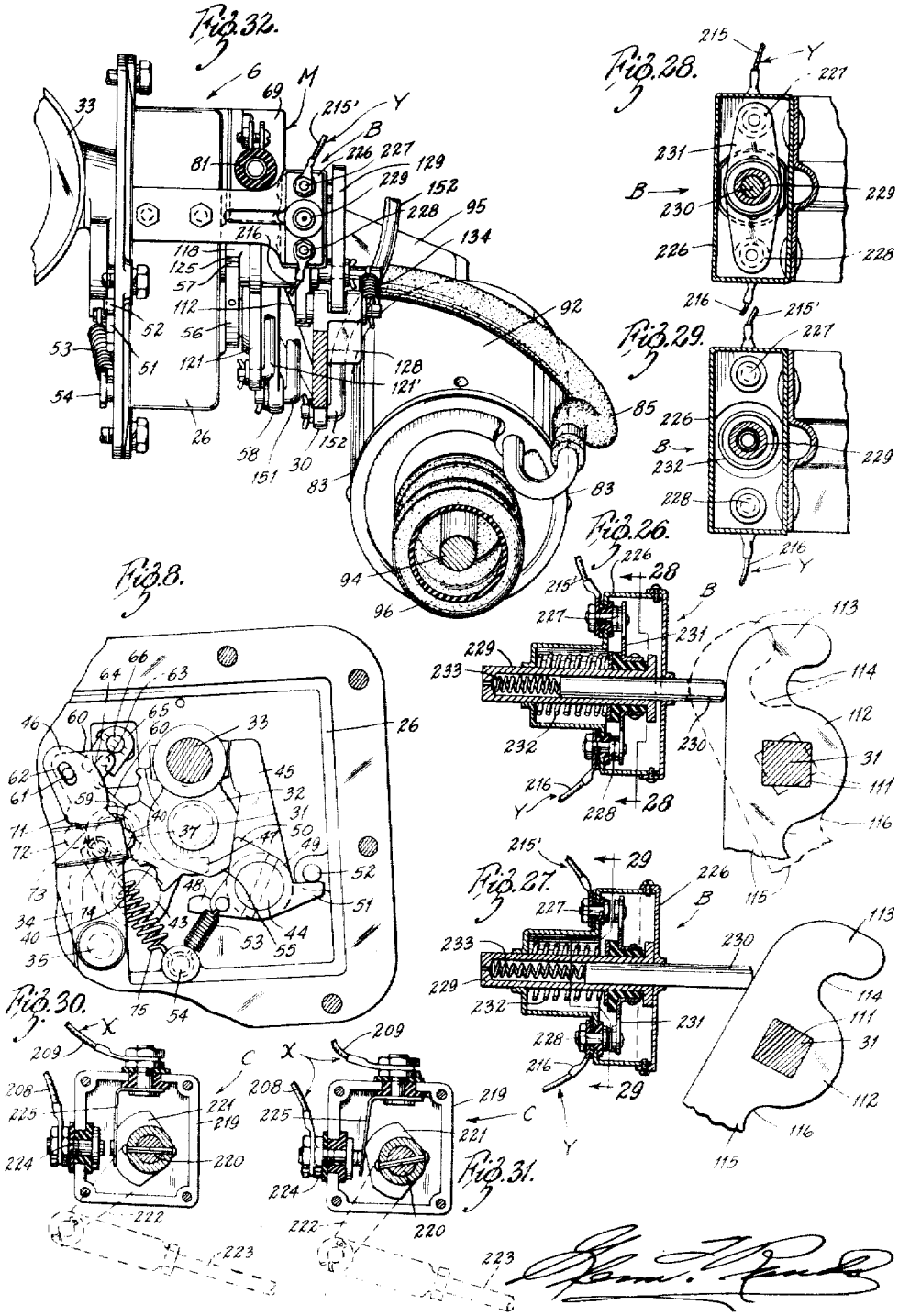
INVENTOR.

AUTOMOTIVE POWER DRIVE CONTROL SYSTEM AND MECHANISM

Original Filed Dec. 10, 1941 15 Sheets-Sheet 6

INVENTOR.

AUTOMOTIVE POWER DRIVE CONTROL SYSTEM AND MECHANISM

Original Filed Dec. 10, 1941 15 Sheets-Sheet 7

INVENTOR.

AUTOMOTIVE POWER DRIVE CONTROL SYSTEM AND MECHANISM

Original Filed Dec. 10, 1941 15 Sheets-Sheet 8

INVENTOR.

AUTOMOTIVE POWER DRIVE CONTROL SYSTEM AND MECHANISM

Original Filed Dec. 10, 1941 15 Sheets-Sheet 9

INVENTOR.

AUTOMOTIVE POWER DRIVE CONTROL SYSTEM AND MECHANISM

Original Filed Dec. 10, 1941 15 Sheets-Sheet 10

INVENTOR.

AUTOMOTIVE POWER DRIVE CONTROL SYSTEM AND MECHANISM

Original Filed Dec. 10, 1941 15 Sheets-Sheet 11

INVENTOR.

AUTOMOTIVE POWER DRIVE CONTROL SYSTEM AND MECHANISM

Original Filed Dec. 10, 1941 15 Sheets-Sheet 12

INVENTOR.

AUTOMOTIVE POWER DRIVE CONTROL SYSTEM AND MECHANISM
Original Filed Dec. 10, 1941 15 Sheets-Sheet 13
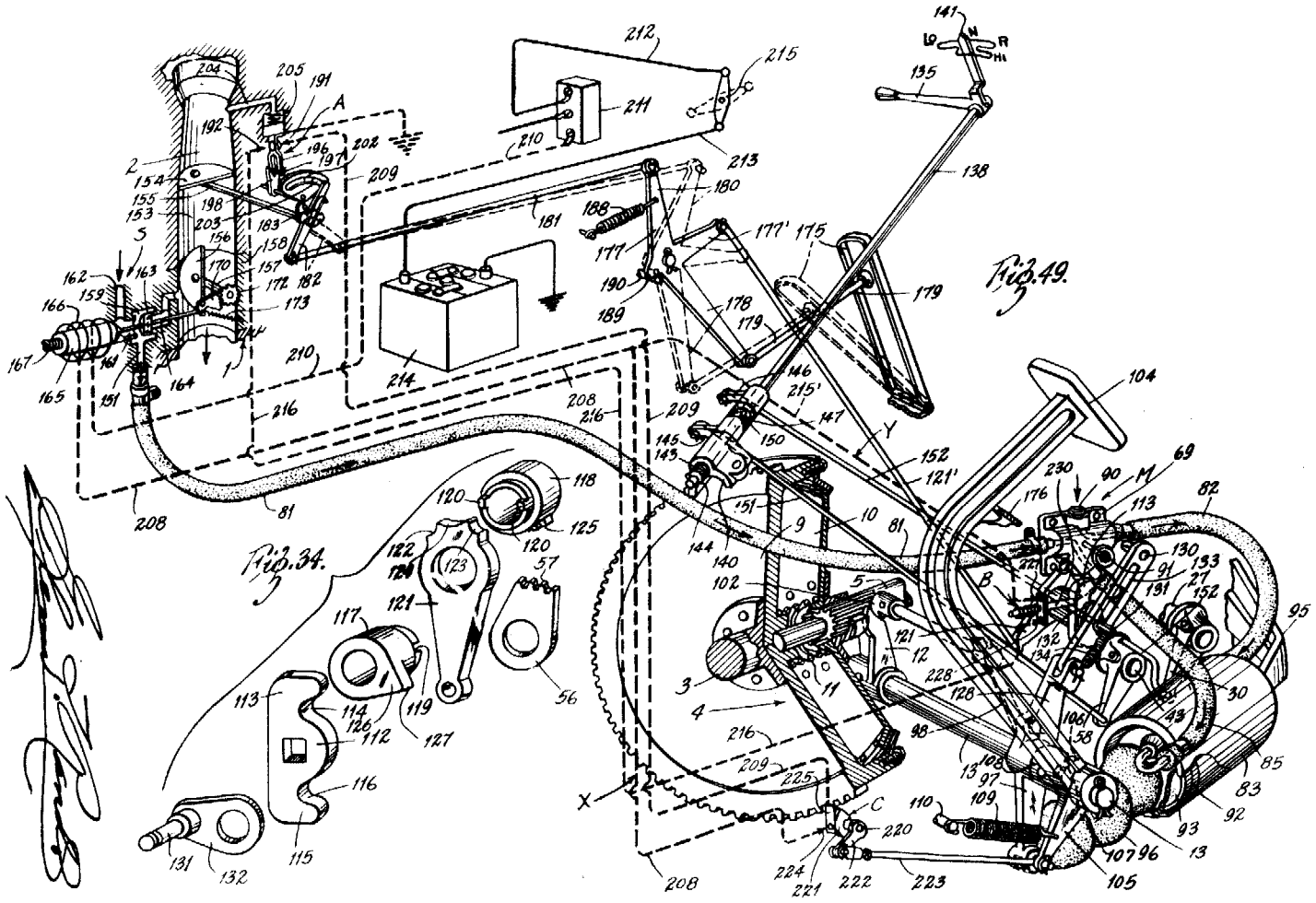

AUTOMOTIVE POWER DRIVE CONTROL SYSTEM AND MECHANISM
Original Filed Dec. 10, 1941 15 Sheets-Sheet 14
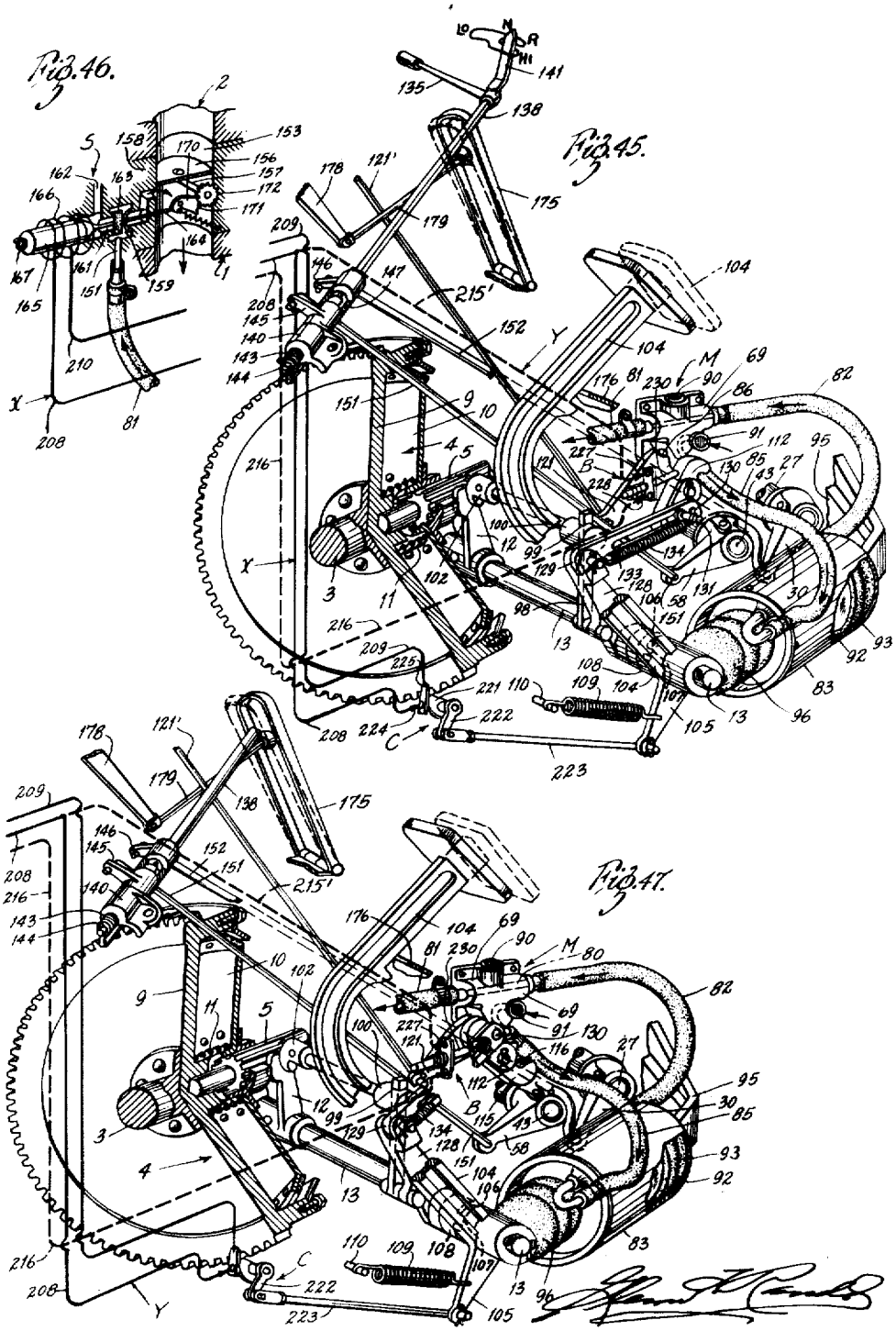
INVENTOR.

AUTOMOTIVE POWER DRIVE CONTROL SYSTEM AND MECHANISM

Original Filed Dec. 10, 1941 15 Sheets-Sheet 15

INVENTOR.

United States Patent Office

Re. 23,901

Reissued Nov. 30, 1954

23,901

AUTOMOTIVE POWER DRIVE CONTROL SYSTEM AND MECHANISM

Glenn T. Randol, Mountain Lake Park, Md.

Original No. 2,434,717, dated January 20, 1948, Serial No. 422,332, December 10, 1941. Reissue No. 23,562, dated October 7, 1952, Serial No. 71,381, January 17, 1949. This application for reissue June 8, 1953, Serial No. 360,402

114 Claims. (Cl. 192—.073)

(Granted under Title 35, U. S. Code (1952), sec. 266)

Matter enclosed in heavy brackets [ ] appears in the original patent but forms no part of the first and this reissue specification; matter printed in italics indicates the additions made by the first reissue; matter printed in bold face (except reference figures) indicates the additions made by this reissue.

*This invention relates in general to power drive control systems associated with the power plant of an automotive vehicle, and in particular to power- and manually-operated means for operating the change-speed transmission of said power plant and for operating the friction clutch to facilitate the operation of the transmission.*

*An important object of my invention is to provide in an automotive vehicle including a friction coupling between the power plant and a three-speeds forward and a reverse drive transmission, a simple mechanism, power-operated in part, for operating said transmission, the low and reverse gear settings thereof being effected by a manual operation of said mechanism, and the second and high gear settings of the transmission and the operation of the friction coupling to facilitate said settings, being effected by power means upon the inauguration of this operation by the driver.*

*A further object of my invention is to provide, in an automotive vehicle including a friction coupling an accelerator, an engine controlling dual throttle, a three-speeds forward and a reverse drive transmission and a gear-shift lever means for operating and facilitating the operation of said transmission, said means including power means, comprising a single acting fluid pressure energized servomotor, which is automatically operable when the gear-shift lever is placed in a certain position with the accelerator in released engine idling position, to establish the transmission in its second (intermediate) gear setting or its high (direct-drive) gear setting by successive movements of said accelerator from and to its released position, the friction coupling being operated by said motor to facilitate the aforesaid operation of the transmission, said means further including accelerator-operated means for controlling one of said throttles to cause the engine to idle during said power gear settings of the transmission.*

*A further object of my invention is to provide a manually- and power-operated mechanism for operating a three-speeds forward and a reverse drive transmission and a friction clutch, said mechanism being capable, after a selector lever of the mechanism is first operated to establish the transmission in its second gear setting, of effecting a power operation of the transmission to alternately effect the second and high gear settings thereof, the friction clutch being disengaged to facilitate each of said transmission operations, and re-engaged after each operation is completed, the mechanism further including means controlled by fully depressing the accelerator to cause the power means to establish second speed gear settings if high gear is effective.*

*Another object of my invention is to provide in an automotive vehicle including a power plant comprising a friction clutch, a gear-shift lever, an engine controlling throttle, and a change-speed transmission, power-operated mechanism for operating the transmission to alternately effect two settings and for operating the clutch to facilitate said operation of the transmission, said mechanism*

*including a single acting pressure differential operated servomotor operably connected to the transmission and clutch and operative, in one cycle of operations, to disengage the clutch, the engine being idled automatically during said operation, then operate the transmission to establish one or the other of the aforementioned two settings, then re-engage the clutch in a plurality of controlled stages of operation; and one of the principal objects of my invention is to include in said mechanism a simple electrical and mechanical valving means operative, with certain operations of the gear-shift lever, the accelerator, and the clutch pedal, to initiate and complete the aforementioned cycle of operations of the servomotor.*

*A still further object of my invention is to provide means for operating the change-speed transmission of an automotive vehicle, for example a two speed forward drive transmission mechanism, and for operating the friction clutch of the vehicle to facilitate the operation of the transmission, said means including a single acting servomotor operable in one uninterrupted cycle of operations to successively disengage the clutch and then operate the transmission to establish the same in a new gear setting, and then accommodate control of the re-engagement of said clutch thereby in stage operations thereof and at the same time control the operation of the power plant throttle to cause same to operate at idling speed; and it is a further object of my invention to control the aforementioned servomotor by accelerator-controlled electrically and mechanically actuated valving and a pedally-operated control device, and a transmission-operated switch mechanism, the latter mechanism serving to insure a completion of the transmission setting, and to effect de-energization of the servomotor, to accommodate* automatic or operator-controlled *re-engagement of the clutch after the operation of the transmission is completed.*

*A further object of my invention is to provide, in the power plant of an automotive vehicle, power means for operating the change-speed transmission of the plant to alternately establish the transmission in its second and high gear settings, said means also operating the clutch of the power plant to facilitate the operation of the transmission and includes an auxiliary throttle means operated to closed position independently of the accelerator-controlled throttle while the clutch is being disengaged and the transmission operated; and it is a further object of my invention to so construct said transmission, clutch and operating power means, that there is effected stage engaging operations of the clutch upon operating the accelerator from either of its extreme positions toward the other extreme.*

[This invention relates to power drive control systems and more particularly to means for controlling the transmission of power through the main clutch and change speed gearing of a motor vehicle in a simple, efficient and effortless manner.]

*A further object* [One of the objects] of my invention is to provide an improved control means for a change-speed gearing in which the change between two speeds [ratios] and the proper operation of the *aforesaid* [main] clutch necessary *to relieve torque* during said change can [all] be *coordinately* accomplished *automatically* by the employment of a single power-operated member such as, for example, a suction motor operated by the suction created in the intake manifold of the vehicle engine with which the gearing and clutch are associated.

Another object of my invention is to so associate and *operatively* connect the suction motor with the [main] *vehicle* clutch and the change-speed gearing that the movement of its movable element in one direction will cause the [main] clutch to be disengaged and then subsequently the shifting of the shiftable element of the gearing, and wherein the suction motor will be so controlled during the return movement of the movable member that the [main] clutch will be caused to smoothly engage.

Another object of my invention is to provide in a gear shifting mechanism, means which will be so controlled by the accelerator mechanism of the vehicle engine that the shifting mechanism cannot be operated to perform a shifting operation unless the accelerator mechanism is in a predetermined position.

Another object of my invention is to provide an improved control mechanism for a change-speed transmission in which the shifting of two *different* speeds [ratios] can be accomplished *automatically* by the employment of a single power-operated member and wherein the said two speeds [ratios] are automatically alternately engaged and disengaged by the single power-operated member by means operative when the accelerator mechanism is respectively in a depressed position and in a released position, said positions being beyond the normal throttle range.

Another object of my invention is to provide control means for a change-speed gearing and associated [main] *torque-transmitting* clutch in which one of two speeds [ratios] may be mechanically preselected when the accelerator mechanism is released and the other speed [ratio] preselected when the accelerator pedal is depressed beyond its *engine* operating range, and wherein the clutch will [be allowed to] automatically engage when the accelerator pedal is moved between said released and depressed positions or momentarily held substantially in fully depressed position.

Another object of my invention is to provide valve controlling means for the single power-operated member such that the movement of the hand lever adjacent the steering wheel from the neutral position to the automatic position will normally cause the single power-operated member to function upon either the releasing or the depressing of the accelerator pedal beyond normal throttle range and wherein, upon the resetting of the hand lever from the automatic position to neutral position, *such* will operate said valve controlling means to cause the suction from the engine intake manifold to reverse the movement of the power-operated piston such that the active gear may be manually restored to its neutral position, and thus definitely establish the neutral condition of the gearing in the transmission.

Another important object of my invention is to provide accelerator controlled *vehicle* clutch operating mechanism whereby slight depression of the accelerator pedal from its fully released position without accelerating the engine will cause the clutch to engage and thus [permit] *utilize* the engine [to be employed] *compression* for *vehicle* braking purposes.

Another important object of my invention is to provide an accelerator pedal controlled [main] *torque-transmitting* clutch and gear changing mechanism which will cause the clutch to be disengaged and the gear change accomplished in proper sequence by means operative when the accelerator pedal is moved to a position beyond the normal throttle range.

Another object of my invention is to provide an improved control mechanism for a change-speed transmission in which certain predetermined positions of the accelerator mechanism [can be] *are employable* [employed] to cause the control mechanism to be operative.

Another object of my invention is to provide a control mechanism for a change-speed gearing wherein manually-controlled means may be employed to condition the shifting mechanism for obtaining certain speed [ratios] *drives* and these speed *drives* [ratios] alternately made operative by the releasing of the accelerator mechanism and the actuation of a control member such as, for example, the clutch pedal, thus eliminating the necessity for performing certain manual operations necessary in prior shifting mechanisms wherein all speed [ratios] *drives* must be [obtain] *obtained* by a manual movement of a member such as a gear-shift lever.

Another object of my invention is to provide control means for a change-speed gearing and a [main] clutch *mechanism* which will cause the gearing, when in high speed condition, to be automatically shifted to second speed position by the simple operation of moving the accelerator pedal to a position [beyond] *substantially at* full throttle open position.

Another *object of my invention is to provide a control that will cause the engine to idle irrespective of whether or not the conventional accelerator mechanism is in an engine running position; i. e., a position other than idling; and to correlate the engine idling with the energization of vacuum-power means that declutches, shifts gear ratio mechanism, or both. Particularly, it is an object to provide means to condition vacuum-power means for energization, so that it may be energized only under certain circumstances, and then, in a final control operation, connect the preconditioned power means to the source of vacuum in the engine intake, and at the same time throttle the carburetor or engine intake to insure adequate vacuum at the time needed, irrespective of whether the conventional accelerator mechanism is positioned to throttle the engine or not. A specific object is to obtain the foregoing operations by three control devices, one of which is a manual preset device or selector, and the other two of which are control devices that are operable to obtain the desired sequence of operation set forth. Specifically the other two control devices are desirably the accelerator pedal and the clutch pedal, although it will be evident from the description to follow that other equivalent manual or automatic control devices could be used. Where one of the control devices is the accelerator pedal, the other must be a control that will prevent shifting upon each operation of the accelerator pedal to its critical position or positions, when the speed of the vehicle or some other factor would make such a shift undesirable.*

*It is a more specific object of my invention to employ the accelerator pedal as one of said controls for the energization of the power means, and to incorporate with it an engine idling means; that is, operated to engine idling position, irrespective of normal carburetor action, whenever the accelerator pedal is moved to certain predetermined positions, and other control means are in proper condition. Especially is it an object to employ substantially the extreme positions of the accelerator pedal for such predetermined positions, or further, to employ extreme positions beyond the range of normal carburetor regulating positions.*

Another object of my invention is to provide improved carburetor control means whereby when the accelerator mechanism is operated to a position [beyond] substantially at full throttle open position during the shift from the high speed [ratio] to the second speed [ratio], the engine will be caused to idle during the shifting operation with subsequent disabling of engine idling and re-engagement of the engine clutch, automatically.

Another object of my invention is to provide an improved control means for a vehicle transmission embodying a change-speed gear and a [main] *friction* clutch wherein the low and reverse speeds [ratios] may be obtained in a conventional manner by movement of a gear-shift lever in coordination with the [manual] movement of the clutch pedal and wherein the second and high speeds [ratios] may be obtained without the necessity of manually moving the gear-shift lever other than to place it in a predetermined position for *power* conditioning purposes.

Other objects of my invention will become apparent from the following description taken in connection with the accompanying drawings in which:

Figure 1 is a side view of a portion of a motor vehicle showing the engine, the change-speed transmission and the [main] clutch operating pedal with which is combined certain structure to form a control mechanism embodying my invention, the parts being in their normally inoperative positions wherein the [main] clutch is fully engaged and the change-speed transmission is in neutral condition;

Figure 2 is a view taken as indicated by the line 2—2 of Figure 1;

Figure 3 is a view taken as indicated by the line 3—3 of Figure 1;

Figure 7 is another view similar to Figure 4 but with the parts in the positions assumed when the hand lever is set for automatic operation of second and high speeds, the clutch pedal being in a disengaged position and the second gear ratio *drive* element about to be made operative by being shifted from its neutral position;

Figure 8 is a partial view of the parts on the inside of the closure plate showing their positions corresponding to the positions of the parts shown in Figure 7;

Figure 17 is a sectional view taken on the line 17—17 of Figure 4;

Figure 18 is a sectional view taken on the line 18—18 of Figure 17;

Figure 26 is a sectional view of the [cut-out] *limit* switch mounted on the transmission cover and showing the switch in closed position as assumed when the transmission is in either neutral or high gear ratio *drive*;

Figure 27 is a view similar to Figure 26 but showing the switch open, which condition exists when the gearing is in second speed ratio *drive*;

Figure 28 is a view taken on the line 28—28 of Figure 26;

Figure 29 is a sectional view taken on the line 29—29 of Figure 27;

Figure 30 is a view of the clutch pedal controlled switch [showing it] in open condition;

Figure 31 is a view of the clutch pedal controlled switch [showing it in] *operated to* closed condition;

Figure 32 is a view taken on the line 32—32 of Figure 4;

Figure 34 is an exploded view of certain parts mounted on the exterior portion of the shaft for controlling the second and high speed shifting fork and the rate of clutch engagement;

Figure 45 is a diagrammatic view, parts being shown in section, showing the various parts of the transmission control mechanism in their positions assumed when the transmission is in second speed ratio and the main clutch is disengaged;

Figure 46 is a diagrammatic view of certain parts associated with the carburetor, particularly the solenoid controlled valve and the secondary butterfly valve;

Figure 47 is a diagrammatic view similar to Figure 45 but showing the parts in the positions they assume when high speed ratio is operative and the main clutch is disengaged;

Figure 49 is a diagrammatic view showing the parts in their positions when the transmission is in neutral position with the main clutch engaged and the accelerator fully released;]

*Figure 45 is a schematic view of the clutch and transmission control mechanism illustrated in Figure 1 but operated to establish second speed drive and including the electrical control circuits therefor, said circuits being depicted in solid and broken lines to indicate respectively energized and non-energized conditions thereof;*

*Figure 46 is a schematic view of a portion of the control structure illustrated in Figure 1, showing in particular the solenoid-controlled valve and the secondary butterfly valve associated with the carburetor, and including the electrical control circuits therefor depicted in solid and broken lines to indicate respectively energized and non-energized conditions thereof;*

*Figure 47 is a schematic view similar to Figure 45 showing the control mechanism operated to establish high speed drive, and disengage the friction clutch;*

*Figure 48 is a schematic view similar to Figure 45 showing the control mechanism operated to establish second speed drive as a result of the full depressing movement of the accelerator pedal, said clutch being in disengaged condition;*

*Figure 49 is another schematic view of the control structure illustrated in Figure 1 including the electrical control circuits therefor, said circuits being depicted in solid and broken lines to indicate respectively energized and non-energized conditions thereof;*

Figure 4:
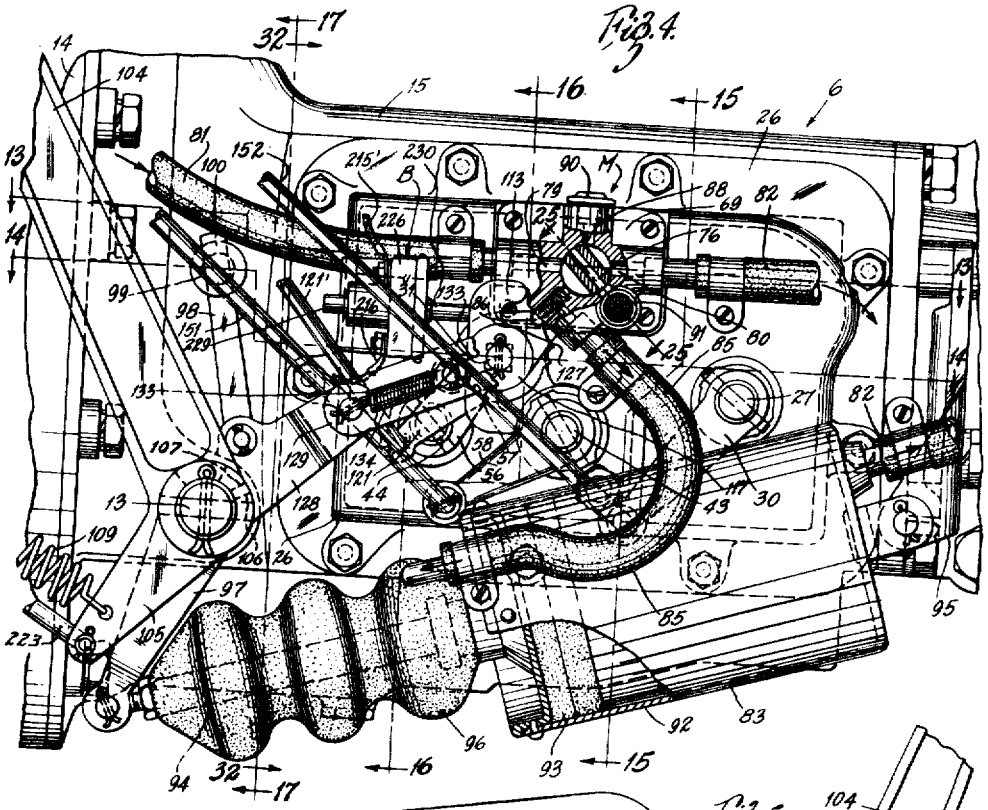
Figure 4 is an enlarged view of the parts associated wth the [main] clutch pedal and mounted on the exterior of the transmission closure plate, said parts being shown in the neutral position with the clutch in engaged condition.

Referring first to Figure 1, numeral 1 indicates an internal-combustion engine for a motor vehicle which is provided with the usual carburetor 2. The crankshaft 3 of the engine (see Figures 45, 47, 48 and 49) is connected through a [main] *torque-transmitting* friction clutch 4 to the driving shaft 5 of the change-speed gearing 6. The driven shaft 7 of this gearing is in turn connected to a propeller shaft 8 for driving the wheels of the vehicle in a well-known manner. The [main] friction clutch 4 comprises an element 9 fixed to the end of the crankshaft and a cooperative element 10 slidably mounted on the driving shaft 5 of the gearing. The slidable element 10 is normally held in engagement with element 9 by a spring 11 and is adapted to be disengaged by a fork 12 secured to the inner end of a clutch shaft 13. The [main] friction clutch is enclosed in the housing 14 which is interposed between the engine 1 and the gearing housing 15 (see Figure 1).

Figure 13:
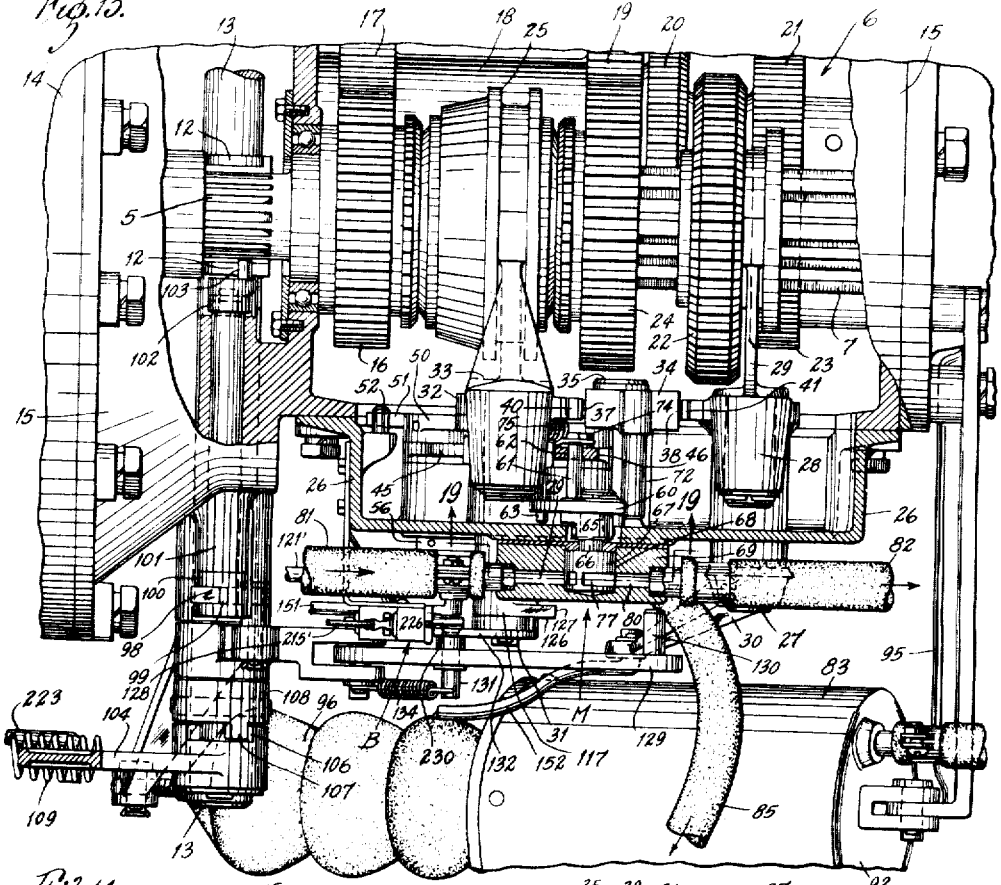
Figure 13 is a sectional view taken on the line 13—13 of Figure 4.

As best shown in Figure 13, the change-speed gearing within the housing 15 is of conventional construction and comprises a driving gear 16 secured to the end of the driving shaft 5 projecting into the housing. This gear 16 is in constant mesh with the gear 17 on the countershaft 18 which also has integral therewith a second speed gear 19, a low speed gear 20, and a reverse gear 21. The driven shaft 7 of the gearing is axially aligned with the driving shaft and has its forward end journaled therein. The rear portion of the driven shaft has splined thereon a slidable gear 22 which is adapted to mesh with gear 20 to provide low speed ratio *drive* and also with the idler gear 23 (constantly in mesh with gear 21) to provide reverse speed ratio *drive*.

The central portion of the driven shaft 7 has rotatably mounted thereon a second speed gear 24 which is constantly in mesh with the second speed gear 19 on the countershaft. Positioned on the driven shaft between the gears 16 and 24 and rotatable therewith is a slidable double clutch element 25 which, when slid rearwardly will clutch the second speed gear 24 to the driven shaft and when slid forwardly will clutch the driving shaft 5 directly to the driven shaft to thus obtain second speed ratio *drive* and high speed ratio *drive*, respectively. The clutch element 25 and the manner in which it is capable of performing its function is well known in the art and need not be specifically described. It might be mentioned, however, that the cooperating clutch teeth on said element and the gears have associated therewith synchronizing means for enabling the clutch teeth to be smoothly engaged.

Figure 14:
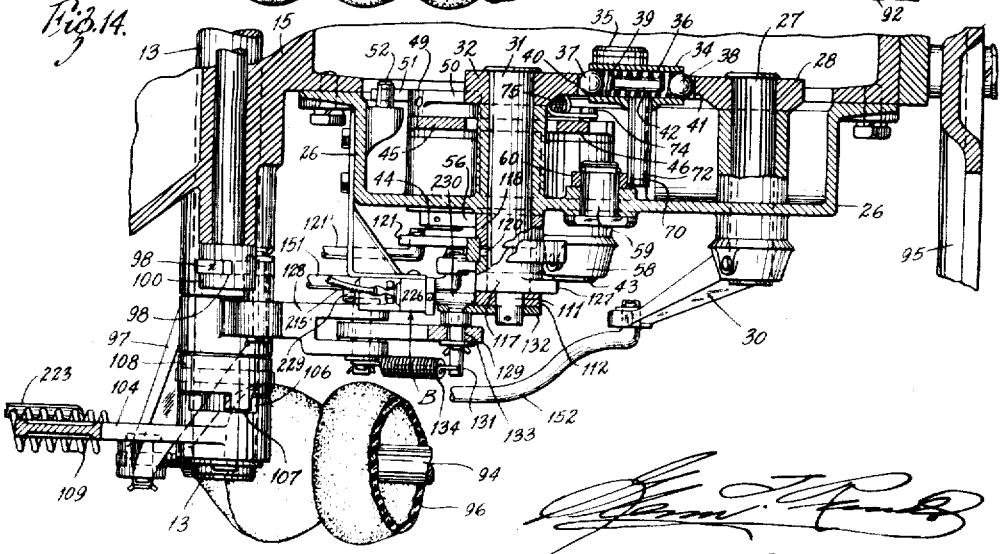
Figure 14 is a sectional view taken on the line 14—14 of Figure 4.
Figure 15:
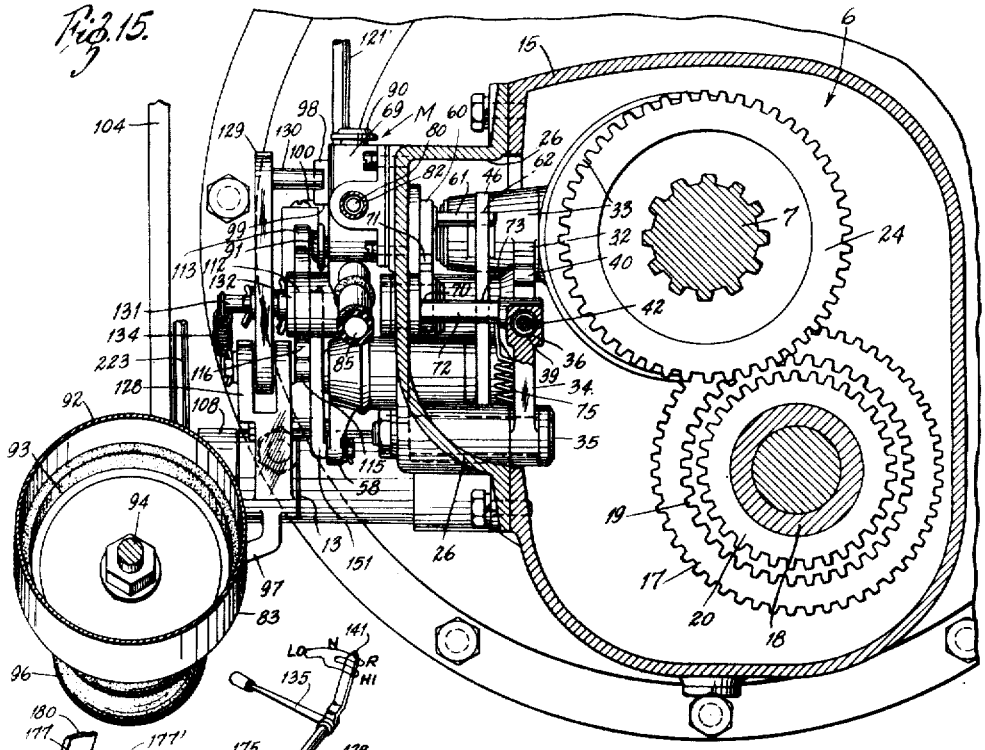
Figure 15 is a sectional view taken on the line 15—15 of Figure 4.
Figure 48:
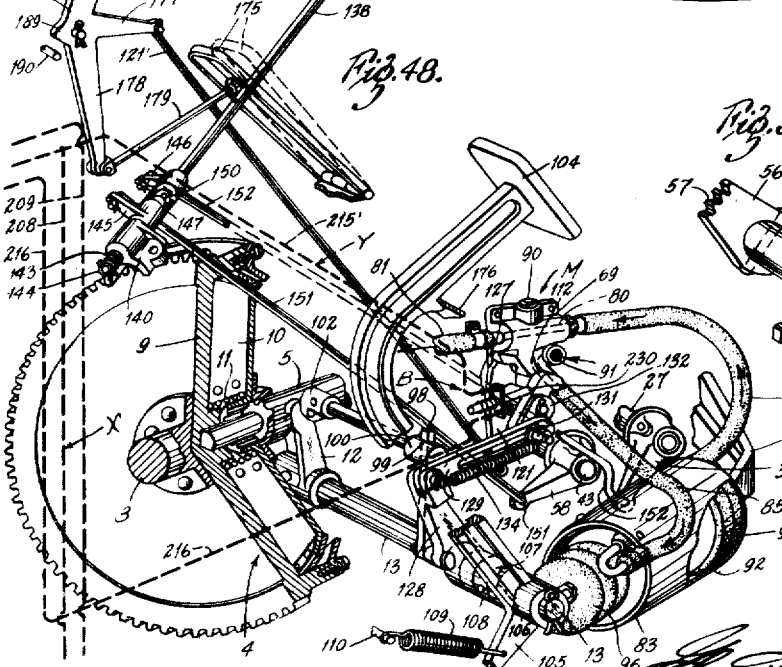
Figure 48 is a diagrammatic view also similar to Figure 45 but showing the parts in the positions they assume when the second speed ratio is caused to be operative as a result of the depressing of the accelerator pedal to the floor board, said main clutch being in disengaged position.

The change-speed gearing housing 15 has an opening on one side which is closed by a closure plate 26. On the rear end of this plate there is journaled a shaft 27 (Figure 14) which has secured to its inner end an upstanding arm 28 and journaled to the upper end of this arm is a shifting fork 29 for cooperation with the gear 22 whereby this gear may be shifted forwardly and rearwardly from its neutral position, shown in Figure 13, in order to obtain low and reverse gear [ratios] *ratio drives*. The outer end of the shaft 27 has secured thereto an arm 30 whereby the shaft may be rotated from the exterior of the closure plate in a manner to be later described.

Also journaled in the closure plate at a point forwardly of shaft 27 is a second shaft 31 which has secured on its inner end an upstanding arm 32, the upper end of which has pivotally mounted therein a shifting fork 33 for cooperation with the double clutch element 25 to thus shift said clutch rearwardly and forwardly from its central neutral position, as shown in Figure 13, and thus obtain second speed and high speed [ratios], *ratio drives*, respectively.

In order to provide an interlocking means for the shifting forks and thus prevent either of them from being moved from a neutral position to an operative position when the other is in an operative position, there is mounted on the lower side of the closure plate, an arm 34 pivoted on a shaft 35 and extending upwardly between the arms 28 and 32 (see Figures [13, 14, and 15] *5, 10, 12–15*. This arm 34 is provided with a bore 36 (*Figure 14*) carrying in its ends balls 37 and 38 pressed outwardly by an interposed spring 39. Ball 37 is adapted to cooperate with recesses 40 in the hub of arm 32 to yieldably hold shifter fork 33 in its various positions and the ball 38 is adapted to cooperate with recesses 41 in the hub of arm 28 to yieldably hold shifter fork 29 in its various positions. The balls also have interposed between them a pin 42 which limits their movement toward each other. With this interlocking structure, which is of known construction, when the shifting fork 29 is moved to cause gear [24] 22 to mesh with either of the gears 20 or 23, arm 32 will be prevented from being rotated to move shifting fork 33 from its central position due to the contoured edge of the hub of arm 28 holding the end of the wall of bore 36 seated against two flat surfaces adjacent the central (neutral) recess 40. When the shifting fork 33 is moved in either direction to cause the double clutch element 25 to be in an operative position, the shifting fork 29 will be prevented from moving by the contoured edge of the hub of arm 32 acting on arm 34 to cause the end of the wall of bore 36 to firmly seat against the two flat surfaces adjacent the central (neutral) recess 41.

Figure 33:
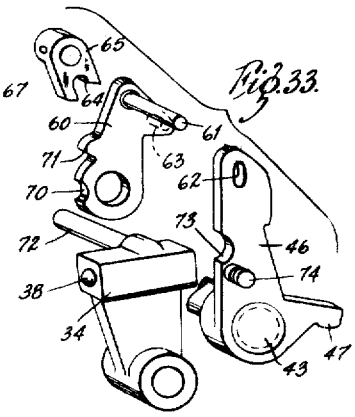
Figure 33 is an exploded view of the interlocking arm and associated lever and arms mounted on the inside of the closure plate.

In addition to the shafts 27 and 31 carried by the closure plate, there are two other shafts 43 and 40 positioned below the shaft 31 and on opposite sides thereof. On the inner end of shaft 44 (see Figures 5, 10 and 12) there is freely mounted a neutralizing lever 45 which extends upwardly to one side of arm 32 on shaft 31. The inner end of shaft 43 has secured thereto a companion neutralizing lever 46 which extends upwardly on the opposite side of arm 32. Lever 46 is shown in perspective in Figure 33. The lever 46 carries an extension 47 which overlies a similar extension 48 on lever 45. Thus, if lever 46 should be moved inwardly from its extreme outer position, lever 45 will also be moved simultaneously inwardly after a predetermined movement of the lever 46 (see Figure 12). However, if lever 46 is moved outwardly from its extreme inner position, lever 45 will not be moved simultaneously therewith.

Figure 10:
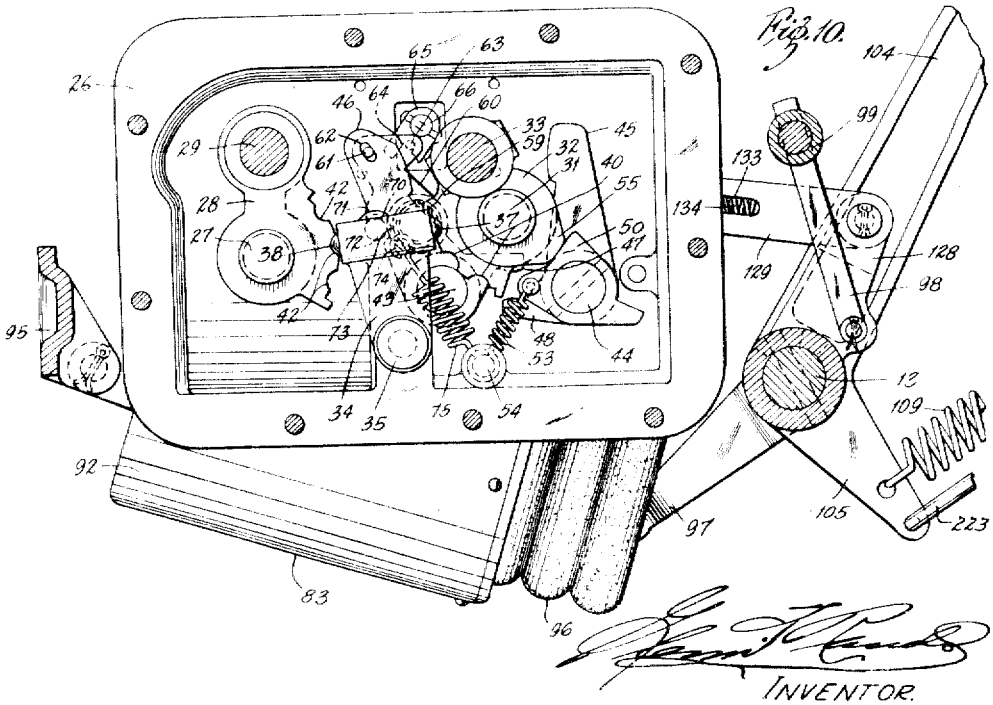
Figure 10 is a view of the parts on the inside of the closure plate showing their positions corresponding to the positions of the parts shown in Figure 9.
Figure 34A:
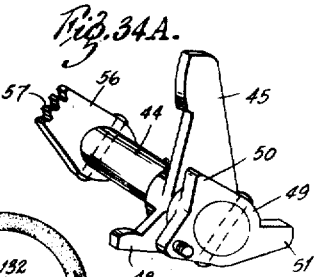
Figure 34A is a perspective view of other parts employed in neutralizing and controlling the alternate moving of the second and high speed shifting fork.
Figure 16:
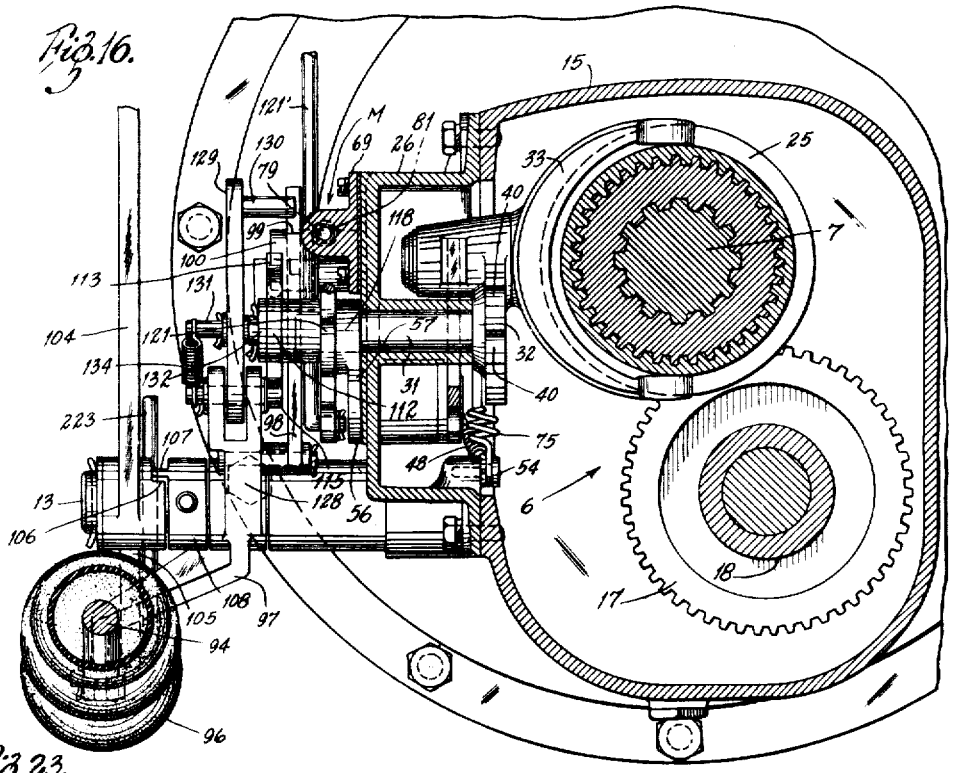
Figure 16 is a view taken on the line 16—16 of Figure 4.

On the inner end of shaft 44 beyond lever 45 there is pinned thereto a member 49 having a projecting cam portion 50 (see Figure 34A). This member is also provided with an extension 51 for cooperation with a stop 52 on the cover plate where it is normally biased by a spring 53 having one end connected to the member and the other to a pin 54 carried by the backing plate. The cam portion 50 in its normal position is adapted to lie in the path of a cooperating cam portion 55 on the lower side of the hub of arm 32 when said arm is moved to cause the second speed ratio to be operated. Figure 10 shows the cam portion 55 in engagement with the cam portion 50. Under these conditions it is seen that the member 49 is rotated against the bias of spring 53, thus rotating shaft 44. Shaft 44 on its end exterior of the cover plate has secured thereto an arm 56 provided with teeth 57, the purpose of which will become apparent.

Figure 12:
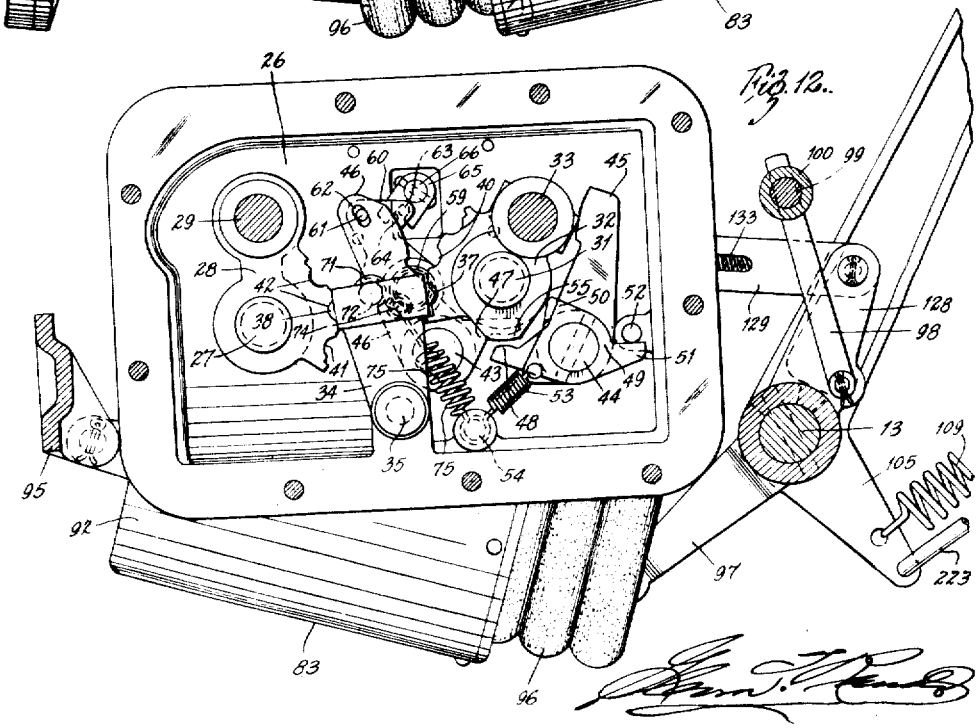
Figure 12 is a view of the parts on the inside of the closure plate showing said parts in their positions corresponding to the positions of the parts shown in Figure 11.

The outer end of shaft 43 to which lever 46 is secured has pinned thereto an arm 58 in order that this shaft may be manually-operated in a manner to be described to thus cause the lever 46 to be moved away from the shifting fork arm 32 or toward said arm. When lever 46 is moved away from the shifting fork arm, as shown in Figures 10 and 12, lever 45 will not be moved. However, as previously mentioned, if lever 46 is moved toward the shifting fork arm to a position engaging it, then lever 45 will also be moved simultaneously toward the shifting fork arm. If the shifting fork arm should be in an operative position; that is, either second or high speed *drive* operative position, then it will be moved inwardly by one of these arms to its neutral position, as shown in Figure 13. Thus there is provided means for neutralizing the gearing if the gearing is in second or high speed *drive* since, as will be described later, shaft 43 is manually-operated.

Figure 23:
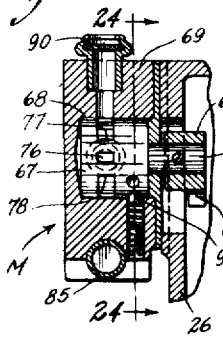
Figure 23 is a sectional view through the main control valve, said view being taken on the line 23—23 of Figure 20.
Figure 24:
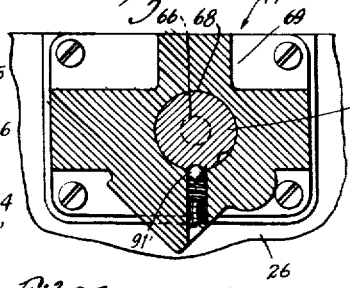
Figure 24 is a sectional view taken on the line 24—24 of Figure 23.
Figure 25:
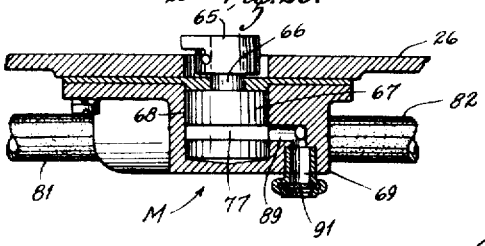
Figure 25 is a sectional view taken on the line 25—25 of Figure 4.

Above shaft 43 there is journaled in the cover plate still another shaft 59 which projects only into the interior of the gearing housing. This shaft has freely journaled thereon an arm 60 which extends upwardly along side lever 46 and carries a pin 61 which projects through a slot 62 in said lever 46. Thus it is seen that lever 46 and arm 60 have their free ends movable in unison but said elements rotate about different axes. The arm 60 also carries a second pin 63 (see Figure 33) which projects into an open ended slot 64 in the end of a short arm 65 secured to a pin 66, said pin being carried by a rotatable valve element 67 (see Figures 23 and 25) mounted in a bore 68 of a valve casing 69 secured to the exterior of the closure plate adjacent the top side. The valve comprising the valve element 67 and the casing 69 constitute parts of the main control conditioning valve for the power-operated shifting means to be described later, this main control conditioning valve being generally designated by the letter "M."

Referring again to Figure 33, the previously mentioned arm 60 has its hub portion provided with a recess 70 and on the body of the arm above this recess is a shoulder 71. The recess 70 is adapted to receive a pin 72 carried by arm 34 of the described interlocking structure. Thus, if the interlock member 34 should be moved forwardly, as viewed from the inside of the closure plate (Figures 10 and 12), pin 72 can engage in the recess and prevent arm 60 from being moved. This forms a lock for the valve element 67. When pin 72 is out of recess 70 so as to [permit] *release* arm 60 to be moved, shoulder 71 will engage the pin and limit the movement of said arm. The lever 46 is also provided with a recess 73 for receiving pin 72 so that said lever can have sufficient movement to move arm 60. A pin 74 is carried by lever 46 to which an over-center spring 75 is connected, said over-center spring assisting to hold lever 46 in its outward position when once placed in said position and assisting in moving the lever inwardly once the lever has been initially moved.

The main control conditioning valve M, previously referred to, is shown in detail in Figures 19 to 25. The cylindrical valve element 67 is provided with a cross-passage 76 and parallel surface slots 77 and 78 on opposite sides thereof. The casing 69 is formed with aligned passages 79 and 80 [of] *with* which the cross-passage 76 of the valve element can align to place these passages in communication with each other. Passage 79 is connected by a flexible conduit 81 to the source of suction which in this instance will be the intake of the engine. The other passage 80 is connected to a flexible conduit 82 which communicates with the rear end of the suction motor 83 which is the power means shown, by way of example, for performing speed ratio changing. The valve casing is also provided with a third passage 84 which enters the bore in the valve casing at an angle to passage 79. This passage 84 is connected by a conduit 85 to the forward end of the suction motor 83. The passage 84 is adapted to be controlled by a small restricting valve element 86 which is normally biased by a spring 87 to such a position that passage 84 will be fully open. If this restricting valve element 86 is moved inwardly, passage 84 will be restricted. The means for controlling the restricting valve element will be described later. The valve casing also has two atmospheric passages 88 and 89, one leading from the top of the bore and the other leading from the lower side of the bore. These passages have associated therewith air vents or filters 90 and 91. A detent 91' cooperates with the recesses in the valve element 67 to hold it in its two positions (*Figures 23, 24*).

Figure 20:
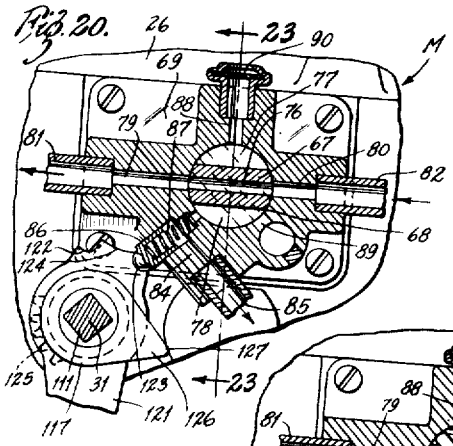
Figure 20 is a view similar to Figure 19 but showing the parts in the positions they assume when the accelerator pedal is fully depressed.
Figure 22:
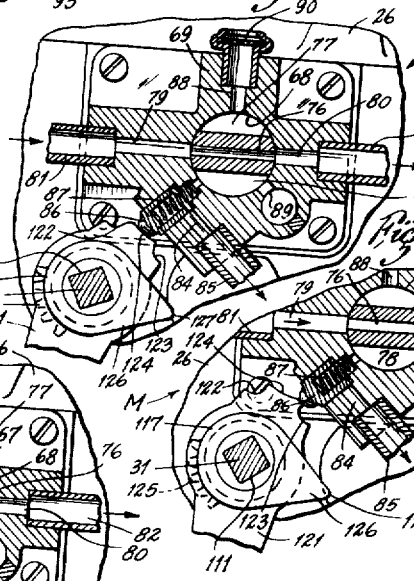
Figure 22 is a view similar to Figure 21 but showing the parts when the accelerator pedal is partially depressed.

In the valve structure described it is seen that when the valve element 67 is in a position to connect passages 79 and 80, the rear end of the suction motor 83 will be placed in communication with the source of suction. The forward end of the suction motor will be in communication with the atmosphere by way of conduit 85, passage 84, open valve element 86, valve element slot 78 and atmospheric passage 89 and vent 91. This position of the valve is shown in Figure 20. If the valve element 67 should be turned to the position shown in Figure 19, then it is seen that the forward end of the suction motor will be connected to the conduit leading to the source of suction and the rear end of the motor connected to atmosphere through passage 88 and vent 90. Suction, however, is not available at the forward end of the motor for reasons which will become apparent.

The power means shown as a suction motor comprises a cylinder 92 in which is reciprocable a member in the form of a piston 93 having a piston rod 94 extending from the forward closed end of the cylinder. The rear end of the cylinder is pivotally mounted on a bracket 95 secured to the end of the gearing housing. The piston rod 94 is enclosed by a dust excluding boot 96 and has its outer end pivotally connected to an arm 97 which is rotatably mounted on the outer end of the clutch shaft 13 extending out of the clutch housing 14. Adjacent the hub of arm 97 is pivotally connected a link 98 which extends upwardly and is slidably received in a slot 99 of a shaft 100 positioned parallel to the clutch shaft 13 and carried by a sleeve 101 secured to the clutch housing (see Figure 17). The inner end of shaft 100 has pinned thereon a collar 102 from which projects a pin 103 positioned off center with respect to the axis of shaft 100. This pin, as shown in Figures 17 and 18, is adapted to engage with the rear side of the upper end of one of the arms of shifting fork 12. Thus it is seen from this structure that if the piston in the power cylinder is moved rearwardly from the forward end, arm 97 will be rotated in a counter-clockwise direction as viewed from the left side of the vehicle, thereby rotating shaft 100 in a clockwise direction and moving link 98 from the position shown in Figure 6 to the position shown in Figure 7. The rotation of shaft 100, although being through only a small angle, will result in pin 103 moving shifting fork 12 to thereby disengage the [main] clutch by moving the slidable *friction* element 10 thereof relatively to element 9.

On the outer end of the clutch shaft 13 is loosely mounted the [manually] *operator*-operated clutch pedal 104 which has a downwardly extending arm 105. The hub of this clutch pedal is provided with a shoulder 106 (see Figure 17) which is adapted to cooperate with a lug 107 carried by a collar 108 pinned to the clutch shaft 13 and interposed between the clutch pedal and the hub of arm 97. When the clutch is engaged and the clutch pedal is in its fully released position, shoulder 106 of the clutch pedal is spaced a slight distance from lug 107 on the collar as shown by dotted lines in Figure 4. This [permits] *provides for* the clutch pedal to have a slight free forward movement before shoulder 106 and lug 107 engage to cause rotation of the clutch shaft. Whenever it is desired to [manually] disengage the clutch, it can be done by merely depressing the clutch pedal and when shoulder 106 engages lug 107, the clutch shaft 13 will be rotated to move the fork 12 so that the clutch will be disengaged. The clutch pedal is held in its released condition by a spring 109 connected between the downwardly extending arm 105 and a pin 110 on the exterior of the clutch housing.

The outer end of shaft 31, which is employed to move the shifting work 33, is provided with a squared portion 111 whereby the double arm lever 112 (shown in perspective in Figure 34 together with other related elements) is secured thereto. The upper arm 113 of this lever is provided with a recess 114 and the lower arm 115 is provided with a recess 116. Positioned on the shaft between the double arm lever 112 and the closure plate are two collars 117 and 118, collar 117 being provided with slots 119 for receiving lugs 120 carried by collar 118, thus causing said collars to be connected together for simultaneous rotation on shaft 31. Surrounding these collars at their point of juncture and freely rotatable thereon is an arm 121 provided on its hub with spaced recesses 122 and 123 between which is a curved surface 124. The recesses and the surface are adapted to cooperate with the restricting valve 86 previously referred to which controls the passage 84 leading to the forward end of the suction motor. When the restricting valve is in either recess 122 or 123, the valve will be fully opened. When it is on the ends of the surface 124, the valve element will be closed by seating against a fiber seat. When the arm is moved so that the valve element moves from the recess 123 to recess 122, the valve will be [permitted to be gradually opened] *controlled so as to gradually open.*

The collar 118 lies just above the arm 56 which, as previously mentioned, is pinned to shaft 44. A portion of this collar is formed with teeth 125 which mesh with the teeth 57 on arm 56. Thus whenever the shaft 44 is rotated collars 118 and 117 will also be rotated thereby. The end of collar 117 which lies adjacent the double arm 112 is formed with a V-shaped cam surface 126 having an apex 127. This V-shaped cam points toward the rear and the apex lies between recesses 114 and 116 on the double arm.

The double arm lever 112 is actuated by the suction motor through arm 97 carried on the clutch shaft. The hub of arm 97 is provided with an upwardly extending arm 128 and pivotally connected to its upper end is a link 129. This link has on its free end a pin 130 for engaging in either recess 114 or 116 of the double arm lever thus causing rotation in opposite directions of the double arm lever and the shaft upon which it is mounted. The pin 130 is of such length as to cooperate with the V-shaped cam 126 which will control the guiding of the pin into the recesses. The link 129 is held in the desired position by means of a pin 131 carried by arm 132 freely mounted on the extreme outer end of shaft 31, said pin extending into a slot 133 running longitudinally of link 129. Between pin 131 and the upper end of arm 128 there is interposed a spring 134 which holds arm 132 in alignment with the line of pull of the spring.

Figure 6:
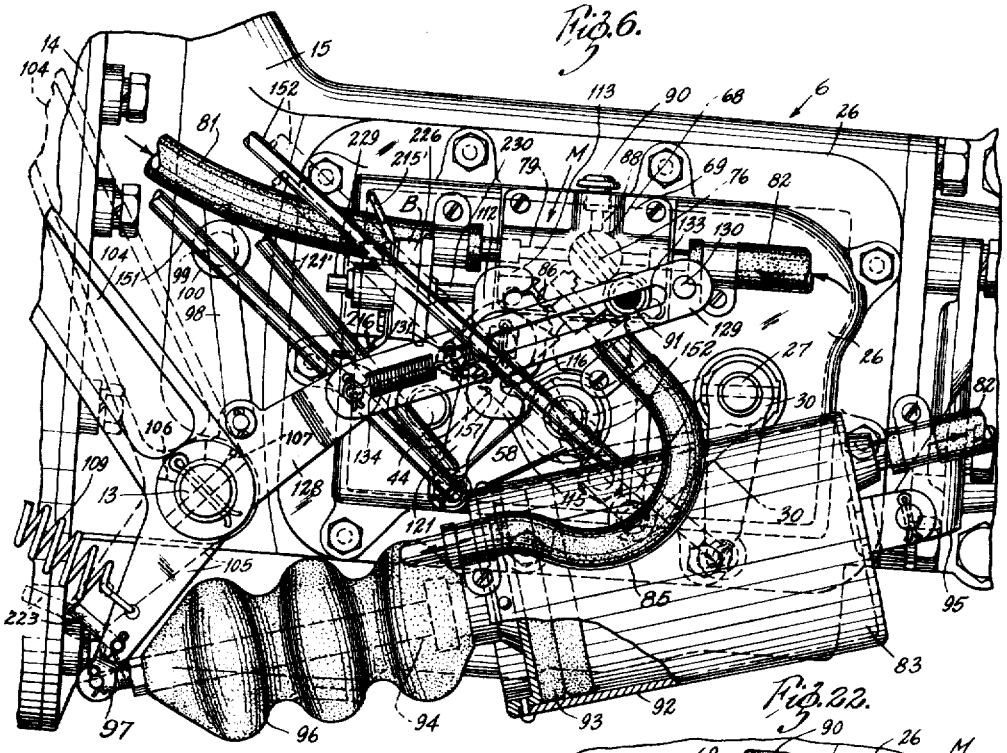
Figure 6 is a view similar to Figure 4 but with the clutch pedal [manually] moved to clutch-disengaged position and the transmission shifted so that low speed ratio *drive* is operative.
Figure 9:
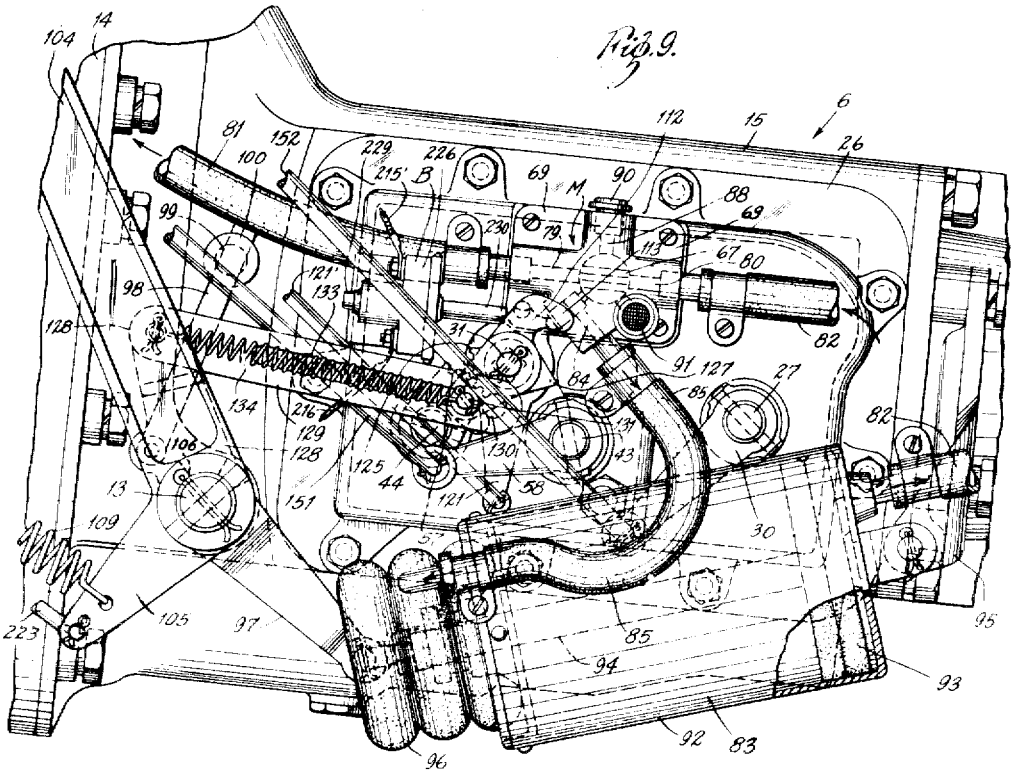
Figure 9 is a view similar to Figure 7 but showing the parts in the positions assumed when the second gear ratio *drive* has been made operative but prior to re-engagement of the [main] clutch.
Figure 11:
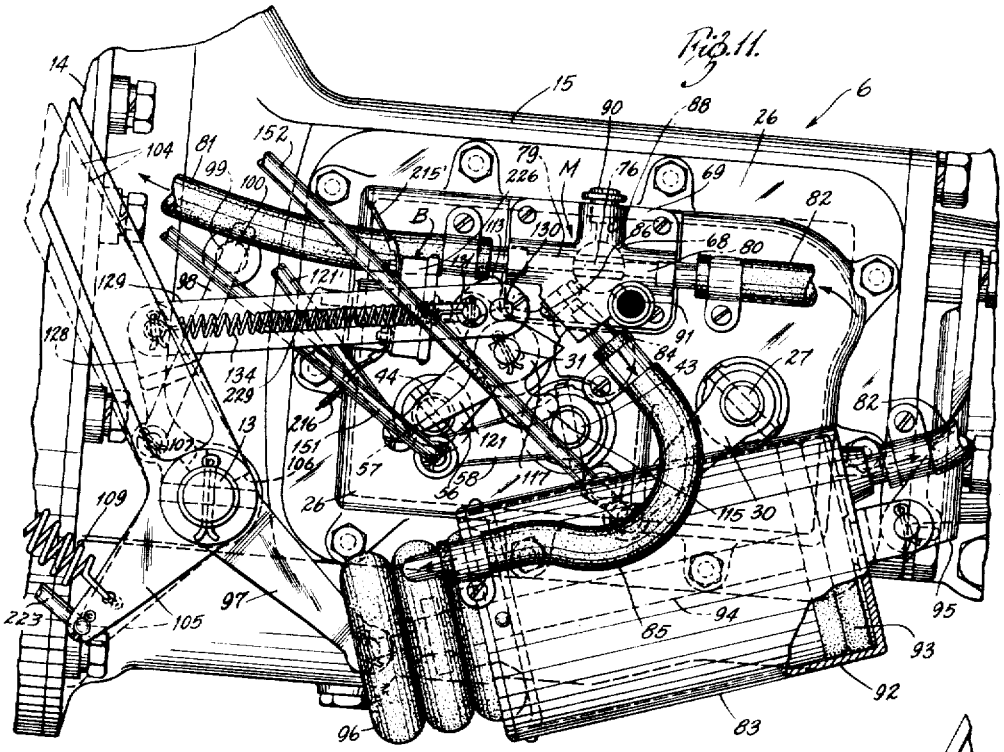
Figure 11 is another view of the parts on the exterior of the transmission showing the positions assumed when high speed ratio (direct-drive) is made operative but prior to the re-engagement of the [main] clutch.

It is apparent from the structure just described that if arm 97 should be rotated in a counterclockwise direction from its inoperative position, as shown in Figure 6, spring 134 will be elongated and link 129 slid forwardly on pin 131. After a predetermined amount of travel of link 129, pin 130 on the extreme end thereof will engage cam 126. If the apex 127 of this cam is above the line of movement of the link, pin 130 will be guided into recess 116 and thus cause rotation of the double arm lever in a clockwise direction to thereby rotate shaft 31 and cause the shifting fork 33 to move clutch element 25 so that the second speed ratio *drive* is operative. The position of the parts when the second speed ratio is operative is shown in Figure 9. If the apex 127 of the cam 126 is below the line of movement of the link, then pin 130 will be guided into the recess 114 and thus cause the link to rotate the double arm lever in a counter-clockwise direction so as to shift the shifting fork and the clutch associated therewith forwardly so as to cause high speed ratio *drive* to be operative. The positions of the parts when high speed ratio is operative are shown in Figure 11. The engagement of pin 130 with either of the recesses 114 or 116 of the double arm lever will not take place until after arm 97 has been so moved by the suction motor that the [main] *friction* clutch 4 will be disengaged.

The arms 30 and 58 which are pinned, respectively, to the outer ends of shafts 27 and 43, are manually actuated by a single handle or lever. This handle 135 is mounted below the steering wheel 136 at the upper end of steering column 137 and secured to the upper end of shaft 138. At its upper end the shaft is journaled in a bracket 139 of the steering column and at its lower end is journaled in a bracket 140 at the base of the steering column. The upper end of shaft 138 carries a pointer 141 which cooperates with an h-slot in a bracket 142 also secured to the steering column on bracket 139 just below the steering wheel. The shaft 138 is capable of slight reciprocable movement and is normally biased to its lower position by a spring 143 interposed between the lower bracket 140 and a washer 144 on the end of the shaft.

The ends of the h-slot are designated by the indicia "Lo," "R" and "Hi" and the central crossover portion is designated by "N." When the pointer 141 is in the cross-over portion of the slot at "N," spring 143 biases shaft 138 downwardly so that the pointer can be moved freely into the end of the slot marked "Hi" by merely [moving] rotating lever 135 upwardly in the plane in which it lies. If it is desired to move the pointer into the ends of the h-slot marked "Lo" or "R," this is accomplished by lifting up on handle 135 to move the shaft upwardly and then [moving it up or down] rotating it down or up, respectively, as desired.

Mounted on the lower end of shaft 138 between the *end* portions of bracket 140, are two arms 145 and 146 having interposed between their confronting hubs a collar 147. The hubs of arms 145 and 146 are provided with slots 148 and 149, respectively, and for cooperation with these slots is a pin 150 carried by shaft 138. The slots 148 and 149 will be in alignment when shaft 138 is in the position [where] *wherein* the pointer is opposite the letter "N." The pin 150 will be in slot 148 due to the position of shaft 138 as controlled by the spring 143. Thus it is seen that under these conditions arm 145 is connected to the shaft and it will be rotated by the shaft when the handle is so moved that the pointer enters the "Hi" end of the h-slot. If the shaft is moved upwardly from the position shown in Figure 3, pin 150 will be positioned in slot 149 and arm 146 can then be rotated by handle 135, its direction of rotation depending upon whether the handle is moved into the end of the h-slot marked "Lo" or the end of the h-slot marked "R." The arm 145 is connected by a link 151 to arm 48 carried by shaft 43 on the transmission cover, and arm 146 is connected on a link 152 to arm 30 by the outer end of shaft 27.

From the manually-operated structure just described it will be apparent that when the handle 135 is moved so that pointer 141 is in the "R" end of the h-slot, gear 22 will be moved rearwardly by the shifting fork 29 so that the change-speed gearing will be in reverse ratio *drive* condition. When the handle 135 is so moved that pointer 141 is in the end of the h-slot marked "Lo," gear 22 will be moved forwardly so as to mesh with gear 20 and thereby place the change-speed gearing in low speed ratio *drive*. When handle 135 is so moved that the pointer is in the end of the h-slot marked "Hi," shaft 43 will be rotated in a [counter-]clockwise direction, as viewed from the exterior of the cover plate. This [counter-]clockwise rotation of shaft 43 will cause the lever 46 pinned thereto on the inside of the closure plate to be moved rearwardly and to the position shown in Figure 12. This movement of the lever will also result in the valve element 67 of the [main] *master* control valve M to be moved so as to connect the rear end of the suction motor *to the conduit 81 leading* to the source of suction [and thereby cause the piston to be moved to the rear end of its cylinder].

Referring now to the carburetor 2 and the mechanism associated therewith and particularly to Figures 35 to 44, said carburetor is provided with the usual intake passage 153 with which is associated the primary butterfly throttle valve 154 mounted on pivot pin 155 and a secondary butterfly throttle valve 156 mounted on pivot pin 157. In order that conduit 81 leading to the suction motor may be placed in communication with the intake manifold at a point below the secondary throttle valve, there is provided a solenoid-controlled valve generally indicated by the letter "S." This valve comprises a casing 158 having a chamber 159 in constant communication with conduit 81. A passage 160 places chamber 159 in communication with the intake passage 153 and a passage 161 places said chamber in communication with the atmosphere by way of passage 162. Passages 160 and 161 are controlled by a single valve element 163 which is mounted on a stem 164 extending through the passages. This stem is connected to the armature 165 of solenoid 166 contained in a non-metallic housing attached by two cap screws to the casing 158. The cap screws also serve to secure the two solenoid terminals in their correct positions and are properly insulated from casing 158 by non-metallic inserts into which the cap screws are threaded and by the mounting flange of the solenoid housing. A spring 167 normally biases the armature of the solenoid, if said solenoid is de-energized, to a position [where] *wherein* valve element 163 closes passage 160 and [permits] *places* conduit 81 [to be] in communication with the atmosphere through passage 161. When the solenoid is energized, the valve element is moved against the action of the spring to a position [where] *wherein* passage 161 is cut off and passage 160 opened so that the conduit 81 can communicate with the intake passage 153 of the carburetor.

Figure 35:
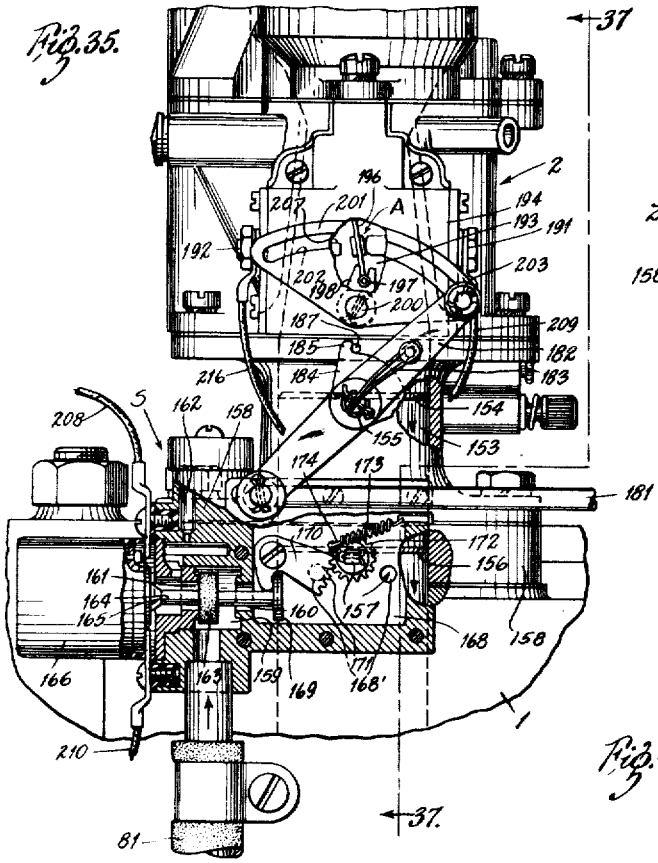
Figure 35 is a view of the carburetor and associated parts including the solenoid-controlled valve for connecting the power cylinder with the inlet passage of the carburetor, the accelerator pedal controlled butterfly valve being in closed position.
Figure 42:
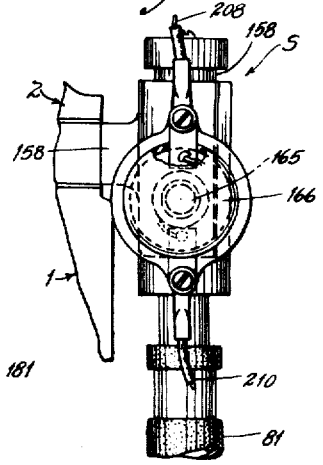
Figure 42 is an end view of the solenoid-controlled valve.
Figure 43:
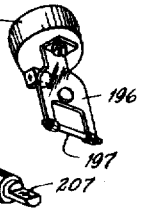
Figure 43 is a perspective view of the piston and the switch element carried thereby which forms a part of the accelerator pedal selector switch.
Figure 44:
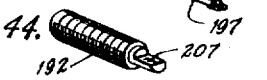
Figure 44 is a perspective view of one of the stationary contacts of the accelerator pedal selector switch.
Figure 36:
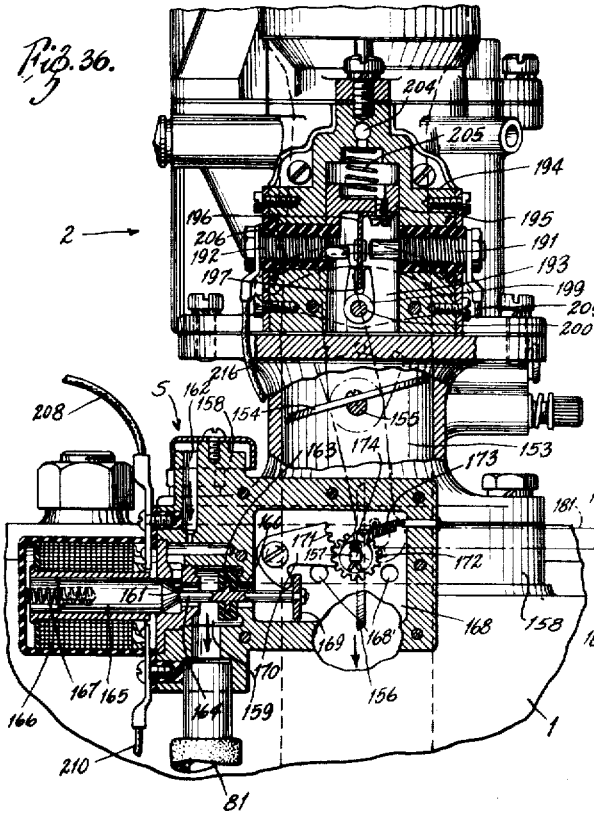
Figure 36 is a view similar to Figure 35 but showing the parts in the positions assumed when the accelerator pedal is depressed.
Figure 37:
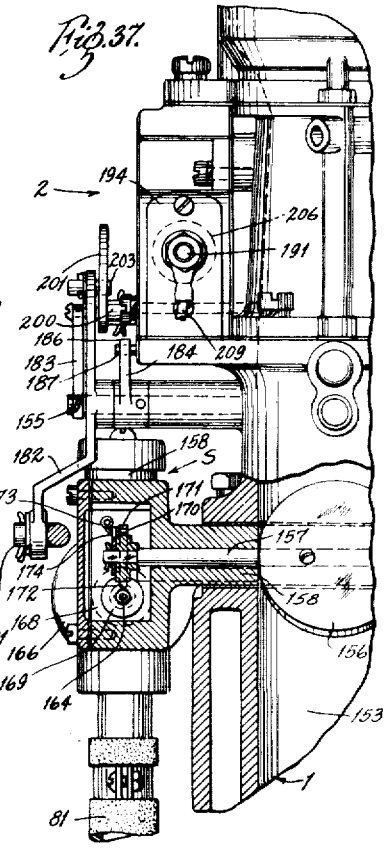
Figure 37 is a view taken on the line 37—37 of Figure 35.

The stem 164 controls the secondary throttle valve by connecting means in chamber 168 which communicates with the intake passage by holes 168'. The inner end of said stem is provided with an enlarged end 169 for operating a lever 170 pivoted to the wall of chamber 168. This lever is formed with teeth 171 for engaging the teeth of a gear 172 fixed to the end of pivot pin 157 of the secondary throttle valve. A spring 173 is connected to an arm 174 on said pin and biases the throttle valve to a normally full open position, as shown in Figure 36. The secondary throttle valve will only be open when the solenoid is de-energized. When the solenoid is energized, as shown in Figure 35, rod 164 will so operate lever 170 that the throttle valve will be moved to a closed position, as shown in Figure 35. Thus, it is seen that when the solenoid-controlled valve S is in such a condition that conduit 81 is in communication with the intake passage, the secondary throttle valve will be closed and thereby insure that the engine will idle and maximum suction effect will be present. Whenever the solenoid is de-energized so as to connect conduit 81 with the atmosphere, the secondary throttle valve will be in full open position and have no effect in controlling the intake passage.

Figure 38:
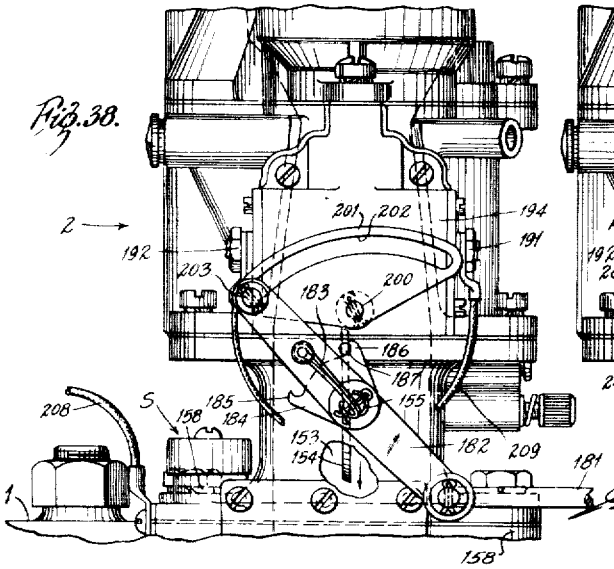
Figure 38 is a view similar to Figure 35 but showing the carburetor butterfly valve in fully open position corresponding to the depression of the accelerator pedal beyond its engine controlling range.
Figure 39:
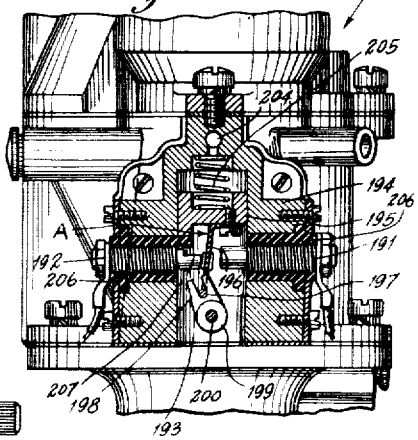
Figure 39 is a view, partly in section, showing the position of the accelerator pedal selector switch when the accelerator is fully depressed.

The primary throttle valve 154 is adapted to be actuated by accelerator pedal 175 pivotally mounted on the floorboard 176 in the operator's compartment of the motor vehicle. The connection between the throttle valve and the accelerator pedal comprises a bell-crank lever 177 pivoted on the engine. One of the arms 178 of said lever is connected to the pedal by a rod 179. Another arm 180 is connected by a link 181 to a lever 182 centrally pivoted on the outer end of pin 155 of the primary throttle valve 154. A third arm 177' is connected by a rod 121' to the previously mentioned arm 121 mounted on collars 117 and 118. The lever 182 carries a leaf spring 183 which forms a yieldable connection between pin 155 and the lever. This yieldable connection is such that valve 154 will be moved simultaneously with the lever between its [fully closed] *idling* position and its fully open position. When it reaches one of these positions, leaf spring 183 will yield to [permit] *provide* the lever 182 [to have an] *with* additional movement relative to the throttle valve 154. The throttle pin has fixed thereto an arm 184 which is provided with spaced shoulders 185 and 186 which cooperate with a fixed stop 187. These shoulders and the stop determine the [closed] *idling* position and *fully* open position of the throttle valve. When the shoulder 185 engages stop 187, the throttle valve will be closed *to idling position* as shown in Figure 35. When shoulder 186 engages the stop, the throttle valve will be *fully* opened as shown in Figure 38.

The bell-crank lever 177 has associated therewith a spring 188 which normally biases a shoulder 189 on the bell-crank lever against a stop 190. When this stop is engaged by the shoulder, the accelerator pedal will be in its fully released position and the throttle valve will not only be held [closed] *in idling position* wherein the shoulder engages the stop 187, but lever 182 will be moved *slightly* beyond the [closed] *idling* position of the throttle valve and the leaf spring 183 flexed, all as shown in Figure 35. When the accelerator pedal is depressed [completely] *substantially* to the floorboard, the throttle valve 154 will be fully open and lever 182 will be moved relatively to the throttle valve as [permitted] *accommodated* by the flexing of lead spring 183. This condition is shown in Figure 38. Thus it is seen that the accelerator pedal is capable of a limited movement at each end of its path of movement which movement will not affect the operation of the throttle valve. In other words, the throttle valve will be closed *to idling position* before the accelerator pedal is completely released and the throttle valve will be fully opened before the accelerator pedal actually reaches [the floorboards] *fully depressed position.*

This limited movement of the accelerator pedal without operation of the throttle valve is employed to control a double switch which is associated with the carburetor, generally indicated by the letter "A" and hereinafter referred to as the accelerator pedal selector switch. This selector switch is capable of controlling two circuits and comprises two terminals 191 and 192 extending into a bore 193 in casing 194 mounted on the side of the carburetor above the primary throttle valve 154. These terminals 191 and 192 are insulated from the casing as shown in Figure 36. Within the bore 193 is a piston 195 carrying on its head a downwardly extending flexible conductor element 196 which is adapted to selectively engage with the inner ends of the two terminals, said terminals being spaced apart such a distance that the element 196 can be positioned between them without contacting either one. The free end of the flexible contact element 196 is forked and carries a cross-pin 197 adapted to be received between the prongs of the forked end 198 of lever 199 pivotally secured to a shaft 200 extending to the exterior of the bore. Secured to the outer end of this shaft is a plate 201 having an arcuate slot 202 therein. Slot 202 receives pin 203 carried on the upper end of lever 182 which operates the throttle valve 154. The plate 201 is normally held in its central position by contact element 196 carried by piston 195, and when the plate is in this position the slot 202 is of such length and so arranged that the throttle valve 154 may be moved by lever 182 and the accelerator pedal to its fully open or [fully] *idling* [closed] position without the pin 203 engaging an end of the slot. If, however, the lever 182 is [caused] *desired* to move beyond the [closed] *idling* position of the throttle valve 154 [as would be the case if] the accelerator pedal is fully released, *then* pin 203

[will] *would* engage the right hand end (as viewed from the exterior) of the slot 202 and cause a clock-wise rotation of the plate and the shaft 200. This will result in contact element 196 being flexed so that it is brought into contact with terminal 191, thus closing a circuit to be later described. If the accelerator pedal should be *fully* pressed [completely to the floorboard] and to a position [beyond that] *corresponding substantially* [required] to full[y] open *position of* the throttle valve 154, *then* pin 203 [will] *would* engage the left hand end of slot 202 and so rotate plate 201 that the flexible contact element 196 will be brought into contact with terminal 192, thereby closing a circuit which will also be later described. [This closing of the circuit is shown as taking place when the accelerator pedal is moved to a position beyond full open position of valve 154, but such circuit closing can be accomplished at any point which is substantially near the full open position of valve 154.] *The closing of the two circuits aforesaid as described as taking place beyond the extremes of the operation of the carburetor valve 154. This is not intended to be a limitation, as the slot 202 may, for example, cause circuit closing to be made at a position substantially near the full open position of the valve 154. The length of the slot 202 determines the positions in the accelerator pedal stroke at which the switch operations occur, as is evident from the drawing, and the choice of positions for the ends of the slot may be considered in the light of the reasonable equivalents, in the patent sense, of the disclosure.*

The end of bore 193 above piston 195 is connected by a passageway 204 with the intake passage of the carburetor above the throttle valve 154. A spring 205 normally biases piston 195 downwardly and against the inner end of insulation 206 of terminal 192. When the piston is caused to move upwardly against the bias of spring 205, as would be the case if a certain degree of suction were present in the portion of the bore above the piston, the contact element 196 will be raised with the piston, such position being shown in Figure 41. Under these conditions the inner end of the terminal 192 cannot be contacted by the contact element 196 due to the fact that the inner end of said terminal 192 is cut away, as shown at 207 in Figure 44, so that the contact element can move over the top of said terminal. The end of the other terminal 191 is not cut away and it, of course, can be engaged by the contact element in all positions of the piston. Since the carburetor is made of conducting material, contact element 196 will always be connected with ground.

The solenoid-operated valve S is adapted to be controlled by two circuits which are generally indicated [by] *as* the circuits "X" and "Y." The circuit X includes a clutch pedal controlled switch "C" and the portion of the accelerator pedal selector switch A comprising the terminal 191 and the contact element 196. The circuit X, which is best shown in Figure 49, includes a conductor 208 leading from the solenoid to the switch C. A second connector 209 leads from switch C to the terminal 191 of the accelerator selector switch. The other terminal of the solenoid is connected by a conductor 210 to the usual junction box 211 of the automobile ignition system. This junction box is in turn connected in the usual manner by conductors 212 and 213 to battery 214, there being an ignition switch 215 interposed between conductors 212 and 213. Since one terminal of the battery 214 is grounded, as is also the contact element 196 of the selector switch, it is seen that the circuit will be closed and the solenoid energized if the ignition switch is closed, switch C closed, and contact element 196 is in engagement with terminal 191.

The other circuit Y for the solenoid includes a limit switch generally indicated by the letter "B" and mounted on the forward end of the closure plate. One terminal of this switch B is connected by a conductor 215' to conductor 208 leading to the solenoid. The other terminal of said switch is connected by a conductor 216 with terminal 192 of the accelerator selector switch A. The rest of this circuit from the solenoid to the battery is the same as circuit X and comprises the conductor 210, junction box 211, conductors 212 and 213, and the ignition switch 215. Thus it is seen that if the switch B is closed and contact element 196 is in engagement with terminal 192, the circuit Y will be closed and the solenoid energized.

The clutch pedal controlled switch C, which is mounted on the engine, is shown in detail in Figures 30 and 31. This switch comprises a casing 219 in which is mounted a shaft 220 carrying a cam 221 of non-conducting material. The outer end of the shaft carries an arm 222 which is connected by a link 223 with the previously referred to downwardly extending arm 105 on the clutch pedal. The casing 219 carries a fixed terminal 224 insulated from said casing and connected to conductor 208. The casing also carries a yieldable terminal 225 which lies between cam 221 and the fixed terminal 224, said yieldable terminal being connected to the conductor 209. When the clutch pedal is in its fully released position, which is determined by the pull of spring 109 when the foot is off the pedal, terminals 224 and 225 of the switch C will be disengaged and the switch will be open. If the clutch pedal is depressed slightly, as indicated by the dotted line position shown in Figure 1, cam 221 of the switch will be so moved that the contacts will be closed, thus closing switch C. The cam is so formed that the switch will remain closed when the clutch pedal is moved beyond the position indicated in dotted lines as in Figure 1. It is only when the clutch pedal is in fully released position that the switch C is open.

The *limit* switch B, which forms part of circuit Y and is mounted on the closure plate, is shown in detail Figures 26 to 29. This switch is adapted to be so mounted as to be actuated by the upper arm 113 of the double arm lever 112 secured to the end of shaft 31 and, as previously described, employed in moving the shifting fork 33. The switch B comprises a casing 226 to which is secured a stationary contact element 227 which has connected thereto conductor 215'. Also secured to the casing is a second stationary contact element 228 which has connected thereto conductor 216. Within the casing are two telescopically arranged elements 229 and 230, the element 229 carrying conductor element 231 which projects on opposite sides thereof for engaging contact elements 227 and 228 to electrically connect conductors [215] *215'* and 216. The elements 229 and 230 are supported in the casing for relative sliding movement by having their outer ends extending through the walls of the casing. A spring 232 biases elements 229 to the position where contact 231 will be disengaged from contacts 227 and 228, such condition being shown in Figure 27. The element 230 has its outer end in a position to be engaged and actuated by arm 113 of the double arm lever 112. A spring 233 is interposed between the two elements and normally maintains the element 230 biased outwardly. This spring 233 is weaker than spring 232. The arrangement is such that when double arm lever 112 is in a position corresponding to the neutral position of shifting fork 33 or in a position corresponding to high speed operative position, switch B will be closed. The neutral position of the double arm lever 112 is shown in full lines in Figure 26 and the high speed position is shown in the dotted line position of the same figure. When the double arm lever 112 is in a position corresponding to second speed ratio, as shown in Figure 27, switch B will be opened under the action of spring 232 thereby breaking the circuit Y with consequent de-energizing of the solenoid-controlled valve S to enable automatic re-engagement of the clutch 4 under certain conditions hereinafter fully detailed. Spring 233 will also expand to cause the telescopic element 230 to follow up arm 113 of the double arm lever. When the double arm lever is in its neutral position or high speed condition, spring 233 will be so compressed by the inward movement of the telescopic element 230 that spring 232 will also be compressed sufficiently to place the movable contact element 231 in engagement with the stationary contacts 227 and 228.

*Operation of control system*
*(Figures 1–49)*

Referring to the operation of the change-speed gearing control means just described in detail, the change-speed gearing will be in neutral condition when the parts are in the position shown in Figures 1, 2, 3, 4, 5 and 13. Under these conditions it is to be noted that the accelerator pedal is in fully released position as is also the clutch pedal. The [main] *friction* clutch *4* will, therefore, be disengaged. The sliding gear 22 in the gear box will be disengaged from both the gears 20 and 23 and the double clutch element 25 will be at its central position between gears 16 and 24. Thus, although the engine may be driving the gear 16 and the countershaft gears, power cannot be transmitted to the driven shaft 7. The two companion neutralizing levers 45 and 46 will be in their innermost positions adjacent the shifting fork arm 32, such positions being shown in Figure 5. The [main] *master* control valve M will be in the position shown in Figure 4 wherein the rear end of the suction motor will be connected to atmosphere and the forward end of the suction motor will be in communication with conduit 81 leading to the manifold. The manifold will not be connected to the conduit due to the fact that the solenoid is not energized and valve element 163 is in the position shown in Figure 36. The solenoid is not energized due to the fact that the clutch pedal controlled switch C is open. When the gearing is in neutral position, gear shifting handle 135 and the pointer associated therewith are in the positions shown in Figure 3.

When the change-speed gearing is in neutral and it is desired to place it in reverse gear ratio, the [main] clutch pedal is *fully* depressed by the foot [to the floorboard] to thereby [manually] disengage the [main] clutch *4*. When this is done, the shoulder 106 on the clutch pedal picks up lug 107 and so rotates the clutch shaft 13 that the shifting fork 12 will perform the clutch disengaging operation. With the clutch disengaged, handle 135 is pulled upwardly and then moved so as to place the pointer 141 in the end of the h-slot marked "R." This will cause arm 146 at the bottom of the steering column to be connected to shaft 138 and so rotated that the shifting fork 29 will move gear 22 rearwardly into mesh with the idler gear 23. When the clutch pedal is now released, the vehicle will drive in reverse gear ratio. It is to be noted that during the depressing of the clutch pedal, switch C will be closed, thus closing circuit X (contact element 196 being in engagement with terminal 191 due to the accelerator pedal being in fully released position). Although the solenoid 166 is energized and valve element 163 moved to such a position that conduit 81 will be in communication with the intake passage, the suction motor will not be operated since the control conditioning valve M, interposed in the conduit 81 between valve element 163 and the suction motor is [closed] *in the position of Figure 19, and ports vacuum to the forward end of the suction motor.* It is also to be noted that the depressing of the clutch pedal to disengage the clutch does not cause any movement of the piston of the suction motor.

When it is desired to place the gearing in low speed ratio, the clutch pedal is [manually] depressed to the floorboards, thereby disengaging the [main] clutch *4*. The handle 135 is then manipulated to place the pointer in the end of the h-slot marked "Lo." This will result in shifting fork 29 moving gear 22 into mesh with gear 20. (If reverse ratio has previously been operative it will be made inoperative by the moving of handle 135.) When the [main] clutch *4* is released, the vehicle may be driven forwardly with low speed operative by depressing the accelerator pedal in the usual manner. *As with reverse, the power cylinder is held inoperative during first gear operation.*

To obtain second speed ratio, the [main] clutch *4* is again disengaged by depressing the clutch pedal. Next, the handle 135 is moved to place the pointer 141 in the end of the h-slot marked "Hi." (If the gearing is in low speed ratio, this movement of the handle will first cause disengagement of gear 22 from gear 20. When the pointer is opposite the cross-over portion of the slot marked "N," shaft 138 will be pulled downwardly by spring 143 to thereby cause it to be connected with arm 145. As pointer 141 is moved into the end of the h-slot marked "Hi," arm 145 will be so rotated as to cause shaft 43 journaled in the closure plate to have a clockwise rotation, as viewed from the exterior of the closure plate. This rotation of shaft 43 will cause lever 46 within the closure plate to be swung rearwardly to the position shown in Figure 8. The neutralizing lever 45 will not be moved. [Final movement of lever 46 beyond its gear ratio neutralizing range of movement will also cause lever 60 to be rotated therewith and due to its connection with valve element 67 of the main control valve M by means of arm 65, this valve element will be placed in the position shown in full lines in Figures 20, 21, and 22. This position of the valve element will result in the rear end of the suction motor being connected to the intake passage and the source of suction. As already noted, the depressing of the clutch pedal will close switch C, thereby closing the circuit X and causing the solenoid controlled valve to be in the position shown in Figure 37 wherein conduit 81 communicates with the intake passage through the open restricting valve 86. The forward end of the suction motor will be connected to atmosphere.] *The lever 46 has initial movement within what may be called its neutralizing range. Its function in this range will appear hereafter. During its movement, the lever 46 rocks the associated lever 60. When the lever 46 has been rocked beyond the neutralizing range, it will have caused the lever 60 to move the pin 63 from the position of Figure 5 to a position of engagement with the forked arm 65. Thereafter, additional movement of the levers 46 and 60 will rock the arm 65 to shift the valve 67 from the position of Figure 19 to the position of Figure 7, thereby putting the back end of the power motor in communication with the conduit 81 that leads to the carburetor. As already noted, the depressing of the clutch pedal will close switch C, thereby closing the circuit X (the accelerator pedal being released) and causing the solenoid-controlled valve S to be in the position shown in Figure 35 wherein conduit 81 communicates with the intake passage through the open valve 163. This also closes the supplemental throttling valve 156, assuring a high vacuum in the vacuum passage of the intake, at the moment it is needed. The forward end of the suction motor will be connected to atmosphere, since the accelerator pedal is released and the restricting valve is in its open position shown in Figure 20.* Thus it is seen that the piston of the suction motor will be moved rearwardly by the differential pressure acting thereon.

When the movement of the piston of the suction motor reaches a point toward the end of the cylinder which is substantially two-thirds of the length of the cylinder, arm 97 will be so rotated that arm 128 extending upwardly therefrom will have moved the link 129 to the position shown in Figure 7. This will bring pin 130 on the end of said link 129 to the position where it is about to contact the V-shaped cam 126. This cam will be in the position shown in Figure 7 so that the apex 127 lies above the path of the line of movement of the pin. The reason that the cam is in this position is that shaft 44 normally rests in the position shown in Figure 5 when the gearing is in either neutral position or in low or reverse position. Under these conditions arm 32 which carries the shifting fork 33 is in neutral position.

It is to be noted that the position of the V-shaped cam 126 is controlled by the position of shaft 44 due to its geared connection thereto through arm [52] *56* and the cooperating teeth thereon and on the collar 118, which collar is connected to the collar 117 having the V-shaped cam. Thus, with the V-shaped cam in the position shown in Figure 4, the continued movement of the piston of the suction motor to the end of the cylinder will result in the pin on link 129 being guided into recess 116 of the double arm lever 112 and thereby connected to arm 115 of said double arm lever. The double arm lever will be given a clockwise rotation, thereby rotating shaft 31 and causing the shifting fork 33 to move the double clutch element 25 rearwardly and cause the second speed gear 24 to be clutched to the driven shaft. The gearing will thus be in second speed ratio.

As shaft 31 is rotated to move the shifting fork, arm 32 on said shaft (which arm carries the shifting fork) will be moved rearwardly from its neutral position shown in Figure 8 to a position shown in Figure 10. The movement of arm 32 will cause cam 55 at the bottom thereof to contact cam 50 carried by the member 49 on shaft 44 and thereby rotate said shaft 44 in a clockwise direction, as viewed in Figure 8 from inside the closure plate, and to the position shown in Figure 10. The rotation of shaft 44 will, by means of arm 56 and gear teeth 57 and 125, cause such a clockwise rotation (as viewed from the exterior of the closure plate) of collar 117 and V-shaped cam 126 that its apex 127 will lie below the path of movement of pin 130 on the end of link 129. The positions of the parts on the exterior of the closure cover after the shift to second speed ratio has been made are shown in Figure 9, said [main] clutch *4* still being in disengaged position.

*In the foregoing movement of the power piston rearwardly, the arm 97 rocks the arm 128, not only to actuate the link 129, but also to rock the arm 98 that in turn rocks the shaft 100 and the pin 103 into clutch disengaging position. As the clutch was personally disengaged, such action has no immediate function. However, the clutch cannot be re-engaged until the power piston has returned to its starting position, and has withdrawn the pin 103 to its position wherein clutch engagement can occur. The long slot 133 in the link 129 provides for the clutch disengagement to be produced in the first phase of movement of the power piston, thus assuring a disengagement of engine and transmission at the time the gear shifting is produced in the last phase of power piston movement.*

Figure 19:
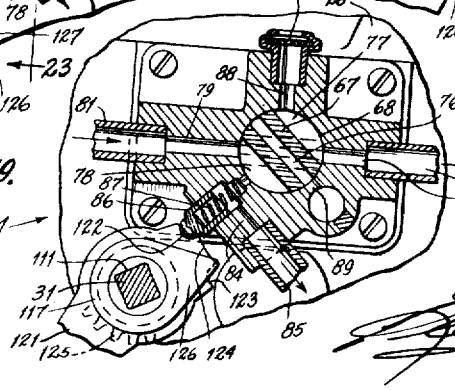
Figure 19 is an enlarged partial sectional view of the main control conditioning valve and the restricting valve controlled by the accelerator mechanism, the parts having the positions assumed when the throttle is fully closed.

If the foot is now removed from the [main] clutch pedal *104* and the accelerator slightly depressed, the clutch will be automatically re-engaged and with the proper smoothness. The removal of the foot from the clutch pedal will [permit] *release* the clutch pedal to assume its fully released position without [permitting the main clutch to become] *the clutch 4 becoming* engaged. When the clutch pedal is fully released, the switch C will be [open and] *opened, or when the accelerator pedal is slightly depressed the switch A is opened, and in either case is* the circuit X broken. The solenoid will thus be deenergized and the forward end of the suction motor caused to be connected to the atmosphere as a result of the solenoid-controlled valve element 163 assuming the position shown in Figure 36. This is brought about as follows:

It is to be noted that when the accelerator pedal is in fully released position, arm 121, freely rotatable on shaft 31, is in the position shown in Figure 1 and also as shown in Figure 19. The restricting valve 86, which is controlled by the lever, is in full open position. As the accelerator pedal is depressed, the circuit X will be broken and the solenoid valve S [allowed] *operated* to connect the suction motor to atmosphere *and at the same time enable the auxiliary throttle valve 156 to open and restore control of the engine to the main throttle valve 154.* This same depressing of the accelerator will also cause arm 121 to be moved and the end of the restricting valve 86 will be pushed out of recess 122 and onto the surface 124, thus causing the restricting valve to assume closed position against its fiber seat. Since the forward end of the suction motor has been connected to atmosphere, the closing of this restricting valve will result in the air which is in the forward end of the suction motor to be trapped and then as the accelerator pedal is continued to be depressed to be slowly bled to the atmosphere due to the opening of the restriction caused by said valve. Thus the piston of the suction motor will be pulled slowly [forward] forwardly by the action of the clutch engaging spring 11 so that the elements of the clutch will be smoothly engaged. The movement of the piston of the suction motor controls the re-engagement of the [main] clutch and this re-engagement is effected through the link 98 and shaft 100 which is parallel to the [main] clutch shaft 13. Due to the leverage arrangement shown, the clutch engaging spring 11 must first act through a very low leverage to pull the piston of the suction motor toward the forward end of the cylinder. It is to be noted by reference to Figure 17 that this clutch engaging spring must act through the short arm between pin 103 and the axis of shaft 100 and also through the short arm between the pivotal connection of link 98 and the axis of arm 97. This leverage, however, results in the reverse condition when the piston 93 disengages the clutch. When the clutch becomes fully engaged, the vehicle will be moving forward in second speed ratio.

When it is desired to place the change-speed gear in high speed ratio, all that is necessary to be done is to fully release the accelerator pedal 175 and to slightly depress the clutch pedal to the extent shown in dotted lines in Figure 1. It will not be necessary to do anything with the gear shift handle 135 as it will remain in the position where the pointer is in the end of the h-slot marked "Hi." When the accelerator pedal is fully released, the yieldable contact element 196 of the selector valve A will engage the terminal 191. Slight depressing of the clutch pedal will close the switch C. The circuit X will now be closed and the solenoid energized so as to cause the [solenoid] control valve element 163 to be moved to the position shown in Figure 35 *wherein the auxiliary throttle valve 156 is closed to assure high vacuum at the port 160, irrespective of the throttling action of the main valve 154.* The rear end of the suction motor will thus be connected to the intake passage and piston 93 thereof moved to the rear end of the cylinder. The movement of the piston over two-thirds of the length of the cylinder will result in disengagement of the [main] clutch *4* by means of arm 97, link 98, shaft 100 and the eccentric pin 103 which cooperates with the rear side of one of the arms of the clutch fork 12.

As soon as the clutch is disengaged, pin 130 of link 129 will be moved into engagement with the V-shaped cam 126 and since the apex thereof is below the path of movement of the pin, as shown in Figure 9, the pin will be guided into the recess 114 and engage with arm 113 of the double arm lever 112. Continued movement of the suction motor piston to the rear end of the cylinder will rotate shaft 31 and cause the shifting fork 33 to move the double clutch element 25 from the position where the gear 24 is clutched to the driven shaft 7 to the position [where] *wherein* the driven shaft is directly connected to the driving shaft 5. This will place the change-speed gearing in high speed ratio. The movement of the shifting fork 33 to the position shown in Figure 12 will result in cam 55 on the bottom of said arm 32 [to be] *being* moved away from cam 50, thus [permitting] *releasing* spring 53 to rotate shaft 44 in a counter-clockwise direction, as viewed from the inside of the cover plate (Figure 12) in order to reset the V-shaped cam 126 on shaft 31 so that the apex 127 lies above the normal line of travel of pin 130 on the end of link 129. The position of the cam 126 is shown in Figure 11, wherein the [main] clutch has been disengaged and the high speed ratio has just been caused to be operative as a result of the movement of the piston [on] in the suction motor to the rear end of the cylinder.

When the foot is taken off the clutch pedal *104*, [and it is permitted to assume] *the spring 109 will operate it to* fully released position, and *with* the accelerator [is] depressed, the [main] clutch *4* will be engaged in the same manner as previously described in connection with obtaining second speed ratio. Release of the clutch pedal will open the switch C, thereby breaking the circuit X and depressing of the accelerator pedal will speed up the engine and cause a smooth engagement of the [main] clutch by a slow return of the piston of the suction motor to the forward end of its cylinder.

With the change-speed gearing in high speed ratio, the apex of cam 126 will be so positioned that if the suction motor is again operated, the change-speed gearing will be shifted from high speed ratio back to second speed ratio. If second speed ratio is desired, all that need be done is to release the accelerator pedal *175* and slightly depress the clutch pedal *104*. This will cause a shift to be made back to second speed ratio. Release of the clutch pedal and depressing of the accelerator pedal will re-engage the [main] clutch *4* and the vehicle can then be driven in the second speed ratio. To go back to high speed ratio, the same procedure is carried out. Thus it is seen that when the gear shift lever has once been placed so that the pointer is in the end marked "Hi" of the h-slot, second and high speed ratio may be alternately obtained at will without the necessity of moving the gear shift handle 135. All that need be done to make a shift is to release the accelerator pedal *175* and slightly depress the clutch pedal *104* and then remove the foot from the clutch pedal.

If the car should be brought to a stop when the change-speed gearing is in high speed ratio and it is desired to proceed in second speed ratio, second speed will automatically be obtained as soon as the clutch pedal is released. When the vehicle is brought to a step, it is only necessary to depress the clutch pedal a small amount in order to disengage the [main] *friction* clutch *4*.

In addition to being able to change the gearing from high speed ratio to second speed ratio by releasing the accelerator pedal and slightly depressing the clutch pedal and then releasing it, this shift may be accomplished solely by *substantially fully* depressing the accelerator pedal [to the floorboard]. When this is done, the contact element 196 will be caused to engage terminal 192, thus closing the circuit Y. It is to be noted that when the gearing is in high speed ratio, the double arm lever 112 is in such position that the limit switch B mounted on the closure plate is closed. The closing of the circuit Y energizes the solenoid and so operates the [solenoid] control valve S that the rear end of the suction motor will be placed in communication with the *engine inlet*-manifold and the piston operated. The movement of the piston of the suction motor to the rear end of the cylinder first disengages the clutch and then operates the double arm lever so as to shift the double clutch element 25 from the high speed operative position to the second speed operative position which shifting operation causes switch B to be opened thus breaking circuit Y enabling the clutch 4 to re-engage automatically.

Figure 21:
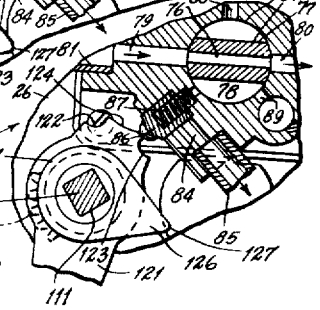
Figure 21 is a view similar to Figure 20 but showing the parts when the accelerator pedal is initially released from a fully depressed position.

The operation of the solenoid to place the [solenoid] control valve *element 163* in the position shown in Figure 35, also results in [the secondary butterfly valve 56 being closed] *closure of the secondary butterfly valve 156 to idle the engine during gear-changing operation.* Therefore, it is seen that the intake passage is closed, notwithstanding the fact that the main primary butterfly valve controlled by the accelerator pedal is in open position due to the fact that the accelerator pedal has been moved *substantially* to the floorboard. [Release of the accelerator pedal will now cause the circuit Y to be broken by a movement of the contact element 196 out of engagement with terminal 192]. As soon as [this] circuit Y is broken, the solenoid will be de-energized and both ends of the suction motor connected to atmosphere since the forward (leftward) end is already connected to atmosphere via the open restrictive valve 86 as shown in Figure 20 by reason of the accelerator being held in its fully depressed position. The [main] clutch *4* will now [then] become re-engaged automatically under the action of its engaging spring. When the accelerator pedal is *fully* depressed [to the floorboard], lever 121, which controls the restricting valve 86, will be in the position shown in Figure 20. [The restricting valve is thus in open position]. If [When] the accelerator pedal is initially released, the restricting valve will be closed as shown in Figure 21. Further release of the accelerator pedal places the restricting valve in the position shown in Figure 22. Thus it is seen that if [during the release of] the accelerator pedal is released immediately following engagement of second speed drive in response to fully depressing the accelerator, re-engagement of the clutch 4 is brought under the control of the accelerator due to the conduit 85 through which the air in the forward end of the suction motor is forced to atmosphere being [is] restricted by closure of the valve 86, thereby slowing up the clutch engaging movement of the piston 93 so as to cause a smooth engagement of the clutch. The control of the restricting valve is the same when the accelerator pedal is being released from its fully depressed position as when the accelerator pedal is moved from its fully released position in an engine accelerating direction.

The ability to cause a "kickdown" shifting operation as just described from high speed ratio to second speed ratio by fully depressing the accelerator pedal [to the floorboard] is very advantageous when it is desired to make a quick shift to second speed ratio in climbing a hill or in going around another vehicle. It is also very convenient in obtaining second speed ratio whenever it is desired. For example, if the vehicle is brought to a stop in second speed ratio and it is desired to start again in second speed ratio, this can be done by fully depressing the accelerator pedal. If this were not done, the shift would be made to high speed ratio upon release of the clutch pedal which, of course, would not be the speed ratio desired.

Figure 40:
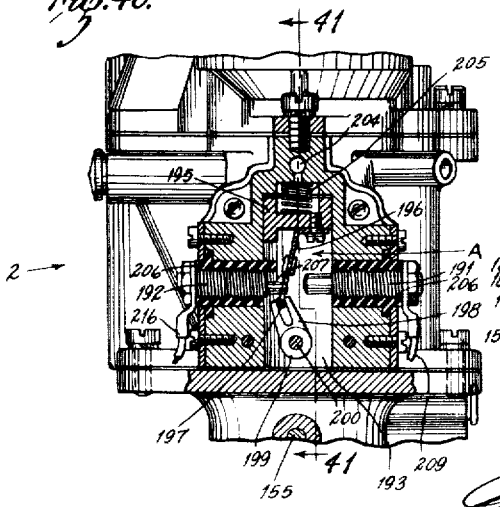
Figure 40 is a view similar to Figure 39 but showing the movable element of the switch moved upwardly, the position assumed when the engine operates at a predetermined speed.
Figure 41:
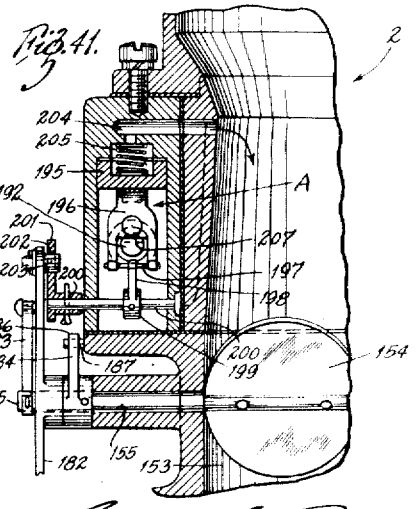
Figure 41 is a sectional view taken on the line 41—41 of Figure 40.

The shifting of the change-speed gearing from high speed ratio to second speed ratio by *fully* depressing the accelerator pedal [to the floorboard] can only be accomplished when the speed of the vehicle is below a predetermined speed such as, for example, 35 or 40 miles per hour. This limitation on such method of shifting is accomplished by means of piston 195 upon which the contact element 196 of the selector switch A is mounted. The piston 195 will be moved upwardly when the throttle valve opening and the speed of the engine are such that the velocity of the carbureted mixture through the intake passage will create a sufficient sub-atmospheric pressure in the upper end of the bore that a differential fluid pressure will be acting on the piston to move it in said upwardly direction. The differential fluid pressure to create the movement must be great enough to overcome the bias of the spring 204. Figure 36 shows the piston in its lower position and Figure 40 shows it in the upper position. When the piston is in the upper position the contact element 196 cannot engage the terminal 192 and, therefore, regardless of whether the accelerator pedal is *substantially fully* pressed [to the floorboard], the circuit Y cannot be closed and thus no shift can be made. By putting this limitation on the ability to shift to second speed ratio by fully depressing the accelerator pedal, there is no danger of making a shift to second speed ratio when such is not desired, as, for example, when the vehicle is traveling above a certain speed.

Figure 5:
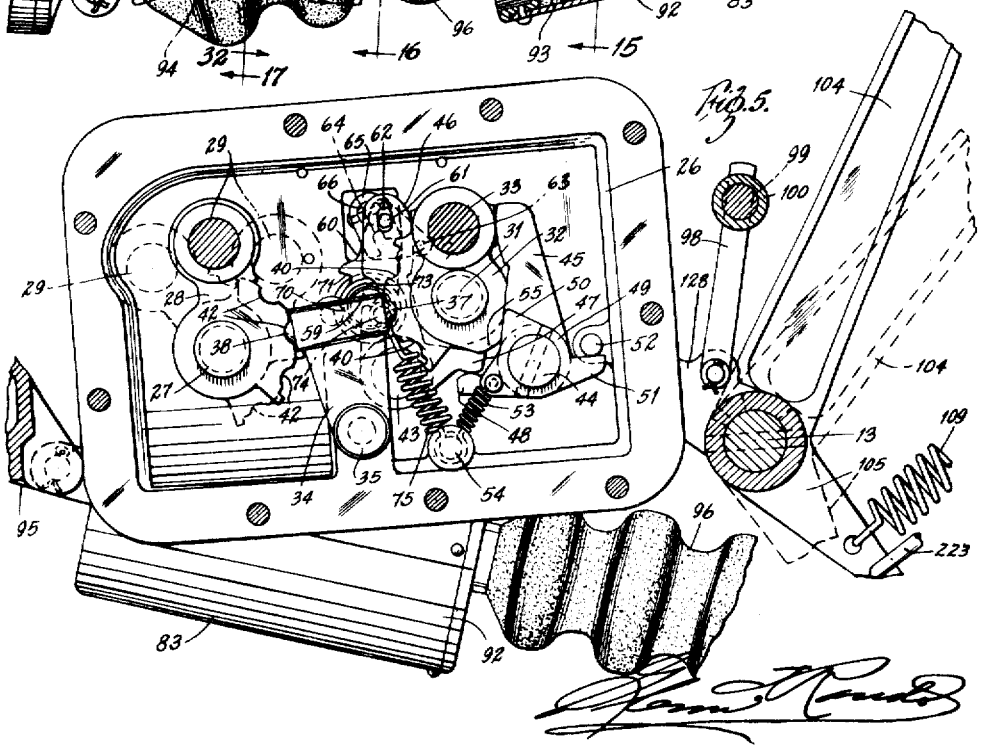
Figure 5 is a view of the parts on the inside of the transmission closure plate showing them in positions corresponding to those on the exterior of said plate, as viewed in Figure 4.

When it is desired to neutralize the change-speed gearing after driving the vehicle in either second or high speed ratio, all that need be done is to fully depress the clutch pedal by the foot so as to hold the [main] *friction* clutch *4* disengaged and then to move the gear shift handle 135 to a position [where] *wherein* the pointer 141 is opposite "N." This positively neutralizes the transmission by manual effort. When the handle 135 moves so that the pointer 141 is at "N," the shaft 43 will be rotated in a counterclockwise direction, as viewed from the exterior of the closure plate. This will result in the neutralizing lever 46 being initially moved toward neutralizing lever 45, until the projection 47 on lever 46 engages the projection 48 on lever 45 (see Figure 12) following which both levers 45 and 46 will move simultaneously toward each other to neutralize either second or high speed ratio to correspond with the setting of the pointer 141 at "N." When the neutralizing levers are moved simultaneously toward each other, arm 32 carrying the shifting fork 33 will be moved to its neutral position and thereby place the double clutch element 25 in its central disengaged position. Regardless of whether the clutch element 25 is in high speed ratio position or second speed ratio position, it will be returned to its central neutral position by the neutralizing levers. The movement of the neutralizing levers toward each other will be assisted by the action of spring 75 as soon as lever 46 has been initially moved sufficiently that the spring is "over center." When the lever 46 is moved inwardly, valve element 67 of the [main] *master* control valve M will be moved to the position shown in Figure 4 to thereby connect the rear end of the suction motor to atmosphere and the forward end to conduit 81 leading to the intake manifold. This cutting off takes place prior to any "picking up" and moving of the gear shifting fork 33 toward neutral position by manual effort. Also, the return of levers 46 and 45 to neutral position, as shown in Figure 5, will cause cam 126 to be so positioned, if not already in such position, that the apex thereof will lie above the path of travel of pin 130 so that whenever the gear shift handle is again set that the pointer is in the "Hi" end of the h-slot, the speed ratio which will be obtained will be second.

It is also to be noted that when the valve element 67 of the conditioning control valve M is moved to cut off position during manual neutralizing of any speed ratio, the forward end of the power cylinder will be connected to the manifold since it is to be noted that the circuit X is closed, due to release of the accelerator pedal and full depression of the clutch pedal. The piston of the suction motor will thus be pulled forwardly to its normal position assumed when the clutch *4* is engaged, notwithstanding the clutch remains disengaged due to the depressed condition of the clutch pedal. When the clutch pedal is released by the foot, after obtaining neutralization by movement of the handle 135 to "N" position, the clutch *4* [then will become engaged] *will engage automatically*. Thus it is seen that if the gearing is neutralized, as set forth, there is no possibility of leaving the car with the clutch disengaged and the gearing engaged. The operations performed are identical to manual operations already implanted in the driving public's mind by years of controlling [standardized manually] *conventional personally*-actuated gearing and *friction* clutches. This is a very important feature since in some power-operated clutches and shifting mechanisms it is possible for the operator not to obtain, by performing the usual [manual] *personal* operations, neutralization of the gearing or the relieving of the power from the power cylinder so that the *friction* clutch *4* will be engaged when he leaves the vehicle.

*Modified control system (Figures 50–56)*

Referring now to the modified control means whereby the selection of the second speed ratio and the high speed ratio is determined directly by the position of the accelerator mechanism, similar parts to those already described are designated by similar reference characters. The [main] *master* control conditioning valve is designated by the letter M′ and is enclosed with a casing 69′ mounted on the top portion of the closure plate 26. This casing is provided with bore 68 within which is positioned the control valve element 67 of a construction identical with that of the previously described [main] control valve M and being provided with cross-passage 76 and the parallel surface slots 77 and 78 on opposite sides thereof. The valve element 67 is carried on stem 66 which extends into the inside of the closure plate and is actuated by means of the short arm 65 through a mechanism which has already been described. The valve element 67 is shown in detail in Figure 55. In the modified construction the valve element is provided with a second stem 234 which extends from the exterior of the end of bore 68 so as to project out of the casing. On the end of this stem 234 is an arm 235 which carries a pin 236 on its free end which engages in slot 237 of lever 238 pivotally mounted on casing 69′ by a pin 239. The lever 238 carries an extension 240 which projects toward the closure cover for controlling structure which will be later referred to.

Figure 51:
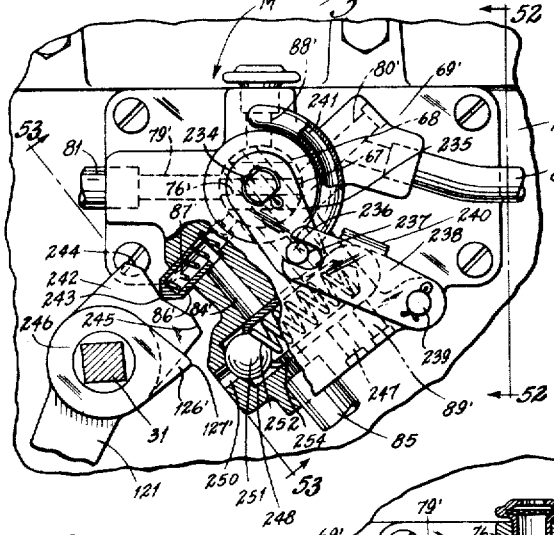
Figure 51 is an enlarged view of some of the structure shown in Figure 50, the parts being shown in section and their positions corresponding to neutral condition of the gearing.
Figure 52:
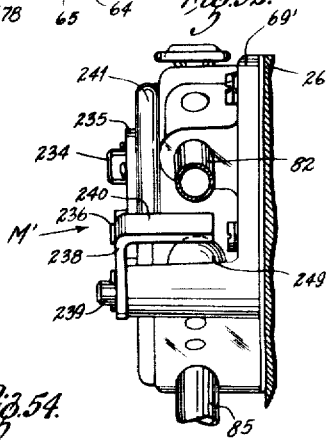
Figure 52 is a sectional view taken on the line 52—52 of Figure 51.

The bore 68 in the valve casing is connected to conduit 81 leading to the suction manifold by passage 79′ and to conduit 82 leading to the rear end of the combined clutch actuating and gear shifting suction motor 83 by way of a passage 80′ in the valve casing. The valve casing has atmospheric passages 88′ and 89′, passage 89′ being connected with passage 88′ by a short pipe 241 (Figure 51). The conduit 85 leading from the forward end of the suction motor 83 is connected to bore 68 of the valve element by a passage 84′.

Associated with passage 84′ is a restricting valve 86′ normally biased to an open position by a spring 87′. This restricting valve is similar to the restricting valve 86 previously described in connection with the gear shifting structure shown in Figures 1 to 49 *inclusively*, but is provided with a V-shaped end instead of a round end. This restricting valve is adapted to cooperate with a cam 242 on arm 121 which is connected to the accelerator mechanism by rod 121′ in the same manner as arm 121 of the structure shown in Figures 1 to 49. The cam 242 is provided with a V-shaped recess 243 and end surfaces 244 and 245 which are struck on a radius so that the shaft 31 is at the center, said shaft being the same one upon which arm 121 is rotatably mounted. The arm 121 has integral therewith a collar 246 which is provided with a V-shaped cam 126′, said cam taking the place of the V-shaped cam 126 in the previously described shifting mechanism and performs the selection function for determining to which arm of the double arm lever 112 the pin 130 will be connected when the suction motor is operated toward clutch disengaged position. The V-shaped cam 126′ has an apex 127′.

Figure 54:
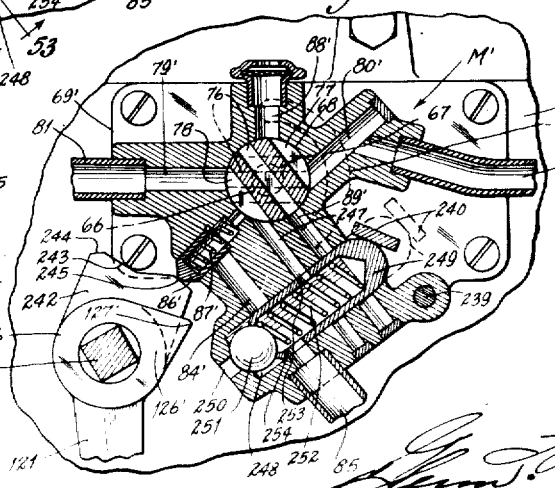
Figure 54 is a view similar to Figure 51 but showing a complete section, the positions of the parts corresponding to a fully depressed condition of the accelerator mechanism.

The valve casing is also provided with a passage 247 which communicates with valve bore 68 and is parallel with and lies between passages 84′ and 89′ (see Figure 54). Intersecting passages 89′, 247, and 84′ is a bore 248 in which is mounted a hollow plunger 249. The lower end of the bore is provided with an opening 250 leading to atmosphere. Cooperating with this opening is a ball check valve 251. Interposed between the ball check valve and the plunger and lying within the plunger is a spring 252 for biasing the ball check valve to a position closing the opening 250. The upper end of the plunger which projects out of bore 248 is adapted to lie beneath the extension 240 on lever 238, previously referred to, so as to be controlled by said lever. This extension, by means of the lever, can push the plunger 249 inwardly and cause it to engage the check ball 251 and positively hold it on its seat and at the same time connect the engine intake-manifold through valve slot 78, passage 247 and ports 253 and 254 to the forward end of the suction motor whereby special operating advantages result, as will be described. This condition is shown in Figure 54. When the extension 240 is moved away from the end of plunger 249 to the dotted line position shown in Figure 54, or in full lines in Figure 50, spring 252 can cause the plunger to follow the extension and under such conditions the spring only will hold ball 251 on its seat to close opening 250. Under such conditions air can flow past the ball from the atmosphere but not in the opposite direction. When the plunger is in engagement with the ball and holding it on its seat, it will be impossible for air to flow in either direction through opening 250. The plunger 249 is provided with an opening 253 in its wall so as to place the passage 247 in communication with the interior of the plunger when the plunger is engaged with the check ball 251. The plunger is also provided with a second opening 254 in its wall for placing conduit 85 in communication with the interior of the plunger when the plunger is held in a position to engage the check ball.

Figure 50:
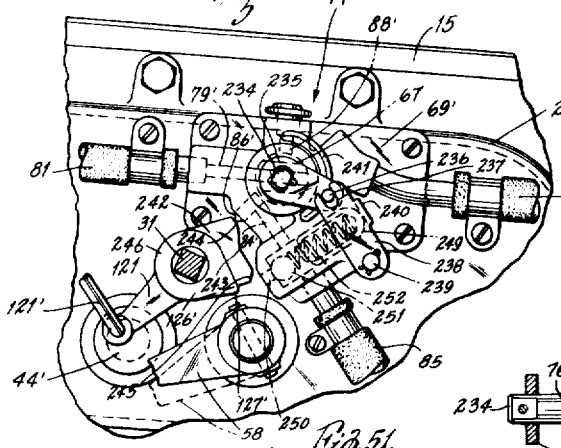
Figure 50 is a side view of a portion of the transmission showing a modified construction wherein the selection of second or high speed ratio *drive* is accomplished *directly* by the accelerator mechanism, the positions of the parts corresponding to a released condition of the accelerator mechanism with the hand lever set in "Hi" position.
Figure 53:
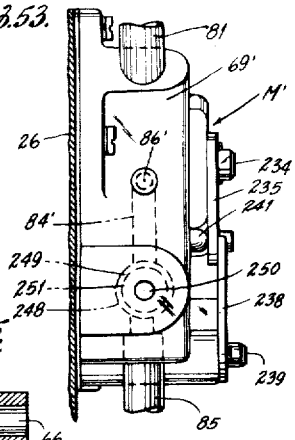
Figure 53 is a sectional view taken on the line 53—53 of Figure 51.
Figure 55:
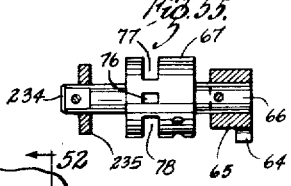
Figure 55 is a view of the rotatable element of the [main] *master* control conditioning valve of Figure 50.
Figure 56:
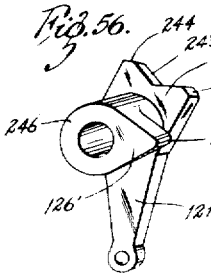
Figure 56 is a perspective view of the modified selector member which is operated directly by the accelerator mechanism.

When the structure shown in Figures 50 to 56 is embodied in the control mechanism, it will not be necessary to employ cam portion 55, cam portion 50, member 49, and extension 51 thereon, and spring 53, all as shown in Figure 5 previously described. The lever 45 of the companion levers 45 and 46 is loosely mounted on pin 44' as shown in Figure 50, which takes the place of shaft 44 of the previously described structure. The arm 56 mounted on the exterior of shaft 44, and collars 117 and 118 mounted on the exterior of shaft 31, are also eleminated when the structure shown in Figures 50 and 56 is employed since the selecting cam 126' is directly actuated by the accelerator mechanism. When the structure of Figures 50 to 56 is employed in the gear shifting mechanism, limit switch B will also be eleminated from circuit Y thus dispensing with automatic clutch re-engagement following a power "kickdown" shift from high speed to second speed drive in response to operating the accelerator pedal 175 substantially to wide open throttle position as previously described in connection with the operation of the first embodiment (Figures 1 to 49) of the present invention. Therefore, this modified embodiment (Figures 50 to 56) when incorporated in the present vehicular drive system, provides for operator-control of clutch re-engagement by movement of the accelerator from either of its extreme positions following a power-shift to the speed drive controlled at such positions of the accelerator.

*Operation of modified control system (Figures 50–56)*

The control valve element 67 in the structure shown in Figure 55 will be in the full line position shown in Figure 54 when the gear shift handle is in the neutral position or being employed to manually engage either low speed ratio or reverse speed ratio. When the gear shifting handle is moved to the "Hi" position, the valve element 67 will assume the dotted line position shown in Figures 50 and 54 by the operation of structure already described in connection with the control mechanism shown in Figures 1 to 49. The opening of valve element 67 will occur after the neutralizing lever 46 is moved to a position beyond the position [where] *wherein* it is effective to initiate neutralization, all as previously described.

When valve element 67 is in the position shown in full lines in Figure 54, the rear end of the suction motor will be connected to atmosphere and the forward end of the suction motor will be connected with conduit 81, the connection being by way of conduit 85, the openings 254 and 253 in the plunger and the passage 247 leading to the bore of the valve element and then through the slot 78. This communication is present regardless of the condition of the restricting valve 86' which restricting valve will be closed either when the accelerator is in the fully released position or in a depressed position [beyond] *substantially at* the *end of the* operating range of the accelerator mechanism. Even though the accelerator mechanism may be released so as to open the solenoid-controlled valve S and place the forward end of the suction motor in communication with the manifold, *and closes the auxiliary throttle valve 156 to insure idling of the engine during the shifting operation to ensue,* the suction motor will not be operated due to the fact that the piston thereof is already in the forward end of its cylinder When the control valve element 67 is moved to the dotted line position shown in Figure 54, the rear end of the suction motor will be placed in communication with conduit 81 leading to the manifold by way of the solenoid-controlled valve S. This condition of the control valve element is shown in Figure 50. The lever 238 will be turned to a position so that the plunger 249 will be moved away from the check ball 251 by spring 252. If the accelerator mechanism should be in released position, then under these conditions arm 121 will be in the position shown in Figure 50. This will result in conduit 81 being connected to the engine intake manifold if the solenoid 166 is energized by slightly depressing the clutch pedal *104* to close switch C. The suction motor will now be operated so as to move the piston from the forward end of the cylinder to the rear end. The clutch will be disengaged and the link 129 moved forwardly so that pin 130 thereof will engage the V-shaped selector cam 126'. This cam is in such position that the apex 127' will lie below pin 130 and thus the pin will be guided upwardly so as to engage the arm 113 of the double arm lever 112 to thereby cause a shift to high speed position. Air will be admitted to the forward end of the suction motor during the rearward travel of the piston by way of opening 250 and the check ball since the only thing holding this ball seated is light spring 252. Consequently with the ball check valve arrangement the clutch can be rapidly disengaged as air can enter the forward end of the cylinder through a free flow passage and not through a restricted passage as is the situation in the previously described structure shown in Figures 19 to 22 where air going to the forward end of the cylinder must pass through the small port having the fiber seat for restricting valve 86. The restricting valve 86' will be closed and air cannot pass said valve as the accelerator is in released position.

If the accelerator pedal is now depressed, the circuit X controlling solenoid valve S will be broken and the clutch *4 caused* [allowed] to engage. The engaging movement of the clutch can be controlled by the extent of opening of the restricting valve 86', said opening depending upon the amount the accelerator pedal is depressed. As the accelerator pedal is depressed, the V-shaped recess 243 will be moved so that the restricting valve can slowly open. Thus the air in the forward end of the cylinder will be bled off and the rapidity of engagement of the clutch controlled. If a rapid engagement of the clutch *4* is desired, the accelerator pedal will be depressed quickly. If a slow engagement of the clutch *4* is desired, the accelerator pedal will be slowly depressed. Air cannot escape through opening 250 due to the fact that the check ball will prevent this.

If second speed ratio should be desired instead of high speed ratio, the clutch pedal *104* will not be slightly depressed and instead thereof the accelerator pedal *175* will be fully depressed to a position [beyond] *substantially at the end of* its *engine* operating range, as shown in Figure 54. This will cause energization of the solenoid 166 through circuit Y, thus connecting the suction motor to the *intake*-manifold. The depressing of the accelerator pedal will cause the V-shaped cam 126' to have its apex above the path of movement of the pin 130 on link 129. Thus this pin will be guided to engage arm 115 of the double arm lever 112 and thereby cause a shift to second speed ratio condition. When the accelerator pedal is fully depressed, the restricting valve 86' will be closed but, nevertheless, air can enter the front chamber of the suction motor through opening 250 [and permit it to] *so that it can* operate, the air unseating the ball check valve. Release of the accelerator will now break the circuit Y and cause the clutch *4* to be engaged, the rapidity of engagement of the clutch *frictional elements* being determined by the extent of release of the accelerator mechanism as such will control the extent of opening of the restricting valve 86' and the bleeding of air from the forward end of the suction motor.

When it is desired to go to high speed ratio from second speed ratio, all that need be done is to release the accelerator pedal and slightly depress the clutch pedal. This will energize the circuit X and cause the suction motor to again be connected to the engine intake manifold *by opening the solenoid valve S which also acts to idle the engine during such shift by closing the auxiliary throttle valve 156.* Since the accelerator mechanism is released, the apex 127' of the V-shaped cam 126' will lie below the path of movement of pin 130 on link 129 and thus the shift will be made into high speed ratio since the pin is guided to connect with arm 113 of the double arm lever 112. When in high speed ratio and it is desired to re-obtain second speed ratio all that need be done is to fully depress the accelerator pedal.

It is to be noted that in this modified structure the second speed ratio can be "skipped" when starting the vehicle in low speed ratio and [getting] *go directly* into high speed ratio. With low manually engaged and the vehicle moving, the next step in shifting will be to release the accelerator pedal and disengage the clutch [manually] *4*. The handle 135 can then be moved to "Hi" to thus disengage the low speed gear and place valve element 67 in the position shown in Figure 50 and the dotted position in Figure 54. Since the accelerator pedal is already released and the clutch *pedal 104* depressed [manually], the circuit "X" will be closed and, therefore, the suction motor will be operated as soon as valve 67 is placed in the position to connect the suction motor to the manifold. Operation of the suction motor will thus cause a shift to high speed ratio as the selector cam 126' is in the proper position due to the released position of the accelerator pedal. Thus it is seen that "skipping" of second speed ratio is accomplished without any special operation, which is a desirable feature.

*Accelerator-clutch pedal control of power cylinder (Figures 1–56)*

In connection with both control mechanisms shown, attention is directed to the ease of control of the vehicle when it is necessary to bring the vehicle to a stop in traffic for some period of time and yet be ready to start rapidly with a minimum of effort. Consider the gearing in high speed ratio when it is brought to a stop. To disengage the clutch *4*, the clutch pedal will be depressed only sufficiently to close switch C. Circuit X will accordingly be energized and the power-cylinder operated.

With the control mechanism shown in Figures 1 to 49, the operating of the power cylinder will first cause disengagement of the clutch *4* and then a shift to second speed ratio, all as previously described. The operator then, to start the vehicle, need only depress the accelerator pedal. This will break the circuit X, thus [allowing] *causing* the clutch to engage and power to be transmitted to the gearing which is already in second gear ratio, the one desired under most conditions for starting. Thus it is apparent the ease and simplicity of stopping the vehicle and again starting it is all that could be desired. There is no necessity for straining the foot to hold out any clutch during the stopping time. All that is required is a very slight pressure on the clutch pedal sufficient to hold it forward in its idle path of travel.

In the modified construction shown in Figures 50 to 56, when the power cylinder is operated by slightly depressing the clutch pedal, the clutch *4* will be disengaged but the gearing will remain in high speed ratio. If it is desired to start in this speed ratio, as would be easily possible with a fluid-coupling in series with the friction clutch *4*, all that need be done is depress the accelerator pedal, whereupon the circuit X will be broken, the clutch [allowed] *caused* to re-engage and power to be transmitted to move the vehicle. If it should be desired to start in a lower speed ratio, then low speed ratio should be employed. To do this the clutch pedal *104* is *fully* depressed [completely to the floorboard] and the gear shift handle 135 operated to manually establish low speed ratio in the manner already described. After the vehicle is started in this low speed ratio by releasing the clutch pedal and depressing the accelerator pedal, the operator can skip second speed ratio and go immediately to high speed ratio by *fully* redepressing the clutch pedal [to the floorboard] and then putting the gear shift lever in the "Hi" position. Upon release of the clutch pedal and depression of the accelerator pedal the vehicle will [be] *drive forwardly* in high speed ratio. If it is found necessary to go through second speed ratio in starting, then of course the clutch pedal will be held *fully depressed* [to the floorboard], the gear shift handle put in the "Hi" position and the accelerator pedal *fully* depressed [completely to the floorboard]. This will select second speed ratio and the closing of the Y circuit will cause the power cylinder to again operate to accomplish the shift to second speed ratio. Release of the accelerator pedal will then break the Y circuit, [allow] *control* the clutch *4* to smoothly re-engage and the vehicle to move forwardly in second speed ratio. High speed ratio is then obtained by releasing the accelerator pedal, [tapping] *operating* the clutch pedal to close the circuit X and then again depressing the accelerator pedal to cause the clutch *4* to smoothly [reengage] *re-engage* and the vehicle to move forwardly in high speed ratio.

*The mechanisms are so interconnected that the engine idles whenever an operation of the power cylinder occurs. This assures high vacuum for the power cylinder irrespective of the position of the principal butterfly valve 154. It also prevents a racing of the engine when the clutch is disengaged. At any time power cylinder operation is called for, the energization of the power mechanism occurs simultaneously with the closure of the secondary throttle valve 156, so that the engine idles, high vacuum is produced, followed by sequential declutching or torque interruption, and shifting.*

*The operations of the power mechanism* of the first embodiment (Figures 1 to 49) *are under control of three control devices. The control device B* causes automatic re-engagement of the clutch 4 and the idling throttle valve 156 to fully open following a power "kickdown" shift from high speed to second speed drive with the accelerator pedal 175 in its fully depressed position substantially, insures completion of such a shift, and also *prevents operation of the power means to provide a shift by depression of the accelerator when the transmission is in second speed ratio.* However, the operator may overrule the aforedescribed operation of the device B to cause automatic clutch engagement, by immediately releasing the accelerator pedal from its fully depressed position upon the power means completing the shift to second speed drive. This operation closes the restricting valve 86, and thus prevents the clutch 4 from automatically engaging, further releasing of the accelerator pedal being required to open the restricting valve to accommodate exhaustion of the trapped air in the forward chamber of the power cylinder 83. *The control device C is here illustrated as tied into a preliminary operation of the clutch controlling pedal. This control device C is employed to enable the shift to be controlled by the accelerator pedal when the latter is in certain predetermined positions, but to prevent undesirable shifts when the accelerator pedal casually is moved to such predetermined positions. While this control device C is desirably interconnected directly with the clutch pedal, it will be understood that said device may be pedally-controlled without being directly connected thereto.*

*The accelerator control device A is of particular advantage because of the fact that the operator's foot is on the accelerator pedal at almost all times. The present control provides for shifting at either of two predetermined positions of the accelerator pedal, which positions are preferably those illustrated. It will be understood that the term "predetermined position" (or its equivalent) used in the claims is not intended to be limited to one of the two positions illustrated, in the absence of other limiting language. The presence of the valve 156 insures an idling of the engine at whatever position of the accelerator pedal the shift is called for.*

The operations of the power mechanism of the second embodiment (Figures 50 to 56) when incorporated in the present vehicular drive system, are under control of only two of the above devices; namely, devices A and C. Second and high speed drives with attendant disengagement of the clutch 4 are power-operated and the engine idled automatically during these shifting operations in response to full depression and release, respectively, of the accelerator pedal 175; whereupon, movement of the accelerator from either of its extremes is effective to disable engine idling and gradually open the restricting valve 86' to regulate the clutch into smooth engagement.

*It will be noted that the control valve M and the valve 86 are fully actuated to positions to cause energization of the power means before the valve 163 can operate, owing to the interconnection of these various components through the accelerator pedal 175. The valve 163 is opened rapidly by the solenoid, to apply the vacuum through the previously conditioned pipe lines, and the supplementary throttling valve 156 is operated to throttling position in this final control operation. This insures proper coordination between the carburetor action and the shift, avoiding such disadvantages as a throtting of the engine before shifting is ready.*

*The idling of the engine is a valuable aid in a shifting operation where no declutching is involved. The present engine idling operation can act to relieve torque in that manner. This is frequently called a relieving or interrupting of the "pinch" between gears that are transmitting power.* Such idling of the engine is effected by automatic closure of the auxiliary throttle plate 156 in response to operating the accelerator pedal 175 to either of its extremes to cause a change in transmission drive to occur. If control switch B is utilized to cause automatic re-engagement of the clutch 4 following the above described downshifting operation, the throttle plate will be restored to wide open condition on completion of this shift. Otherwise, opening of the throttle plate will be under control of the vehicle operator as when the accelerator is moved from either of its extremes to open switch A, or upon release of the clutch pedal 104 to open switch C while the accelerator is fully released which latter operation maintains switch A closed.

Being aware of the possibility of modifications in the particular structure herein *illustrated and* described without departing from the fundamental principles of my invention, I do not intend that its scope be limited except as set forth by the appended claims.

Having *now* fully described my invention, what I claim as new and desire to secure by Letters Patent of the United States is:

1. In a motor vehicle provided with an *engine* accelerator mechanism and a change-speed gearing having an element capable of assuming two *different* speed *drive* [ratio] positions and a neutral position, means *operable* for shifting the element of said gearing alternately between one speed [ratio] *drive* and *the other*, [another], control means for *operating* said shifting means including said accelerator mechanism, said means causing the shifting means to place the element of the gearing in one speed [ratio] *drive* when the accelerator mechanism is in released condition and for causing the shifting means to place the element of the gearing in the other speed [ratio] *drive* when the accelerator mechanism is fully depressed, manually-controlled means for moving said element of the gearing to neutral position at will by manual effort, and means controlled by the manually-controlled means when caused to move the element of the gearing to neutral for disabling the shifting means for the two speed [ratios] *drives*.

2. In a motor vehicle provided with an *engine* accelerator mechanism, a [main] clutch and a change-speed gearing, means comprising a single power means *operable* for disengaging the clutch and for shifting said gearing alternately between one speed [ratio] and another, control means for *operating* said power means including said accelerator mechanism, said means causing the power means to disengage the clutch and place the gearing in one speed [ratio] when the accelerator mechanism is in released condition and for causing the power means to disengage the clutch and place the gearing in the other speed [ratio] when the accelerator mechanism is fully depressed, and manually-ontrolled means for placing said gearing in neutral condition at will and for disabling the power means when the manually-controlled means is operated to neutralize the gearing.

3. In a motor vehicle provided with an accelerator mechanism, a [main] clutch and a change-speed gearing, means comprising a single power means having a movable element *operably* connected for disengaging the clutch and for subsequently by successive movements shifting said gearing alternately between high speed [ratio] and second speed [ratio], control means for *operating* said power means including said accelerator mechanism, said means causing the power means to disengage the clutch and place the gearing in high speed [ratio] when the accelerator mechanism is in released condition and for causing the power means to disengage the clutch and shift the gearing from high speed [ratio] to second speed [ratio] when the accelerator mechanism is fully depressed, and means operable by the accelerator mechanism and so associated with the power means as to cause the power means to control the rate of re-engagement of the clutch.

4. In a motor vehicle provided with an accelerator mechanism, a [main] clutch and with a change-speed gearing having a member movable to two different speed [ratio] operative positions, a control mechanism comprising a fluid motor having a movable element, a source of pressure different than atmospheric pressure, means including a control valve for placing one end of the motor in communication with the source so as to cause said movable element to move from one end of its stroke to the other end and for closing said communication so as to [permit] *accommodate* the return movement of said movable element, means for [so] *operably* connecting the movable element to the movable member of the gearing and to the [main] clutch *so* that it will disengage the clutch and shift said movable member to an operative position during a stroke of said element in one direction when the motor is connected to the source and will disengage the clutch and shift said member to its other operative position upon a successive similar stroke, and means for opening and closing said control valve by the accelerator mechanism.

5. In a motor vehicle provided with an accelerator mechanism and a change-speed gearing having a member movable to two different speed [ratio] operative positions, a control mechanism comprising a fluid motor having a movable element, means for so *operably* connecting the movable element to the movable member of the gearing *so* that successive reciprocations of said element from one position to another and return will cause the movable member to alternately assume its *aforesaid* operative positions, a source of pressure different from atmospheric pressure connected to one end of the motor, a control valve, means for opening said control valve when the accelerator mechanism is in a predetermined position, shut-off valve means for preventing the control valve from controlling the motor, and manual means for closing the shut-off valve means and neutralizing the gearing.

6. In a motor vehicle provided with an accelerator mechanism and a change-speed gearing having a member movable to two different speed [ratio] operative positions, a control mechanism comprising a fluid motor having a movable element, means for [so] *operably* connecting the movable element to the movable member of the gearing *so* that successive reciprocations of said element from one position to another and return will cause the movable member to alternately assume its *aforesaid* operative positions, a source of pressure different from atmospheric pressure connected to one end of the motor, a control valve, means for opening said control valve when the accelerator mechanism is in a predetermined position, a manually-operated means for placing said gearing in neutral condition, and means operated by manual effort transferred from the manually-operated means for disabling the fluid motor when the gearing is placed in neutral condition.

7. In a motor vehicle provided with an accelerator mechanism and a change-speed gearing having a member movable to two different speed [ratio] operative positions, a control mechanism comprising a fluid motor having a movable element, means for [so] *operably* connecting the movable element to the movable member of the gearing *so* that successive reciprocations of said element from one position to another and return will cause the movable member to alternately assume its *aforesaid* operative positions, a source of pressure different from atmospheric pressure connected to one end of the motor, a control valve, means for opening said control valve when the accelerator mechanism is in a predetermined position, means including a manually-operated lever for placing the gearing in neutral condition at will and means operable by moving the lever from its neutral condition position for [permitting] *conditioning* the control valve to function.

8. In a motor vehicle provided with an engine accelerator mechanism and a change-speed gearing having associated therewith a [main] *torque-transmitting* clutch mechanism, means comprising a suction motor *operable* for disengaging the clutch and subsequently causing a speed [ratio] to be operative by a stroke of the movable element of the motor from one position to another in a single direction, a source of suction, means comprising a control valve for alternately placing one end of the motor in communication with the source and with the atmosphere to thus cause the movable element to be reciprocated, and control means for operating said valve, said control means embodying the accelerator mechanism and means so associated with the accelerator mechanism that the engine torque will be relieved and the valve [can be] positioned to cause the suction motor to shift the change-speed gearing from one speed [ratio] to another speed [ratio] when the accelerator mechanism is fully depressed to a position substantially at the end of its *engine* operating range.

9. In a motor vehicle provided with an engine accelerator mechanism and a change-speed gearing having associated therewith a [main] *torque-transmitting* clutch mechanism, means comprising a suction motor *operable* for disengaging the clutch and subsequently causing a speed [ratio] to be operative by a stroke of the movable element of the motor from one position to another in a single direction, a source of suction, means comprising a control valve for alternately placing one end of the motor in communication with the source and with the atmosphere to thus cause the movable element to be reciprocated, and control means for operating said valve so that the motor will be in communication with the source, said control means being so associated with the accelerator mechanism that the valve can only be in a position to place the source in communication with the motor when the accelerator mechanism is in either a released position or in a similar position and the engine torque relieved when in a fully depressed position substantially at the end of its *engine* operating range.

10. In a motor vehicle provided with an accelerator mechanism and a change-speed gearing having associated therewith a [main] *torque-transmitting* clutch mechanism, means comprising a suction motor *operable* for disengaging the clutch and subsequently causing different speed*s* [ratios] to be operative by successive strokes of the movable element of the motor from one position to another in a single direction, a source of suction, means comprising a control valve for alternately placing one end of the motor in communication with the source and with the atmosphere to thus cause the movable element to be reciprocated, and control means for operating said valve, said control means embodying the accelerator mechanism and means so associated with the accelerator mechanism that the valve can be positioned to cause the suction motor to shift the change-speed gearing from one speed [ratio] to another speed [ratio] when the accelerator mechanism is one predetermined position and then back to the first-named speed [ratio] when the accelerator mechanism is in another predetermined position.

11. In a motor vehicle provided with an accelerator mechanism, a *torque-transmitting* clutch mechanism including a pedal and a change-speed *drive* gearing, means comprising a fluid motor *operable* for disengaging the clutch and [changing the] *effecting different* speed [ratio] *drive* of the gearing, a source of pressure different from atmosphere for [actuating] *operating* the motor, a control valve, a solenoid for opening the control valve, two parallel electrical circuits for *energizing* the solenoid each of which includes two switches, means *operable* for closing one switch in one of the circuits when the accelerator mechanism is in released position and for closing one switch in the other circuit when the accelerator mechanism is in a fully depressed position, means *operable* for closing the other switch in the first-named circuit by initial movement of the clutch pedal from its clutch-engaged position, and means *operable* for closing the other switch in the second-named circuit only when the change-speed gearing is in a predetermined condition.

12. In a motor vehicle provided with an accelerator mechanism, [a main] *an engine* clutch and a change-speed gearing having a member movable to two different speed [ratio] operative positions, a control mechanism comprising a fluid motor having a reciprocable element, means for *operably* connecting the movable element to disengage the clutch by a partial movement thereof of its stroke in one direction, means for *operably* connecting the movable element to the movable member so as to move the latter to an operative position during the remainder of the stroke of the movable element, said last-named connecting means including means causing alternate movement of the movable member to its two operative positions on successive reciprocations of the element, a control valve, and means for opening said control valve to cause the element of the motor to complete a stroke and thereby disengage the clutch and move the member to an operative position when the accelerator mechanism is in one position and for closing the valve to [permit] *accommodate* return movement of the element of the motor to thereby re-engage the clutch when the accelerator mechanism is moved to another position, said return movement of the element so conditioning said second connecting means that a subsequent stroke of the element will cause the movable member to be shifted to its other operative position.

13. In a motor vehicle provided with an accelerator mechanism and a change-speed gearing having associated therewith [a main] *an engine* clutch mechanism, means comprising a fluid motor *operable* for disengaging the clutch and subsequently causing a speed [ratio] to be operative by a stroke of the movable element of the motor from one position to another in a single direction, a source of fluid pressure different from atmosphere, means comprising a control valve for alternately placing one end of the motor in communication with the source and with the atmosphere to thus cause the movable element to be reciprocated, means for operating said valve so that the motor will be in communication with the source when the accelerator mechanism is in a predetermined position, and means operable by the accelerator mechanism when it is moved from its predetermined position for controlling the rate of movement of the movable element of the motor during its return stroke.

14. In a motor vehicle provided with an accelerator mechanism and a change-speed *drive* gearing having associated therewith [a main] *an engine* clutch mechanism; means comprising a *single* fluid motor *operable* for disengaging the clutch and subsequently causing a speed [ratio] *drive* to be operative by a stroke of the movable element of the motor from one position to another in a single direction; a source of fluid pressure different from atmosphere; means comprising a control valve for alternately placing one end of the motor in communication with the source and with the atmosphere to thus cause the movable element to be reciprocated; means for operating said valve [so that] *to place* the motor [will be] in communication with the source when the accelerator mechanism is in a released position, and in communication with the atmosphere when the accelerator mechanism is in another position; and means including valve means operable as the accelerator mechanism is moved from its released position for controlling the rate of movement of the movable element of the motor during its return stroke.

15. In a motor vehicle provided with an accelerator mechanism and a change-speed *drive* gearing having associated therewith [a main] *an engine* clutch mechanism; means comprising a *single* fluid motor *operable* for disengaging the clutch and subsequently causing a speed [ratio] *drive* to be operative by a stroke of the movable element of the motor from one position to another in a single direction; a source of fluid pressure different from atmosphere; means comprising a control valve for alternately placing one end of the motor in communication with the source and with the atmosphere, to thus cause the movable element to be reciprocated; means for operating said valve [so that] *to place* the motor [will be] in communication with the source when the accelerator mechanism is in a predetermined position, and in communication with the atmosphere when the accelerator mechanism is in another position; means comprising a valve for restricting the flow of air between the atmosphere and the motor to thereby control the movement of the movable element during its return stroke, and means operable by the accelerator mechanism for increasing the opening of said restricting valve as the accelerator mechanism is moved from its predetermined position [where] *wherein* the first-named valve cuts off the source of suction to a position [where] *wherein* the [suction] motor is in communication with atmosphere.

16. In a control mechanism for a change-speed *drive* gearing having associated therewith [a main] *an engine* clutch mechanism; means comprising a *single* suction motor *operable* for disengaging the clutch, and subsequently causing a speed [ratio] *drive* to be operative by a stroke of the movable element of the motor from one position to another in a single direction; a source of suction; means comprising a control valve for alternately placing one end of the motor in communication with the source and with the atmosphere to *thus* cause the movable element to be reciprocated; an operator-operated member connected to actuate said valve; means comprising a valve for restricting the flow of air from the other end of the [suction] motor as its movable element moves during its return stroke; and means for varying the opening of the restricting valve by the operator-operated member of the first-named valve when said first-named valve is operated to cut off the source of suction.

17. In a motor vehicle provided with an accelerator mechanism and a change-speed *drive* gearing having associated therewith [a main] *an engine* clutch mechanism; means comprising a *single* suction motor *operable* for disengaging the clutch and subsequently causing a speed [ratio] *drive* to be operative by a stroke of the movable element of the motor from one position to another in a single direction; a source of suction; means comprising a control valve for alternately placing one end of the motor in communication with the source and with the atmosphere to thus cause the movable element to be reciprocated; means for operating said valve [so that] *to place* the motor [will be] in communication with the source when the accelerator mechanism is in released position, and in communication with the atmosphere when the accelerator mechanism is in another position; means comprising a valve for restricting the flow of air from the other end of the [suction] motor when its movable element moves during its return stroke; and means for increasing the opening of said restricting valve when the accelerator mechanism is moved from its released position.

18. In a motor vehicle provided with an accelerator mechanism and a change-speed *drive* gearing having associated therewith [a main] *an engine* clutch mechanism; means comprising a *single* suction motor *operable* for disengaging the clutch and subsequently causing a speed [ratio] *drive* to be operative by a stroke of the movable element of the motor from one position to another in a single direction; a source of suction; means comprising a control valve for alternately placing one end of the motor in communication with the source and with the atmosphere to thus cause the movable element to be reciprocated; means for operating said valve [so that] *to place* the motor [will be] in communication with the source when the accelerator mechanism is in a predetermined position, and in communication with the atmosphere when the accelerator mechanism is in another position; means comprising a valve for restricting the flow of air from the other end of the [suction] motor when its movable element moves during the return stroke; and means for increasing the opening of said restricting valve when the accelerator mechanism is moved from its predetermined position to thereby cause the first-named valve to cut off the source of suction and place the [suction] motor in communication with atmosphere.

19. In a motor vehicle provided with an accelerator mechanism, a clutch mechanism and a change-speed *drive* gearing, a fluid motor *operable* for disengaging the clutch and changing the speed [ratio] *drive* of the gearing, a source of pressure different from atmosphere for [actuating] *operating* the motor, a control valve, a solenoid *energizable* for opening the control valve, two parallel electrical circuits for *energizing* the solenoid each of which includes two switches, means *operable* for closing one switch in one of the circuits when the accelerator mechanism is in released position and for closing one switch in the other circuit when the accelerator mechanism is in a fully depressed position, means *operable* for closing the other switch in the first-named circuit at will, and means *operable* for closing the other switch in the second-named circuit only when the change-speed gearing is in a predetermined condition.

20. In a motor vehicle provided with an accelerator mechanism and a change-speed *drive* gearing, a fluid motor *operable* for changing the speed [ratio] *drive* of the gearing, a source of pressure different from atmosphere for [actuating] *operating* the motor, a control valve, a solenoid *energizable* for opening the control valve, two parallel electrical circuits for *energizing* the solenoid each of which includes two switches, means *operable* for closing one switch in one of the circuits when the accelerator mechanism is in released position and for closing one switch in the other circuit when the accelerator mechanism is in a fully depressed position, means *operable* for closing the other switch in the first-named circuit at will, and means *operable* for closing the other switch in the second-named circuit only when the change-speed gearing is in a predetermined condition.

21. In a motor vehicle provided with an accelerator mechanism, a clutch mechanism and a change-speed *drive* gearing, a fluid motor *operable* for disengaging the clutch and changing the speed [ratio] *drive* of the gearing, a source of pressure different from atmosphere for [actuating] *operating* the motor, a control valve, a solenoid *energizable* for opening the control valve, two parallel electrical circuits for *energizing* the solenoid, means comprising a switch in each circuit for controlling it, and means *operable* for closing the switch in one of the circuits when the accelerator mechanism is in released position and for closing the switch in the other circuit when the accelerator mechanism is in a fully depressed position.

22. In a motor vehicle provided with an accelerator mechanism and a change-speed *drive* gearing, a fluid motor *operable* for changing the speed [ratio] *drive* of the gearing, a source of pressure different from atmosphere for [actuating] *operating* the motor, a control valve, a solenoid *energizable* for opening the control valve, two parallel electrical circuits for *energizing* the solenoid, means comprising a switch in each circuit for controlling it, and means *operable* for closing the switch in one of the circuits when the accelerator mechanism is in released position and for closing the switch in the other circuit when the accelerator mechanism is in a fully depressed position.

23. In a motor vehicle provided with an accelerator mechanism and a change-speed *drive* gearing, a fluid motor *operably connected* for disengaging the clutch and changing the speed [ratio] *drive* of the gearing, a source of pressure different from atmosphere for [actuating] *operating* the motor, a control valve, a solenoid *energizable* for opening the control valve, two parallel electrical circuits for *energizing* the solenoid, means comprising a switch in each circuit for controlling it, means *operable* for closing the switch in one of the circuits when the accelerator mechanism is in released position and for closing the switch in the other circuit when the accelerator mechanism is in a fully depressed position, a second switch in the second-named circuit, and means *operable* for closing said second switch only when the change-speed gearing is in a predetermined condition.

24. In a motor vehicle provided with an accelerator mechanism, a clutch mechanism and a change-speed *drive* gearing, a fluid motor *operably connected* for disengaging the clutch and changing the speed [ratio] *drive* of the gearing, a source of pressure different from atmosphere for [actuating] *operating* the motor, a control valve, a solenoid *energizable* for opening the control valve, an electrical circuit for *energizing* the solenoid including two switches, means *operable* for closing one switch by the accelerator mechanism when in a predetermined position, and operator-operated means for closing the other switch.

25. In a motor vehicle provided with an accelerator mechanism, a clutch mechanism including a pedal and a change-speed *drive* gearing, a fluid motor *operably connected* for disengaging the clutch and changing the speed [ratio] *drive* of the gearing, a source of pressure different from atmosphere for [actuating] *operating* the motor, a control valve, a solenoid *energizable* for opening the control valve, an electrical circuit for *energizing* the solenoid including two switches, means *operable* for closing one switch by the accelerator mechanism when in a released position, and means *operable* for closing the other switch by an initial movement of the clutch pedal from its clutch-engaged position.

26. In a motor vehicle provided with an accelerator mechanism, a clutch mechanism and a change-speed *drive* gearing, a single fluid motor *operably connected* for first disengaging the clutch and then for changing the speed [ratio] *drive* of the gearing, a source of pressure different from atmosphere for [actuating] *operating* the motor, a control valve, a solenoid *energizable* for opening the control valve, an electrical circuit for *energizing* the solenoid including an accelerator-controlled switch which is closed only when the accelerator mechanism is fully depressed, and means *operable* for automatically causing the engine to idle when the accelerator mechanism is fully depressed.

27. In a motor vehicle provided with an accelerator mechanism, a [main] clutch and a change-speed *drive* gearing, means comprising a single movable member *operably connected* for first disengaging the clutch and then subsequently shifting said gearing from one speed [ratio] *drive* to another, selecting means between the first-named means and the gearing for the shifting means so controlled solely by the accelerator mechanism that one speed [ratio] *drive* will be selected prior to shifting when the accelerator mechanism is in released condition and another speed [ratio] *drive* will be selected prior to shifting when the accelerator mechanism is in depressed condition beyond its operative range, and means for causing said clutch disengaging and shifting means to be operated only when the accelerator mechanism is in the released or in the depressed condition.

28. In a motor vehicle provided with an accelerator mechanism and a change-speed gearing having at least two *different* speeds [ratios], means comprising a fluid motor *operable* for shifting a single movable element of said gearing, means for selectively connecting the movable element of the motor to a movable element of the gearing so as to shift the gearing alternately from one speed [ratio] to another, and means for controlling the selectively connecting means by the accelerator mechanism prior to operation of the motor so that the highest speed [ratio] can be selected only when the accelerator mechanism is in released condition and the other speed [ratio] selected only when the accelerator mechanism is in a fully depressed condition.

29. In a motor vehicle provided with an accelerator mechanism and a change-speed gearing means comprising a fluid motor *operable* for shifting a single movable element of said gearing, means for selectively connecting the movable element of the motor to a movable element of the gearing so as to shift the gearing alternately from one speed [ratio] to another, and means for controlling the selectively connecting means by the accelerator mechanism prior to operation of the motor so that one speed [ratio] can be obtained only when the accelerator mechanism is in one predetermined position and the other speed [ratio] obtained only when the accelerator mechanism is in another predetermined position.

30. In a motor vehicle provided with an accelerator mechanism and a change-speed gearing, means comprising a fluid motor *operable* for shifting a single movable element of said gearing, means for selectively connecting the movable element of the motor to a movable element of the gearing so as to shift the gearing alternately from one speed [ratio] to another, and means for controlling the selectively connecting means by the accelerator mechanism prior to operation of the motor so that one speed [ratio] can be selected only when the accelerator mechanism is in released condition and the other speed [ratio] selected only when the accelerator mechanism is in a fully depressed condition.

31. In a motor vehicle provided with an accelerator mechanism and a change-speed gearing, means comprising a fluid motor *operable* for shifting a single movable element of said gearing, means for selectively connecting the movable element of the motor to a movable element of the gearing so as to shift the gearing alternately from one speed [ratio] to another, means for controlling the selectively connecting means by the accelerator mechanism prior to operation of the motor so that one speed [ratio] can be selected only when the accelerator mechanism is in released condition and the other speed [ratio] selected only when the accelerator mechanism is in a fully depressed condition, a valve for controlling operation of the fluid motor, and means for opening said valve after the selective connection is made and when the accelerator mechanism is in either a released or a fully depressed condition.

32. In a motor vehicle provided with an accelerator mechanism and a change-speed gearing, means comprising a fluid motor *operable* for shifting a single movable element of said gearing, means for selectively connecting the movable element of the motor to a movable element of the gearing so as to shift the gearing alternately from one speed [ratio] to another, means for controlling the selectively connecting means by the accelerator mechanism prior to operation of the motor so that one speed [ratio] can be obtained only when the accelerator mechanism is in one predetermined position and the other speed [ratio] obtained only when the accelerator mechanism is in another predetermined position, means for causing the fluid motor to operate including a valve, and control means for placing said valve in an operative position after the selective connection is made and when the accelerator mechanism is in either of its said predetermined positions.

33. In a motor vehicle provided with an accelerator mechanism and a change-speed gearing, means comprising a fluid motor *operable* for shifting said gearing, means for selectively connecting the movable element of the motor to a movable element of the gearing so as to shift the gearing alternately from one speed [ratio] to another, means for operating the selectively connecting means by the accelerator mechanism so that one speed [ratio] can be obtained when the accelerator mechanism is in one predetermined position and the other speed [ratio] obtained when the accelerator mechanism is in another predetermined position, means for causing the fluid motor to operate including a valve, a solenoid *energizable* for opening the valve, parallel electrical circuits for *energizing* the solenoid, means comprising a switch in each circuit for controlling it, and means for closing one switch when the accelerator mechanism is in one predetermined position and the other switch when the accelerator mechanism is in the other predetermined position.

34. In a motor vehicle provided with an accelerator mechanism, [a main] *an engine* clutch mechanism and a change-speed gearing having at least two *different* speeds [ratios]; means comprising a single fluid motor *operably connected* for disengaging the clutch and subsequently shifting said gearing, means for selectively connecting the movable element of the single motor to a movable element of the gearing so as to shift the gearing alternately from one speed [ratio] to another, means for controlling the selectively connecting means by the accelerator mechanism so that the highest speed [ratio] can be selected only when the accelerator mechanism is in released condition and the other speed [ratio] selected only when the accelerator mechanism is in a fully depressed condition, and means for causing the fluid motor to be operated including a control valve and means for opening the control valve only when the accelerator mechanism is in released or fully depressed condition.

35. In a motor vehicle provided with an accelerator mechanism and a change-speed gearing having a shiftable element movable in opposite directions for obtaining two *different* speeds [ratios], means comprising a fluid motor *operably connected* for shifting said element in opposite directions, a rotatable member connected to the shiftable element so as to move said element in one direction when rotated in one direction and to move the shiftable element in the opposite direction when rotated in the opposite direction, means for connecting the movable element of the fluid motor to opposite sides of the axis of the rotatable member, and means operable by the accelerator mechanism for determining to which side of the axis of the rotatable member the movable element will be connected.

36. In a motor vehicle provided with an accelerator mechanism and a change-speed gearing having a shiftable element movable in opposite directions for obtaining two *different* speeds [ratios], means comprising a fluid motor *operably connected* for shifting said element in opposite directions, a rotatable member connected to the shiftable element so as to move said element in one direction when rotated in one direction and to move the shiftable element in the opposite direction when rotated in the opposite direction, means for connecting the movable element of the fluid motor to opposite sides of the axis of the rotatable member, and means operable by the accelerator mechanism when in released condition for causing the movable element of the fluid motor to be connected to one side of the axis of the rotatable member, and when in fully depressed condition for causing the said movable element to be connected to the other side of the axis of the rotatable member.

37. In a motor vehicle provided with an accelerator mechanism, [a main] *an engine* clutch and a change-speed gearing, means comprising a fluid motor having a movable member movable in one direction for causing the clutch to be disengaged and a single movable element of the gearing to be shifted from one speed [ratio] to another, and means comprising a control valve for so controlling said fluid motor by the accelerator mechanism that the clutch will be disengaged and a shift will be made to the highest speed [ratio] if the gearing is in another speed ratio when the accelerator mechanism is in released position and the clutch will be disengaged and a shift will be made to a lower speed [ratio] if the gearing is in said highest speed [ratio] when the accelerator mechanism is in a depressed position beyond its engine controlling range.

38. In a motor vehicle provided with an accelerator mechanism, [a main] *an engine* clutch and a change-speed gearing, means comprising a single movable member *operable* for causing the clutch to be disengaged and the gearing to be shifted, means for so controlling said last-named means by the accelerator mechanism that a shift will be made to one speed [ratio] if the gearing is in another speed [ratio] when the accelerator mechanism is in released position and a shift will be made to another speed [ratio] if the gearing is in said one speed [ratio] when the accelerator mechanism is in a depressed position beyond its engine controlling range, and manually-controlled means for placing said gearing in neutral condition at will be manual effort.

39. In a motor vehicle provided with an accelerator mechanism, [a main] *an engine* clutch and a change-speed *drive* gearing, means comprising a *single* fluid motor having a movable element *operable* for causing the clutch to be disengaged and an element of the gearing to be shifted from one speed [ratio] *drive* to another, a control valve for the fluid motor, means for controlling the control valve and causing [disening] disengagement of the clutch and a shift to be *made to* one speed [ratio] *drive* only when the accelerator mechanism is placed in one position, and means for controlling the control valve and causing disengagement of the clutch and a shift to be made to another speed [ratio] *drive* only when the accelerator mechanism is in a predetermined different position.

40. In a motor vehicle provided with an accelerator mechanism, [a main] *an engine* clutch and a change-speed gearing, means comprising a fluid motor having a movable element *operable* for causing the clutch to be disengaged and the gearing to be shifted, a control valve for the fluid motor, means for controlling the control valve and causing disengagement of the clutch and a shift to be made to one speed [ratio] when the accelerator mechanism is placed in one position, means for controlling the control valve and causing disengagement of the clutch and a shift to be made to another speed [ratio] when the accelerator mechanism is in a different position, and means controlled by the accelerator mechanism for causing the rate of re-engagement of the clutch to be controlled.

41. In a motor vehicle provided with [a main] *an engine* clutch and a change-speed gearing, means comprising control means and a fluid motor *operable* for causing the clutch to be disengaged and the gearing to be alternately placed in two different speeds [ratios] at the will of the operator, manual means comprising a member movable from one position to another position to condition said control means for operation, means operable by said manual means when returned to said one position for manually neutralizing the gearing, and means operable when said manual means is returned to said one position for automatically [permitting] *controlling* re-engagement of the clutch and when again returned to the control means conditioning position for automatically causing the disengagement of the clutch and re-establishment of the operative condition of the gearing which existed prior to the gearing being neutralized by the manual means.

42. In a motor vehicle provided with an accelerator mechanism, a [main] clutch and a change-speed gearing, means comprising a fluid motor and control means for causing the clutch to be disengaged and the gearing to be placed in one speed [ratio] condition when the accelerator mechanism is in one position and for causing the clutch to be disengaged and the gearing to be placed in another speed [ratio] condition when the accelerator mechanism is in a different position, manually-controlled means for placing the gearing in neutral position at will, means operative when the accelerator mechanism is in one of said shifting positions for causing the fluid motor to automatically [permit] *control* reengagement of the clutch when said manually-controlled means neutralizes the gearing, and means operable when said manually-controlled means is returned to its position corresponding to an operative condition of the gearing for causing the fluid motor to automatically disengage the clutch and re-establish the operative condition of the gearing as determined by said one position of the accelerator mechanism.

43. In a motor vehicle provided with an accelerator mechanism, a [main] clutch and a change-speed gearing, means comprising a fluid motor and control means for causing the clutch to be disengaged and the gearing to be placed in one speed [ratio] condition when the accelerator mechanism is in its fully released position and for causing the clutch to be disengaged and the gearing to be placed in another speed [ratio] position when the accelerator mechanism is in a different position, manually-controlled means for placing the gearing in neutral position at will, and means operable when the accelerator mechanism is in said fully released position for causing the fluid motor to automatically [permit] *control* reengagement of the clutch when said manually-controlled means neutralizes the gearing and for automatically causing disengagement of the clutch and re-establishment of the operative condition of the gearing determined by said fully released position of the accelerator mechanism when the manually-controlled means is returned to its position corresponding to the operative condition of the gearing.

44. In a motor vehicle provided with an accelerator mechanism, a [main] clutch and a change-speed gearing, means comprising a single movable member for causing the clutch to be disengaged and the gearing to be shifted from one operative position to another, means associated with the last-named means and comprising selecting means controllable by the accelerator mechanism independently of the speed of the vehicle for automatically causing alternate shifting between two speeds [ratios] by successive operations of the single member, and means comprising the accelerator mechanism and a manually-operated member for controlling the operation of the single movable member, said last-named means being conditioned to cause operation of the single movable member by the actuation of the manually-operated member when the accelerator mechanism is in released position.

45. In a motor vehicle provided with an accelerator mechanism, a [main] clutch and a change-speed gearing, means comprising a single movable member for causing the clutch to be disengaged and the gearing to be shifted, means associated with the last-named means comprising selecting means controllable by the accelerator mechanism independently of the speed of the vehicle for automatically causing alternate shifting between the two speeds [ratios] by successive operations, of the single member, means comprising the accelerator mechanism and a manually-operated member for controlling the operation of the single movable member, said last-named means being conditioned to cause operation of the single movable member by the actuation of the manually-operated member when the accelerator mechanism is in released position, and other manually-controlled means for placing said gearing in neutral condition at will by manual effort only.

46. In a motor vehicle provided with an accelerator mechanism, a [main] clutch and a change-speed gearing, means comprising a single movable member for causing the clutch to be disengaged and the gearing to be shifted, means associated with the last-named means comprising selecting means controllable by the accelerator mechanism independently of the speed of the vehicle for causing the lower of two speeds [ratios] to be made active when an initial shift is made by movement of the single member and then alternate shifting between the two speeds [ratios] automatically by successive operations of the single member, and means comprising the accelerator mechanism and a manually-operated member for controlling the operation of the single movable member, said last-named means being conditioned to cause operation of the movable member by actuation of the manually-operated member when the accelerator mechanism is in released position.

47. In a motor vehicle provided with an accelerator mechanism, a [main] clutch and a change-speed gearing, means comprising a fluid motor having a movable member for causing the clutch to be disengaged and the gearing to be shifted, means associated with the last-named means for causing alternate shifting between two speeds [ratios] by successive operations of the fluid motor, means comprising the accelerator mechanism and a manually-operated member for controlling the operation of the fluid motor, said last-named means being conditioned to cause operation of the fluid motor by the actuation of the manually-operated member when the accelerator mechanism is in released position, and means comprising manually-controlled means operable at will for disabling the fluid motor, [permitting] *controlling* re-engagement of the clutch and for neutralizing the gearing.

48. In a motor vehicle provided with an accelerator mechanism, a [main] clutch and a change-speed gearing, means comprising a single reciprocable member for causing the clutch to be disengaged and the gearing to be shifted, means associated with the last-named means for causing alternate shifting between two speeds [ratios] by successive operations in a single direction of the single member, means comprising the accelerator mechanism and a manually-operated member for controlling the operation of the single movable member, said last-named means being conditioned to cause operation of the single movable member by the operation of the manually-operated member when the accelerator mechanism is in released position, and other means operable when the accelerator mechanism is in a depressed position for causing the first-named means to be operated with the manually operated member in operative position and the gearing to be shifted to the lower speed [ratio] of said two speed*s* [ratios] in the event the higher speed [ratio] is operative.

49. In a motor vehicle provided with [a main] *an engine* clutch having a clutch pedal with a free range of movement before acting to disengage the clutch and a change-speed gearing, means comprising a single power-operated means *operably* connected for first disengaging the [main] clutch and then establishing a gear [ratio] *drive,* control means for the power-operated means comprising a control element and means for conditioning the control element to cause operation of the power-operated means when the clutch pedal is moved to a position in its free range of movement, and means interconnecting the clutch pedal and the gearing after clutch-disengaging movement of the clutch pedal for [permitting] *controlling* the transmitting of manual force by additional pedal movement to cause or assist in causing the establishment of the gear [ratio] *drive* by manual force in the event of total or partial failure of the power means to operate.

50. In a motor vehicle provided with an accelerator mechanism, with a [main] clutch and clutch operating pedal having a free range of movement before acting to disengage the clutch and with a change-speed gearing, power-operated means for causing the clutch to be disengaged and a gear ratio to be established, control means for the power-operated means, and means for controlling the control means by the accelerator mechanism and the clutch pedal, said last-named means being conditioned to cause the control means to initiate operation of the power means when the accelerator mechanism is in a predetermined position and the clutch pedal is moved to a position in its free range of movement.

51. In a motor vehicle provided with an accelerator mechanism, with a [main] clutch and clutch operating pedal having a free range of movement before acting to disengage the clutch and with a change-speed gearing, power-operated means for causing the clutch to be disengaged and a gear ratio to be established, control means for the power-operated means, means for controlling the control means by the accelerator mechanism and the clutch pedal, said last-named means being conditioned to cause the control means to initiate operation of the power means when the accelerator mechanism is in a predetermined position and the clutch pedal is moved to a position in its free range of movement, and means establishing a connection between the clutch pedal and the gearing for transmitting manual force to cause the gear ratio to be made operative in the event the power-operated means should totally or partially fail to operate, said connection being effective only when the clutch pedal is moved beyond the clutch-disengaging position.

52. In a motor vehicle provided with an accelerator mechanism and a change-speed gearing having an element capable of assuming two *different* speed [ratio] *drive* positions and a neutral position, means for shifting the element of said gearing alternately between one speed [ratio] *drive* and another, control means for said shifting means including said accelerator mechanism, manually-controlled means movable from one position to another position for conditioning the control means for operation, said control means causing the shifting means to place the element of the gearing in one speed [ratio] *drive* when the accelerator mechanism is in released condition and for causing the shifting means to place the element of the gearing in the other speed [ratio] *drive* when the accelerator mechanism is fully depressed, and means operable by the manually-controlled means when returned to the one position for first disabling the conditioning means and subsequently moving the element of said gearing to neutral position.

53. In a motor vehicle provided with an accelerator mechanism, a [main] clutch and a change-speed gearing, means comprising a single power means having an element successively movable in one direction for disengaging the clutch and for shifting said gearing alternately between one speed [ratio] *drive* and another, said element when movable in the other direction [permitting] *controlling re-engagement* [re-engaging control] of the clutch, control means for said power means including said accelerator mechanism, said control means causing the power means to disengage the clutch and place the gearing in one speed [ratio] *drive* when the accelerator mechanism is in released condition and for causing the power means to disengage the clutch and place the gearing in the other speed [ratio] *drive* when the accelerator mechanism is fully depressed, and means controlled by the accelerator mechanism for controlling the rate of reengagement of the clutch *by the power means.*

54. In a motor vehicle provided with an accelerator mechanism, a [main] clutch and a change-speed gearing having an element capable of assuming two *different* speed [ratio] *drive* positions and a neutral position, means including power means *operable* for disengaging the [main] clutch and for shifting the element of said gearing alternately between one speed [ratio] *drive* and another, control means for *operating* said power means including said accelerator mechanism, manually-controlled means movable from one position to another position for conditioning the control means for operation, said control means being operable to cause the power means to disengage the [main] clutch and place the gearing element in a speed [ratio] *drive* when the accelerator mechanism is in released condition to thereby [permit] *condition* the speed [ratios] *drives* to be alternately established by successively placing the accelerator mechanism in released position, and means operable by the manually-controlled means when returned to the one position for moving the element of said gearing to neutral position.

55. In a motor vehicle provided with an accelerator mechanism, a [main] clutch and a change-speed gearing having an element capable of assuming two *different* speed [ratio] *drive* positions and a neutral position, means including power means *operable* for disengaging the [main] clutch and for shifting the element of said gearing alternately between one speed [ratio] *drive* and another, control means for *operating* said power means including said accelerator mechanism, manually-controlled means movable from one position to another position for conditioning the control means for operation, said control means being operable to cause the power means to disengage the [main] clutch and place the gearing element in a speed [ratio] *drive* when the accelerator mechanism is in released condition and to disable the power means [and allow] *to control* re-engaging of the [main] clutch when the accelerator mechanism is initially moved from its released position to thereby [permit] *condition* the speed [ratios] *drives* to be alternately established by successively placing the acceleration mechanism in released position, and means operable by the manually-controlled means when returned to the one position for moving the element of said gearing to neutral position.

56. In a motor vehicle provided with an engine having an accelerator mechanism, with a [main] clutch and clutch operating pedal having a free range of movement before acting to disengage the clutch and with a change-speed gearing having a hand-control lever, power-operated means *operably* connected for causing the clutch to be disengaged and a speed [ratio] *drive* to be established, control means for the power-operated means, and means for controlling the control means by the accelerator mechanism, the hand-control lever and the clutch pedal, said last-named means being conditioned to cause the control means to initiate operation of the power-operated means when the accelerator mechanism and the hand-control lever are in predetermined positions and the clutch pedal is moved to a position in its free range of movement.

57. In a motor vehicle provided with an engine having an accelerator mechanism, with a [main] clutch and clutch operating pedal having a free range of movement before acting to disengage the clutch and with a change-speed gearing having a hand-control lever, power-operated means connected for causing the clutch to be disengaged and a speed [ratio] *drive* to be established, control means for the power-operated means, means for controlling the control means by the accelerator mechanism, the hand-control lever and the clutch pedal, said last-named means being conditioned to cause the control means to initiate operation of the power-operated means when the accelerator mechanism is in a predetermined position, the hand-control lever is moved from one predetermined position to a second predetermined position and the clutch pedal is moved to a position in its free range of movement, and means for neutralizing the gearing by manual effort and disabling the control means when the hand-lever is returned to its said first predetermined position.

58. In a motor vehicle provided with an engine having an accelerator mechanism, with a [main] clutch and clutch operating pedal having a free range of movement before acting to disengage the clutch and with a change-speed gearing having a hand-control lever, a source of fluid pressure different from atmosphere, a fluid motor having a movable element *operably* connected for causing the clutch to be disengaged and a speed [ratio] *drive* established, conduit means between the source and the motor, a valve associated with the conduit means, means for conditioning said valve so that the fluid motor can operate when the hand-control lever is moved from one predetermined position to another, said valve causing the fluid motor to be disabled when the hand-control lever is in its first predetermined position, other valve means for controlling the fluid motor, and means for causing said other valve means to be operative when the accelerator mechanism is in a predetermined position and the clutch pedal is moved to a position in its free range of movement.

59. In a motor vehicle provided with an engine having an accelerator mechanism, with a [main] clutch and clutch operating pedal having a free range of movement before acting to disengage the clutch and with a change-speed gearing having a hand-control lever, a source of fluid pressure different from atmosphere, a fluid motor having a movable element *operably* connected for causing the clutch to be disengaged and a speed [ratio] *drive* established, conduit means between the source and the motor, a valve associated with the conduit means, means for conditioning said valve so that the fluid motor can operate when the hand-control lever is moved from one predetermined position to another, said valve causing the fluid motor to be disabled when the hand-control lever is in its first predetermined position, other valve means for controlling the fluid motor, means for causing said other valve means to be operative when the accelerator mechanism is in a predetermimned position and the clutch pedal is moved to a position in its free range of movement, and means for neutralizing the gearing by manual effort when the hand-control lever is returned to its first predetermined position.

60. In a control mechanism for a change-speed gearing having a shiftable member movable to two gear ratio operative positions and a neutral position, power-operated means having a movable element [connectable] *operably connected* to the shiftable member, control means for the power-operated means, a manual member, means for conditioning the power-operated means for operation to a the manual member is moved from one position to a second position, spring means, means for energizing the spring means independently of power from the power-operated means, means for so associating the spring means with the shiftable member that it can be effective to apply its force to move the shiftable member from a gear ratio operative position to the neutral position, and means operable when the manual member is moved from the second position back to the first position for disabling the power means and for releasing the spring means by manual effort so as to become effective to apply its force to move the shiftable member to its neutral position.

61. In a control mechanism for a change-speed gearing having a shiftable member movable to two gear ratio operative positions and a neutral position, power-operated means, a manual member, means for conditioning the power-operated means for operation when the manual member is moved from one position to a second position, spring means, means for associating the spring means with the shiftable member so that it can be effective to apply its force to move the shiftable member from the gear ratio operative position to the neutral position, means for energizing said spring means and maintaining it energized independently of power from the power-operated means when the manual member is moved to the second position, and means operable when the manual member is moved from the second position back to the first position for disabling the power means by the conditioning means and for releasing the energy of the spring so that it will become effective in applying its force to move the shiftable member to its neutral position.

62. In a control mechanism for a change-speed gearing having a shiftable member movable to two gear ratio operative positions and a neutral position, a fluid motor having a movable element [connectable] *operably connected* to the shiftable member, a source of fluid pressure different from atmosphere and connected to operate the motor, control means including a control valve between the source and the motor, a conditioning valve also between the source and the motor, a manual member, means for placing the conditioning valve in a position to [permit] *render* control of the operation of the motor by the control valve *effective* when the manual member is moved from one position to a second position, spring means, and means for so associating the spring means with the shiftable member that it can be effective to apply force to move the shiftable member from a gear ratio operative position to the neutral position, and means operable when the manual member is moved from the second position back to the first position for disabling the power means by placing the conditioning valve means in an inoperative position and for manually releasing the spring means to become effective in applying its force for moving the shiftable member to its neutral position.

63 In a motor vehicle provided with an accelerator mechanism and a change-speed gearing having a member movable to two different speed [ratio] *drive* operative positions, a control mechanism comprising a fluid motor having a movable element, means including selecting means for [so] *operably* connecting the movable element to the movable member of the gearing *so* that successive reciprocations of said element from one position to another and return will cause the movable member to alternately assume its operative positions, a source of pressure different from atmospheric pressure connected to one end only of the motor, a control valve, means causing said control valve to be open when the accelerator mechanism is in a released position and closed when said accelerator mechanism is in an operative position, means comprising a manually movable member settable in one position for conditioning the motor for operation and maintained in said position during [ratio] *speed* changing, and means for neutralizing the gearing at will by a return movement of the manual member from the said one position.

64. In a motor vehicle having an engine provided with a carburetor, an accelerator mechanism therefor and with a change-speed gearing, a fluid *pressure operated* motor for causing a speed [ratio] *drive* to be operative, means comprising a control valve for controlling the operation of said motor, means controlled by the accelerator mechanism for placing said valve in a fluid motor operative position when the accelerator mechanism is in a depressed position substantially at the end of its full operating range, an auxiliary valve means associated with the carburetor *and adapted by closing to insure idling of the carburetor*, and means for automatically closing the auxiliary valve whenever said accelerator mechanism is in said predetermined position whereby the control valve is caused to be in fluid motor operating position.

65. In a motor vehicle having an engine provided with a carburetor, an accelerator mechanism therefor and with a change-speed gearing, a fluid *pressure operated* motor for causing either of two different speed [ratios] *drives* to be operative, means comprising a control valve for controlling the operation of said motor, a solenoid *energizable* for placing said valve in a fluid motor operating position, an electrical circuit for *energizing* the solenoid including a switch, means operable by the accelerator mechanism for closing said switch and energizing the solenoid when the accelerator mechanism is fully depressed, an auxiliary valve means associated with the carburetor, means for automatically closing the auxiliary valve by the solenoid when it is energized, and other means for placing the control valve in fluid motor operating position independently of the circuit and solenoid when the accelerator mechanism is released.

66. In a motor vehicle provided with an accelerator mechanism, a [main] clutch and a change-speed *drive* gearing, a fluid motor having a movable member, means operable by a single movement of the movable member in one direction for disengaging the clutch and for changing the speed [ratio] *drive* of the gearing, a source of pressure different from atmosphere for actuating the motor, a control valve, a solenoid *energizable* for opening the control valve, an electrical circuit for *energizing* the solenoid including an accelerator controlled switch which is adapted to be closed only when the accelerator mechanism is fully depressed, and means *operable* for preventing said switch from being closed by the accelerator mechanism notwithstanding it may be fully depressed.

67. In a motor vehicle provided with an accelerator mechanism, a [main] clutch and a change-speed *drive* gearing, a fluid motor having a movable member, means operable by a single movement of the movable member in one direction for disengaging the clutch and for changing the speed [ratio] *drive* of the gearing, a source of pressure different from atmosphere for actuating the motor, a control valve, means for opening the valve when the accelerator mechanism is fully released or fully depressed, and means *operable* for preventing the valve from being opened notwithstanding the accelerator mechanism is fully depressed, said last-named means being ineffective to prevent opening of the valve when the accelerator mechanism is fully released.

68. In a motor vehicle provided with an accelerator mechanism and a change-speed gearing, means comprising a reciprocable member and connecting means between said member and gearing for shifting said gearing from one speed [ratio] *drive* to another, and means associated with the connecting means of the shifting means and controlled by the accelerator mechanism prior to operation of the shifting means for selecting the speed [ratio] *drive* to which the gearing is shifted, said selecting means comprising a single rotatable cam member movable to two selecting positions and controllable to one position for selecting one speed [ratio] *drive* when the accelerator mechanim is in a released position and controllable to the other position for selecting the other speed [ratio] *drive* when the accelerator mechanism is moved to a position substantially at the end of its operating range remote from the released position.

69. In a motor vehicle provided with an accelerator mechanism and a change-speed gearing, means for shifting said gearing from one speed [ratio] *drive* to another, and selecting means for the shifting means comprising a single rotatable V-shaped cam member so controlled by the accelerator mechanism prior to operation of the shifting means that it will be rotated to one position and one speed [ratio] *drive* will be selected when the accelerator mechanism is in released condition and it will be rotated to another position and another speed [ratio] *drive* will be selected when the accelerator mechanism is in depressed condition substantially at the end of its operative range.

70. In a motor vehicle provided with an accelerator mechanism and a change-speed gearing, means for shifting said gearing from one speed [ratio] *drive* to another, selecting means comprising a single rotatable V-shaped cam member for the shifting means so controlled by the accelerator mechanism prior to operation of the shifting means that it will be rotated to one position and one speed [ratio] *drive* will be selected when the accelerator mechanism is in released condition and it will be rotated to another position and another speed [ratio] *drive* will be selected when the accelerator mechanism is in depressed condition substantially at the end of its operative range, and means for causing said shifting means to be operated only when the accelerator mechanism is in the released or in the depressed condition.

71. In a motor vehicle provided with an accelerator mechanism and a change-speed gearing having at least two *different* speed [ratios] *drives* means for shifting said gearing from one speed [ratio] *drive* to another, and selecting means comprising a single rotatable V-shaped selecting cam member for the shifting means so directly controlled by the accelerator mechanism prior to operation of the shifting means that the selecting member will be moved to one position and the highest speed [ratio] *drive* will be selected when the accelerator mechanism is in one position and the selecting member will be moved to another position and the other speed [ratio] *drive* will be selected when the accelerator mechanism is in another position.

72. In a motor vehicle provided with an accelerator mechanism, a [main] clutch and a change-speed gearing, a single fluid motor for causing the clutch to be disengaged and a single element of the gearing to be shifted, and means comprising a control valve and selecting means for so controlling said fluid motor by the accelerator mechanism that the clutch will be disengaged and a shift will be made to one speed [ratio] *drive* if the gearing is in another speed [ratio] *drive* when the accelerator mechanism is in released position only and the clutch will be disengaged and a shift will be made to another speed [ratio] *drive* if the gearing is in said one speed [ratio] *drive* only when the accelerator mechanism is in a depressed position.

73. In combination with a change-speed gearing having a movable member for establishing either of two *different* speed [ratios] *drives* by movement to two positions through a neutral position, a fluid motor having a movable element movable to one position and return, means for connecting the element to the movable member including selecting means so associated with the movable element and the member that a movement of the element in one direction will establish one speed [ratio] *drive* and set the selecting means so that a succeeding movement of the element in the same direction will establish the other speed [ratio] *drive*, a source of pressure different from atmosphere, conduit means between the source and the motor, a manually operative member, conditioning valve means in the conduit means, means for placing the conditioning valve means in a conditioning position when the manual member is moved from one position to another position, means operable by the manual member when returned to its said one position for first placing the conditioning valve means in a non-conditioning position and thereby effect the return movement of the movable element of the motor from its speed [ratio] *drive* establishing position and then subsequently causing by manual effort the neutralizing of an established speed [ratio] *drive*.

74. In a motor vehicle provided with an accelerator mechanism, a [main] clutch and a change-speed gearing, a power means *operably* connected to disengage the clutch, mechanical connecting means between the power means and the gearing including selecting means for determining which of two *different* speed [ratios] *drives* will be established when the power means is operated, means for controlling the power means and actuating the selecting means by the accelerator mechanism so as to cause the clutch to be disengaged and one speed [ratio] *drive* established when the accelerator mechanism is placed in one position and the clutch to be disengaged and the other speed [ratio] *drive* to be established when the accelerator mechanism is placed in another position, and means actuated by movement of the accelerator mechanism after a speed [ratio] *drive* has been established for controlling the rate of re-engagement of the clutch.

75. In a motor vehicle provided with an accelerator mechanism and a change-speed gearing having at least two *different* speed [ratios] *drives*, power means comprising a reciprocable actuating member for shifting the gearing, means comprising selecting means between the reciprocable actuating member and the gearing and operable for determining which speed [ratio] *drive* will be established by movement of the actuating member in one direction only of its reciprocable movement, means for controlling the operation of the selecting means by the actuating member during a shift of the gearing, and means for so controlling the operation of the power means by the accelerator mechanism such that the power means will be caused to reciprocate its actuating member to thereby effect selective establishment of the speed [ratio] *drives* when the accelerator mechanism is placed in its released position only.

76. In a motor vehicle provided with an accelerator mechanism, a [main] clutch and a change-speed gearing having at least two *different* speed [ratios] *drives*, power means comprising a reciprocable actuating member for first disengaging the clutch and then shifting the gearing, means comprising selecting means between the reciprocable actuating member and the gearing and operable for determining which speed [ratio] *drive* will be established by movement of the actuating member in one direction only of its reciprocable movement, means for controlling the operation of the selecting means by the actuating member during a shift of the gearing, and means for controlling the operation of the power means by the accelerator mechanism such that the power means will be caused to reciprocate its actuating member to thereby effect disengagement of the clutch and selective establishment of the speed [ratios] *drives* when the accelerator mechanism is placed in its released position only.

77. *In a speed-drive control for use with an engine having a carburetor thereon with a main carburetor valve and a vacuum passage from the valve to the engine, the combination of an accelerator pedal for controlling the main carburetor valve, a vacuum-power device including a housing and fluid-impermeable means in the interior of the housing dividing the same into a pair of chambers, said fluid-impermeable means being movable in said housing in response to differential fluid pressures in the pair of chambers, connections to opposite ends of the housing to* connect one of said chambers with the vacuum passage to draw vacuum on one side of the fluid-impermeable means and to connect the other of said chambers with a source of higher pressure fluid, main valve means in said connections to control flow with respect to the housing and regulate movement of the fluid-impermeable means therein, an auxiliary valve for the vacuum passage movable to throttle said passage, increase vacuum in said one of said chambers and draw vacuum on the connection between said passage and the housing, and mechanisms connecting the accelerator pedal with the main valve means in said connections and with the auxiliary valve, said mechanisms being adapted to open the main valve means and operate the auxiliary valve means to a throttling position at a predetermined position of the accelerator pedal.

78. In a speed-drive control for use with an engine, the combination of a carburetor having a main throttle valve and a vacuum passage, an accelerator pedal for operating the said valve to throttling and open positions, vacuum-operated power mechanism, an auxiliary throttling valve in the vacuum passage, control means for controlling connection of the power mechanism to the vacuum passage, and mechanism operated by disposition of the accelerator pedal in a predetermined position to simultaneously operate the main and auxiliary throttling valves to throttling position and to operate the control means for effecting operation of the power mechanism.

79. In a speed-drive changing device for use with an engine, the combination of a carburetor having a main carburetor throttling valve and a vacuum passage, independent throttling means independent of said main valve for throttling the vacuum passage, power mechanism operable for obtaining a change in speed drive, and operating means including control means to render the power mechanism operative and means to operate the independent throttling means at the same time, when a speed ratio change is produced, and a pedally-operable member by which the operating means is operated.

80. In a speed-drive changing device for use with an engine, the combination of a carburetor having a vacuum passage and a main carburetor throttling valve, independent throttling means independent of said main valve for throttling the vacuum passage, power mechanism operable for obtaining a change in speed drive, and operating means including control means to render the power mechanism operative and means to operate the independent throttling means at the same time, when a speed drive change is produced, an accelerator pedal for the carburetor, the operating means being connected therewith to effect operation of the power mechanism and independent throttling means at a predetermined position of the accelerator pedal.

81. In a speed-drive changing device for use with an engine, a driven shaft and mechanism changing the relationship of the engine and driven shaft, a carburetor having a vacuum passage and a main carburetor throttling mechanism including an accelerator pedal and a throttling valve positioned by the accelerator, supplemental means for effecting throttling of said passage, said means being operable independently of whether or not the accelerator pedal is in a position that normally produces a running position of its throttling valve, power means operable for actuating said mechanism changing the relationship between the engine and driven shaft, operating means including control means for effecting operation of the power means, and means interconnected with the operating means to effect actuation of the supplemental means to a throttling position at the time the power means is operated.

82. In a speed-drive changing device for use with an engine, a driven shaft and mechanism changing the relationship of the engine and driven shaft, a carburetor having a vacuum passage and a main carburetor throttling mechanism including an accelerator pedal and a throttling valve positioned by the accelerator, supplemental means for effecting throttling of said passage, said means being operable independently of whether or not the accelerator pedal is in a position that normally produces a running position of its throttling valve, power means operable for actuating said mechanism changing the relationship between the engine and driven shaft, operating means including control means for effecting operation of the power means, and means interconnected with the operating means to effect actuation of the supplemental means to a throttling position at the time the power means is operated, the operating means including the accelerator pedal and mechanism connected therewith to be operated at a predetermined position of the accelerator pedal to effect operation of the power means.

83. In a speed-drive changing device for use with an engine, a driven shaft and mechanism changing the relationship of the engine and driven shaft, a carburetor having a vacuum passage and a main carburetor throttling mechanism including an accelerator pedal and a throttling valve positioned by the accelerator, supplemental means for effecting throttling of said passage, said means being operable independently of whether or not the accelerator pedal is in a position that normally produces a running position of its throttling valve, power means operable for actuating said mechanism changing the relationship between the engine and driven shaft, operating means including control means for effecting operation of the power means, and means interconnected with the operating means to effect actuation of the supplemental means to a throttling position at the time the power means is operated, the operating means including the accelerator pedal and mechanism connected therewith to be operated at an extreme position of the accelerator pedal to effect operation of the power means.

84. In a speed-drive changing device for use with an engine, a driven shaft and mechanism changing the relationship of the engine and driven shaft, a carburetor having a vacuum passage and a main carburetor throttling mechanism including an accelerator pedal and a throttling valve positioned by the accelerator, supplemental means for effecting throttling of said passage, said means being operable independently of whether or not the accelerator pedal is in a position that normally produces a running position of its throttling valve, power means operable for actuating said mechanism changing the relationship between the engine and driven shaft, operating means including control means for effecting operation of the power means, and means interconnected with the operating means to effect actuation of the supplemental means to a throttling position at the time the power means is operated, the operating means including the accelerator pedal, another control device, and means connected with the accelerator pedal and said other device to effect operation of the power means and the independent throttling means when the accelerator pedal and the other control device are moved to predetermined positions.

85. In a speed-drive changing device for use with an engine, a driven shaft and mechanism changing the relationship of the engine and driven shaft, a carburetor having a vacuum passage and a main carburetor throttling mechanism including an accelerator pedal and a throttling valve positioned by the accelerator, supplemental means for effecting throttling of said passage, said means being operable independently of whether or not the accelerator pedal is in a position that normally produces a running position of its throttling valve, power means operable for actuating said mechanism changing the relationship between the engine and driven shaft, operating means including control means for effecting operation of the power means, and means interconnected with the operating means to effect actuation of the supplemental means to a throttling position at the time the power means is operated, the operating means including the accelerator pedal, another control device, and means connected with the accelerator pedal and said other device to effect operation of the power means and the independent throttling means when the accelerator pedal and the other control device are moved to predetermined positions, said other control device comprising a clutch pedal, there being a clutch associated with the engine.

86. In a motor vehicle provided with an accelerator mechanism, a torque relieving mechanism and a change-speed gearing, a single fluid motor for first operating the torque relieving means to relieve the torque and then for changing the speed drive of the gearing, a source of pressure different from atmosphere for actuating the motor, a control valve for the motor, a solenoid for opening the control valve, an electrical circuit including a source of electrical energy for energizing the solenoid including an accelerator-controlled switch which is closed only when the accelerator is in a predetermined position, and means for causing the engine to idle when the accelerator mechanism is in said predetermined position.

87. In a motor vehicle provided with an accelerator mechanism, a torque relieving mechanism and a change-speed gearing, a single fluid motor for first operating the torque relieving means to relieve the torque and then for changing the speed drive of the gearing, a source of pressure different from atmosphere for actuating the motor, a control valve for the motor, a solenoid for opening the control valve, an electrical circuit including a source of electrical energy for energizing the solenoid including an accelerator-controlled switch which is closed only when the accelerator is in a released position, and means for causing the engine to idle when the accelerator mechanism is in said released position.

88. A speed-change control for use with a motor vehicle having an engine, an accelerator mechanism, an accelerator, a torque relieving device and a change-speed gearing, the control including a single fluid motor and connections from the fluid motor engageable with the torque relieving means and the change-speed gearing, said connections being operated by the fluid motor in the order named whereby the torque relieving device may be operated to relieve torque and then the change-speed gearing may be operated to change the speed drive thereof, a fluid control valve for controlling flow of fluid to operate the fluid motor, a solenoid for opening the fluid control valve, an electrical circuit including a source of electrical energy for energizing the solenoid including a switch having connections for operation of the switch by the accelerator whereby the switch is closed only when the connections at the accelerator are in a predetermined position corresponding to a predetermined position of the accelerator, and means for causing the engine to idle when said connections are in said position.

89. In a motor vehicle having an engine provided with a carburetor, an accelerator mechanism therefor and with a change-speed gearing, a fluid motor for causing a speed drive to become operative, means comprising a control valve for controlling the operation of said motor, means controlled by the accelerator mechanism for placing said valve in a fluid motor operative position when the accelerator is in a predetermined position, an auxiliary valve means associated with the carburetor, and means for automatically closing the auxiliary valve to cause the engine to idle whenever the accelerator mechanism is in said predetermined position whereby the control valve is caused to be in fluid motor operating position.

90. In a motor vehicle having an engine provided with a carburetor, an accelerator mechanism therefor and with a change-speed gearing, a fluid motor for causing a speed drive to become operative, means comprising a control valve for controlling the operation of said motor, means controlled by the accelerator mechanism for placing said valve in a fluid motor operative position when the accelerator mechanism is in one of its extreme positions, an auxiliary valve means associated with the carburetor, and means for automatically closing the auxiliary valve to cause the engine to idle whenever the accelerator mechanism is in said extreme position whereby the control valve is caused to be in fluid motor operating position.

91. In a speed-drive changing device for use with an engine and an accelerator mechanism having an accelerator and accelerator actuated devices positioned in various positions corresponding to positions of the accelerator; the combination of speed-change mechanism including power means to change the speed drive produced by the mechanism, control means movable to effect operation of the power means, and engine idling means interconnected with the speed-change mechanism to cause the engine to idle when the power means is operated, said control means including connections to the accelerator and movable when the accelerator reaches a predetermined position, the idling means being operable irrespective of the normal position of the accelerator actuated devices at such predetermined position of the accelerator.

92. In a speed-drive changing device for use with an engine, accelerator mechanism having an accelerator and two throttling devices controlled by the accelerator; power-operated means to change the speed drive, two control devices movable to operating positions; mechanism to cause operation of the power-operated means when both control devices are in their operating positions, and one of said throttle devices being operable to idle the engine coordinately with the foregoing operation of the power-operated means, when operated to change the speed drive and means for operating said engine idling throttle independently of the normal controlling condition of the accelerator.

93. In a shifter mechanism for use with an engine and a change-speed drive transmission, energizable power means movable in a shifting direction and back again, energizing means for the power means, a shifting device, a one-way connection between the power means and the shifting device to cause the shifting device to operate in a direction to establish a speed drive upon movement of the power means in a shifting direction and to enable the shifting device to be returned by the power means without disturbing the established speed drive, additional means movable in one direction away from the shifter device to accommodate movement of the device in a shifting direction, and movable in a return direction to displace the shifter device back, means operated by movement of the additional means away from shifting direction to condition the power means for operation, an additional operating member, and mechanism operated by movement of the additional member to a predetermined position to effect energization of the power means when it is conditioned as aforesaid, and said mechanism including means to interrupt torque from the engine to the transmission, to enable the power means to effect a shift.

94. In a shifter mechanism for use with an engine and a change-speed drive transmission, energizable power means movable in a shifting direction and back again, energizing means for the power means, a shifting device, a one-way connection between the power means and the shifting device to cause the shifting device to operate in a direction to establish a speed drive upon movement of the power means in a shifting direction and to enable the shifting device to be returned by the power means without disturbing the established speed drive, additional means movable in one direction away from the shifter device to accommodate movement of the device in a shifting direction, and movable in a return direction to displace the shifter device back, means operated by movement of the additional means away from shifting direction to condition the power means for operation, an additional operating member, and mechanism operated by movement of the additional member to a predetermined position to effect energization of the power means when it is conditioned as aforesaid, and said mechanism including means to interrupt torque from the engine to the transmission, to enable the power means to effect a shift, said torque interrupting means comprising means to cause the engine to operate at idling speed.

95. In a shifter mechanism for use with an engine and a change-speed drive transmission, energizable power means movable in a shifting direction and back again, energizing means for the power means, a shifting device, a one-way connection between the power means and the shifting device to cause the shifting device to operate in a direction to establish a speed drive upon movement of the power means in a shifting direction and to enable the shifting device to be returned by the power means without disturbing the established speed drive, additional means movable in one direction away from the shifter device to accommodate movement of the device in a shifting direction, and movable in a return direction to displace the shifter device back, means operated by movement of the additional means away from shifting direction to condition the power means for operation, an additional operating member, and mechanism operated by movement of the additional member to a predetermined position to effect energization of the power means when it is conditioned as aforesaid, and said mechanism including means to interrupt torque from the engine to the transmission, to enable the power means to effect a shift, said torque interrupting means comprising a clutch mechanism.

96. In a speed-drive changing device to produce speed drive changes between an engine and a driven shaft, which engine produces vacuum in a vacuum passage and has an accelerator to control operation thereof, vacuum-power mechanism to effect the speed drive changes, control means for effecting connecting of the vacuum-power mechanism to the vacuum passage when the accelerator is in a reduced vacuum engine controlling position, and means to provide high vacuum to the vacuum-power mechanism for such operation at the time the control

*means is operated, irrespective of the position of the accelerator.*

*97. In a speed-drive changing device to produce speed drive changes between an engine and a driven shaft to which the engine applies torque, which engine produces vacuum in a vacuum passage and has an accelerator to control operation thereof, vacuum-power mechanism to effect the speed drive changes, control means for effecting connection of the vacuum-power mechanism with the vacuum passage when the accelerator is in reduced vacuum engine controlling position, the control means being adapted simultaneously to provide high vacuum for the operation of the vacuum-power mechanism at the time said mechanism is operated, and to interrupt the torque of the engine on the driven shaft.*

*98. In a control for speed-drive changing mechanism disposed between an engine and a driven shaft, with means to disconnect the engine from the speed-drive changing mechanism, the engine having a carburetor controlled by an accelerator mechanism having an operating range of movement between two extremes, the control including energizable power-operated means to move a toothed element from engagement with a companion toothed element, means to energize the power means, means operable at either extreme position of the accelerator mechanism, to throttle the engine, and means interconnecting the energizing means and last-named throttling means to cause the engine to be throttled at the time the power-operated means is operated, whereby torque is interrupted from the toothed elements to accommodate their disengagement.*

*99. In a control of the kind described for use with an engine having a vacuum passage a carburetor connected therewith, and an accelerator mechanism having a primary throttling valve and an accelerator pedal having connections with the throttling valve for normally positioning it in various positions corresponding to positions of the pedal, vacuum-power means having a conduit connecting it to the vacuum passage, a control valve in said conduit movable to open position to admit vacuum from the passage to the power means, a secondary throttle valve controlled by the accelerator pedal, for effecting throttling of the vacuum passage independently of the primary throttling valve, solenoid means for operating both the control valve and the secondary throttling valve, circuit means including a source of electrical energy for energizing the solenoid means including two parallel circuit branches, both of which branches include switch means operated by movement of the accelerator pedal, and one of which branches includes switch means operated by an additional control device.*

*100. In a control of the kind described for use with an engine having a vacuum passage, a carburetor connected therewith, and an accelerator mechanism having a primary throttling valve and an accelerator pedal having connections with the throttling valve for normally positioning it in various positions corresponding to positions of the pedal, vacuum-power means having a conduit connecting it to the vacuum passage, a control valve in said conduit movable to open position to admit vacuum from the passage to the power means, a secondary throttle valve controlled by the accelerator pedal, for effecting throttling of the vacuum passage, solenoid means for operating both the control valve and the secondary throttling valve, circuit means including a source of electrical energy for energizing the solenoid means and circuit control including switch means operated by the accelerator pedal in a plurality of positions whereby the solenoid means may be operated when the accelerator pedal is in said positions.*

*101. The combination of claim 91, plus a power-operated clutch and means to produce power operation of the clutch to clutch-disengaged position at the time the speed-change mechanism is operated under control of the accelerator as stated in said claim.*

*102. The combination of claim 101 wherein vacuum is the power for the power means, and the power means is connected with the vacuum line of the accelerator-operated devices, whereby the idling of the engine by the idling means renders available adequate power to operably energize the power means.*

*103. In a control for an automotive speed-drive changing device, for use with an engine having an accelerator to regulate engine speed; a torque-interrupting means; a change-speed transmission and a driven shaft; unitary power means to change the speed drive of the transmission with respect to the driven shaft, and operate the torque-interrupting means; means operatively connected with the accelerator to cause operation of the power means to effect a change in the speed drive and operate the torque-interrupting means to interrupt torque on the transmission, when the accelerator is in a predetermined position to cause engine speed above idling speed; and means to reduce the engine to idling speed when the torque-interrupting means is in torque interrupting condition with the accelerator in the aforementioned predetermined position or in a different predetermined engine regulating position.*

104. In a vehicular drive system including a torque producing internal-combustion engine having an accelerator mechanism and a clutch provided with friction elements relatively movable into and out of engaging contact for transmitting torque when engaged from the engine to an associated variable gear ratio transmission: the improvements which comprise power means operably connected to the clutch and operable for relieving the engine torque through the gearing by disengaging the clutch, a source of power for operatively energizing the power means, control means for the power means, means operable in response to movement of the accelerator mechanism to a depressed position substantially at the end of its range where full engine operation is available for so controlling the control means as to operate and cause the power means to relieve the torque being transmitted through the gearing, other means controlled by the accelerator mechanism when in its said depressed position for causing the power means to change the gear ratio following relief of the torque as aforesaid, and means for re-establishing torque transmitting conditions automatically following the establishment of the new gear ratio and independently of release of the accelerator mechanism from its position causing relief of the torque.

105. In a vehicular drive system including a torque-producing internal-combustion engine having an accelerator mechanism for controlling a throttle valve and a clutch provided with friction elements relatively movable into and out of engaging contact for transmitting torque when engaged from the engine to an associated variable gear ratio transmission; the improvements which comprise a single power device operable for disengaging the clutch, a source of power to operatively energize said power device, control means for causing operation of the power device, means operable by the accelerator mechanism when moved to a position substantially at the end of its range where full engine operation is available to control the control means and cause the power device to operatively disengage the clutch, means for rendering throttle valve control of the engine ineffective when the accelerator mechanism assumes its said clutch disengaging position, means for changing selected gear ratios by operation of the power device after clutch disengagement, and means operable by the accelerator mechanism just prior to assuming its said position for causing operation of the control means to cause clutch disengagement for so conditioning the last-named means for operation that the changing of gear ratio will occur.

106. In a vehicular drive system including a torque-producing internal-combustion engine having an accelerator mechanism and a clutch provided with friction elements relatively movable into and out of engaging contact for transmitting torque when engaged from the engine to an associated variable gear ratio transmission; the improvements which comprise a controllable power device operably connected to control the clutch, a source of power to operatively energize said power device, control means for causing operation of the power device, means operable when the gearing is in a predetermined gear ratio and the accelerator mechanism is moved to a position substantially at the end of its range where full engine operation is available for so operating the control means that the power device will operate to disengage the clutch and change the gear ratio of the gearing, and means operable upon said change in the gear ratio for automatically causing the power device to accommodate clutch re-engagement independently of movement of the accelerator mechanism.

107. In a vehicular drive system including a torque producing internal-combustion engine controllable by an accelerator mechanism operatable through a movement defined by two extreme positions, and a clutch provided with friction elements relatively movable into and out of engaging contact for transmitting torque when engaged from the engine to an associated variable gear ratio transmission: the improvements which comprise power means operably connected to the clutch and operable for relieving the engine torque through the gearing by disengaging the clutch; a source of power for operatively energizing the power means; control means for the power means; a first control device operable to an operative position in response to movement of the accelerator mechanism to one of its extreme positions substantially; a second control device operable to an operative position in response to the establishment of a certain transmission drive condition, and to an inoperative position in response to the establishment of certain different drive conditions; a third control device operable simultaneously with the first control device, to an operative position in response to the aforesaid accelerator mechanism movement whereby said control means is rendered effective to cause the power means to be operatively energized and relieve the torque being transmitted through the gearing with the three aforesaid control devices in operative positions; other means operable when the accelerator mechanism is in its said one extreme position for enabling the power means to change the transmission gear ratio following torque relief in the manner aforesaid; and means operable in response to the establishment of the new transmission gear ratio and independently of operation of the accelerator from its said one extreme position causing torque relief, for operating the second-named control device to inoperative position whereby the power means is deenergized and clutch re-engagement accommodated automatically thereby.

108. In a vehicular power drive system including a torque producing internal-combustion controllable by an accelerator mechanism operatable through a movement defined by two extreme positions, and a clutch provided with friction elements relatively movable into and out of engaging contact for transmitting torque when engaged from the engine to an associated variable gear ratio transmission: the improvements which comprise fluid-pressure operable means operably connected to the clutch and operable for relieving the engine torque through the transmission by disengaging the clutch; a source of pressure-fluid production different from atmosphere for operatively energizing the fluid-pressure operable means including fluid conduit means; solenoid-controlled valve means in the conduit means for operatively controlling the energization and deenergization of the fluid-pressure operable means, said valve being operable to an open and closed position respectively; electrical circuit means having two branches and including a source of electrical energy; a master switch device operable to closed position for conditioning the circuit means for energization by said last mentioned source; a double-throw switch device in both circuit branches having a movable contact element operable to one of its two closed positions in response to operating the accelerator to an extreme position substantially and to a common open position when the accelerator is operated intermediate its extreme positions; a single-throw switch device in said one of the circuit branches and operable to closed position in response to operation of said transmission into certain drive conditions, and to an open position in response to operation of said transmission into a certain one of said drive conditions, restrictive valve means including an element movable to an open non-restricting position in response to the aforesaid operation of the accelerator mechanism whereby said solenoid-controlled valve means is energized to open position with both of said switches in closed position, to cause the fluid-pressure operable means to operatively disengage the clutch and relieve the torque being transmitted through the transmission; other means operable when the accelerator is in its extreme position for enabling the fluid-pressure operable means to change the gear ratio of the transmission following torque relief as aforesaid; and means operable in response to the operation of the transmission into the new transmission gear ratio condition and independently of operation of the accelerator mechanism from its said extreme position causing torque relief, for operating the single-throw switch device to open position thus breaking the circuit means and causing the solenoid-controlled valve means to be deenergized to closed position whereby torque transmissing conditions of the clutch are re-established automatically under sole de-energized control of the fluid-pressure operable means caused by the open conditions of the single-throw switch device and the restrictive valve means.

109. A vehicular power drive system as set forth in claim 108 including a single-throw switch device in the other circuit branch, and a clutch pedal operatively connected to the friction clutch for controlling the operation thereof, said pedal having an initial free movement before operatively engaging the clutch to operate the same whereby said switch device is operated to closed position to energize the solenoid-controlled valve means to open position causing the fluid-pressure operable means to disengage the clutch with the double-throw switch device in its other closed position corresponding to released position of the accelerator.

110. A vehicular power drive system as set forth in claim 108 in which the said one extreme position of the accelerator is its fully depressed position substantially.

111. A vehicular power drive system as set forth in claim 109 including a vacuum operable device in constant fluid communication with an associated carburetor venturi and having a movable power element normally spring-biased in one direction, and operatively connected to move the movable contact element of the double-throw switch device in a different direction than by operation of the accelerator and responsive to vacuum produced by the velocity of the intake air through the venturi of the carburetor in accordance with engine operating speed to so position said contact element that closure of the double-throw switch device cannot be effected when the accelerator is operated to either its released or fully depressed position at or above a predetermined engine operating speed whereby the fluid-pressure operable means is rendered inoperative.

112. A vehicular power drive system as set forth in claim 108 in which the fluid-pressure operable means comprise a vacuum-operated servomotor having a movable power element mechanically linked to an element of the friction clutch, and the source of pressure-fluid production for operatively energizing the fluid-pressure operable means, is the vacuum condition produced in the intake-manifold of the engine when operating.

113. A vehicular power drive system as set forth in claim 108 in which the different drive conditions of the transmission are high speed and neutral, and the certain drive condition is the intermediate speed operation of the transmission.

114. A vehicular power drive system as set forth in claim 108 in which the said restrictive valve means includes means sequentially operable to fully close and gradually open said valve in response to operating the accelerator from either of its extreme positions to open the double-throw switch device thus causing de-energization of the fluid-pressure operable means whereby clutch re-engaging control is under operator control.

References Cited in the file of this patent or the original patent

UNITED STATES PATENTS

| Number | Name | Date |
|---|---|---|
| 1,495,274 | Teetor | Mar. 27, 1924 |
| 1,755,595 | Craig | Apr. 22, 1930 |
| 1,820,269 | Craig | Aug. 25, 1931 |
| 1,823,590 | Christensen | Sept. 15, 1931 |
| 1,993,544 | Fleischel | Mar. 5, 1935 |
| 2,047,807 | Tenney et al. | July 14, 1936 |
| 2,051,113 | Tyler | Aug. 18, 1936 |
| 2,051,553 | Fleischel | Aug. 18, 1936 |
| 2,062,104 | Prince | Nov. 24, 1936 |
| 2,068,716 | Tenney et al. | Jan. 26, 1937 |
| 2,092,446 | Fleischel | Sept. 7, 1937 |
| 2,103,540 | Livermore | Dec. 28, 1937 |
| 2,104,608 | Cox et al. | Jan. 4, 1938 |
| 2,109,615 | Durham | Mar. 1, 1938 |
| 2,115,097 | Durham | Apr. 26, 1938 |
| 2,123,298 | Bollinger et al. | July 12, 1938 |
| 2,126,032 | Randol | Aug. 9, 1938 |
| 2,126,033 | Randol | Aug. 9, 1938 |
| 2,163,880 | Houston et al. | June 27, 1939 |
| 2,163,883 | Kliesrath | June 27, 1939 |
| 2,169,216 | Bloxsom | Aug. 15, 1939 |

(Other references on following page)

UNITED STATES PATENTS

| Number | Name | Date |
|---|---|---|
| 2,187,824 | Britton | Jan. 23, 1940 |
| 2,195,365 | Getaz | Mar. 26, 1940 |
| 2,208,828 | Adams | July 23, 1940 |
| 2,210,237 | Fuhrer | Aug. 6, 1940 |
| 2,212,282 | Van Buskirk | Aug. 20, 1940 |
| 2,218,136 | Price | Oct. 15, 1940 |
| 2,222,913 | Pescara | Nov. 26, 1940 |
| 2,225,493 | Barnes | Dec. 17, 1940 |
| 2,234,463 | Brewer | Mar. 11, 1941 |
| 2,238,746 | Neracher et al. | Apr. 15, 1941 |
| 2,244,092 | Wheeler | June 3, 1941 |
| 2,250,835 | Kliesrath et al. | July 29, 1941 |
| 2,257,511 | Neff | Sept. 30, 1941 |
| 2,263,400 | Schwarz | Nov. 18, 1941 |
| 2,266,598 | Hale | Dec. 16, 1941 |

| Number | Name | Date |
|---|---|---|
| 2,273,277 | Leukhardt | Feb. 17, 1942 |
| 2,281,159 | Kliesrath et al. | Apr. 28, 1942 |
| 2,322,479 | Schjolin | June 22, 1943 |
| 2,325,486 | Derungs | July 27, 1943 |
| 2,327,063 | Randol | Aug. 17, 1943 |
| 2,328,921 | Neff | Sept. 7, 1943 |
| 2,332,341 | Price et al. | Oct. 19, 1943 |

FOREIGN PATENTS

| Number | Country | Date |
|---|---|---|
| 468,422 | Great Britain | Sept. 28, 1935 |
| 457,269 | Great Britain | Nov. 24, 1936 |
| 696,226 | Germany | Sept. 14, 1940 |

OTHER REFERENCES

Article on Chrysler Automatic Drive, published in Product Engineering, pp. 466–469 for October 1940.

Certificate of Correction

Reissue of Reissue No. 23,901 November 30, 1954

Glenn T. Randol

It is hereby certified that error appears in the printed specification of the above numbered patent requiring correction as follows:

Column 6, line 21, for "Figure" read [Figure ; column 13, line 42, for "lead" read leaf ; column 14, line 19, for "*as*", first occurrence, read *is*; column 19, line 68, for "step" read stop ; column 26, line 68, for "*throtting*" read *throttling*; column 35, line 2, for "will be" read will by ; column 39, line 45, for "operation to a" read operation when ; column 47, line 33, after "*passage*" insert a comma; column 49, line 84, for "transmissing" read transmitting ;

and that the said Letters Patent should be read as corrected above.

Signed and sealed this 18th day of January, A. D. 1955.

[SEAL]

ARTHUR W. CROCKER,
*Assistant Commissioner of Patents.*